United States Patent [19]

Nomura et al.

[11] Patent Number: 5,771,062
[45] Date of Patent: Jun. 23, 1998

[54] BEAM SCANNING APPARATUS, FOR PROVIDING TILT CORRECTION TO A ROTARY OPTICAL DEVICE

[75] Inventors: Yujiro Nomura; Takashi Suzuki; Kyu Takada; Nozomu Inoue, all of Nagano, Japan

[73] Assignee: Seiko Epson Corporation, Tokyo, Japan

[21] Appl. No.: 261,946

[22] Filed: Jun. 17, 1994

[30] Foreign Application Priority Data

Jun. 18, 1993 [JP] Japan .................................. 5-147780
Oct. 15, 1993 [JP] Japan .................................. 5-258764
Dec. 21, 1993 [JP] Japan .................................. 5-345356

[51] Int. Cl.⁶ .............................. B41J 2/47; G01D 15/34; G02B 26/00; G02B 27/00
[52] U.S. Cl. .......................... 347/257; 347/259; 347/260
[58] Field of Search .................................. 347/137, 134, 347/241, 244, 242, 260, 259, 261, 256, 257

[56] References Cited

U.S. PATENT DOCUMENTS

| | | | |
|---|---|---|---|
| 3,614,194 | 10/1971 | Harris | 350/7 |
| 4,514,050 | 4/1985 | Stites | 350/444 |
| 4,853,709 | 8/1989 | Stein et al. | 347/243 |
| 4,919,499 | 4/1990 | Aiba | 347/261 |
| 5,208,456 | 5/1993 | Appel et al. | 347/260 |

FOREIGN PATENT DOCUMENTS

| | | | |
|---|---|---|---|
| A20576014 | 12/1993 | European Pat. Off. | G02B 26/10 |
| A14130977 | 3/1993 | Germany | G02B 26/10 |

OTHER PUBLICATIONS

Sprague, Robert A., et al. *Laser Focus Electro Optics*; "Advances In Laser and E–O Printing Technology." Oct. 1983.

*Primary Examiner*—Benjamin R. Fuller
*Assistant Examiner*—Raquel Yvette Gordon
*Attorney, Agent, or Firm*—Sughrue, Mion, Zinn, Macpeak & Seas, PLLC

[57] ABSTRACT

The improved beam scanning apparatus has an optical element that is driven to rotate by means of a drive means so as to be capable of continuous angular displacement with respect to the beam from a light source. The optical element deflects the incident beam so that it is focused to form image on the image plane. It is provided with an entrance face, a reflecting face and an exit face which have their shape specified in such a way as to achieve effective correction of aberration, provide higher resolution, and reduce the size and cost of the apparatus.

17 Claims, 36 Drawing Sheets

BEAM SCANNING APPARATUS, FOR PROVIDING TILT CORRECTION TO A ROTARY OPTICAL DEVICE

BACKGROUND OF THE INVENTION

1. Field of the Invention

This invention relates to a beam scanning apparatus for use with a laser beam printer and like devices.

2. Related Background Art

The beam scanning apparatus for use with laser beam printers and like devices are so adapted that an optical beam issuing from a light source such as a semiconductor laser and collimated by means of a collimator lens is deflected for scanning by means of a fast driven rotating polygonal mirror and focused by an imaging lens to form a beam spot that illuminates an image plane to scan it for exposure. A problem with this type of beam scanning apparatus is that the imaging lens is so expensive that it accounts for most of the cost of the overall system. In addition, the imaging lens is usually as large as 100 mm in diameter, making the system inevitably bulky. As a further problem, the polygonal mirror is not only expensive but also bulky (i.e., its inscribed circle is usually about 20 mm in radius); this contributes to an inevitable increase in the cost and size of the whole system.

With a view to solving these problems, the assignee previously filed Japanese Patent Application No. Hei 5-121995, in which they proposed a beam scanning apparatus of a type having an optical element that was driven to rotate by means of a drive means so as to be capable of continuous angular displacement with respect to the beam from a beam generator, said beam performing scanning by being focused on an image plane, which apparatus was characterized in that the optical element was provided with an entrance face, a reflecting face and an exit face, at least one of which had the ability to correct aberrations. In this apparatus, the beam deflecting optical element (which is hereunder referred to as a "rotating lens mirror") has its reflecting face serve as a deflector but, at the same time, the individual faces can also function as lenses, thus providing a certain degree of freedom in correcting aberrations. In other words, the single rotating lens mirror works as both a deflector and a lens, whereby the beam scanning apparatus corrects aberrations by a sufficient degree to assure satisfactory optical characteristics.

Speaking of the rotating polygonal mirror which is also used with conventional laser beam printers, its individual faces usually have errors in parallelism that develop in the process of its manufacture and, furthermore, a mounting error can occur when it is mounted on the rotating shaft. On account of these errors, the direction of travel of a reflected beam will change in a plane normal to deflecting faces, thereby causing unevenness in the scanning pitch. In addition, precession and other irregular motions that occur in the rotating shaft of the polygonal mirror can be a cause of similar unevenness in the scanning pitch. In order to increase the precision of not only the polygonal mirror but also the deflector as a whole to such levels that there is no problem with image, the manufacturing time becomes so prolonged as to make the price of the final product prohibitive.

Various attempts have therefore been proposed for solving these problems by so-called "tilt correcting" optics. For example, U.S. Pat. No. 3,750,189 and Unexamined Published Japanese Patent Application (kokai) No. 56-36622 proposed a "conjugate" tilt correcting system of a type that used anamorphic scanning optics having different powers in a main scanning plane and a plane that was normal to the main scanning plane and which included the optical axis (the second plane is hereunder referred to as the "sub-scanning plane"). With this system, a light beam is focused on the reflecting faces of the polygonal mirror for illuminating the sub-scanning plane so that each of the reflecting faces will be conjugate to the photoreceptor's plane. Unexamined Published Japanese Patent Application (kokai) Nos. Sho 52-153456 and 58-134618 proposed an "attenuating" tilt correcting system, in which an elongated cylindrical lens was provided near the photoreceptor's plane so as to attenuate the variations that would occur in the direction of deflection for the sub-scanning plane due to tilting.

Consider first the case of the optics that uses the rotating polygonal mirror with reference to FIG. 42($a$) which shows the optics through a section taken in the sub-scanning direction as it is expanded along the optical axis. If a deflecting face 7 of the polygonal mirror tilts, a light beam that issues from a light source 1 and which is collimated by means of a collimator lens 2 is deflected in the sub-scanning direction at point P of intersection between the deflecting face 7 and the optical axis as indicated by dashed lines; the deflected beam then passes through an fθ lens 4 and falls on an image plane 5 at a point that departs from the main scanning plane which includes the optical axis, creating a scanning pitch error $\Delta X$. In the following description, the point at which a light beam is deflected in the sub-scanning direction on account of the tilting of a deflecting face as exemplified by point P shall simply be referred to as the "point of tilt deflection". In the case of optics that uses a rotating polygonal mirror, the point of tilt deflection lies on a deflecting face; hence, by adopting the conjugate tilt correcting system shown in FIG. 42($b$) in which a cylindrical lens 6 having power only in the sub-scanning direction is provided between a deflecting face 7 and a collimator lens 2 so that a light source 1, deflecting face 7 and an image plane 5 satisfy an optical conjugate relationship, any tilting that occurs in the deflecting face 7 can be corrected almost completely.

The system s described above are free from the problem of uneven scanning pitches and can perform precise optical scanning. However, the rotating polygonal mirror they use are only capable of deflecting the light beam issuing from the light source but have no ability to correct aberrations in the light beam or to focus it correctly on the image plane. Consequently, the number of lenses to be employed will increase, thereby making the overall system bulky and costly, which is a great obstacle to the recent trend for downsizing and personal use of personal computers and other office-automation equipment.

In the system previously proposed by the assignee in Japanese Patent Application No. Hei 5-121995, supra, only one deflecting face is used to eliminate the need for tilt correcting optics and the functions of two elements, i.e., a beam deflecting polygonal mirror and an aberration correcting lens, can be performed by the rotating lens mirror alone and, hence, there is the advantage of providing a compact and inexpensive optical scanner that comprises a smaller number of components. On the other hand, however, the use of the single deflecting face permits only one scanning per rotation of the lens mirror and, hence, there still remains room for further improvement in the scanning efficiency.

SUMMARY OF THE INVENTION

A first object of the present invention is to improve the system proposed in Japanese Patent Application No. Hei 5-121995, supra, thereby providing a beam scanning apparatus that is capable of satisfying both requirements for an even better resolution, smaller size and lower cost. Stated more specifically, the rotating lens mirror proposed in said application is made of glass in a shape that permits the manufacture at low cost of an improved rotating lens mirror which takes advantage of the properties of glass to exhibit high surface precision and consistent optical characteristics and this lens mirror is employed to produce a beam scanning apparatus that has an even better resolution and which yet is compact and less costly.

This object of the present invention can be attained by a beam scanning apparatus of a type having an optical element that is driven to rotate by means of a drive means so as to be capable of continuous angular displacement with respect to the beam from a beam generator, said beam performing scanning by focusing on an image plane, which apparatus is characterized in that the optical element is provided with an entrance face, a reflecting face and an exit face, at least one of which is a cylindrical face having power only in the main scanning direction.

A second object of the present invention is to improve the system proposed in Japanese Patent Application No. Hei 5-121995, supra, in such a way that the scanning optics using a plurality of rotating lens mirrors is provided with an additional capability for tilt correction, thereby making an optical scanning apparatus that satisfies both requirements for smaller size, lower cost and better resolution at higher speed.

This second object of the present invention can be attained by insuring that the plurality of optical elements each having a reflecting face, as well as an entrance face and an exit face that are shaped so as to be capable of correcting given aberrations, are caused to rotate, whereby the scanning efficiency is improved and, at the same time, the factor by which the scanning pitch error that develops due to the tilting of the rotating lens mirror during scanning by beam deflection is corrected optically is adjusted to be 0.5 and less.

It should be added that in order to produce an effectively focused beam image of good scanning linearity on an image plane by means of a beam scanning apparatus employing a plurality of rotating lens mirrors, it is necessary to use an imaging lens (fθ lens) in combination with the tilt correcting optics. Hence, a third object of the present invention is to provide a beam scanning apparatus by modifying the above-mentioned version by addition of a single imaging lens having a toric surface.

This object can be attained by a beam scanning apparatus of a type that comprises a light source, a collimator lens for shaping the beam from the light source, a cylindrical lens for forming a line image at a reflecting face of a deflector that is driven to rotate at fast speed, and an imaging lens by which the beam from the deflector is focused on an image plane, which apparatus is characterized in that the imaging lens by which the beam from the deflector is focused, as tilt corrected, on the image plane is composed of a single lens with a toric surface that has a biconvex shape with positive refractive power in a section that includes the optical axis and which is normal to the deflecting face. In a preferred embodiment, a rotating polygonal mirror or a rotating lens mirror may be used as the deflector in the beam scanning apparatus. In another preferred embodiment, the imaging lens may have an entrance face that is generated by rotating an arc of a circle or other geometric shapes around an axis that crosses the axis of rotation of the rotating polygonal mirror and the optical axis at right angles. It is also within the scope of the present invention to use a finite optical system in which the light beam incident on the deflector is converging in the main scanning direction.

The single imaging lens which has a biconvex shape in a section taken in the sub-scanning direction has the advantage that compared to a meniscus lens, the radius of curvature necessary to produce a given power can be great enough to insure reduction in spherical aberration. The large radius of curvature offers another advantage in that the fluidity of molding resins is sufficiently enhanced to cause a marked improvement in the efficiency of lens molding operations, whereby an imaging lens of high precision can be manufactured in an easy manner. In spite of this simplicity, the structural design under discussion contributes to the provision of a small and compact beam scanning apparatus. If the light beam incident on the deflector is made convergent in the main scanning direction, the optical power of the imaging lens can be made small enough to enable the design of lenses that are substantially uniform in thickness and which hence have very good moldability. The small optical power has the additional advantage of reducing the effects of temperature-dependent variations in refractive index.

The conventional toric lens has a surface that is generated by rotating an arc of a circle about an axis parallel to the axis of rotation of the rotating polygonal mirror but this surface is unable to change the curvature of a plane taken in the sub-scanning direction. On the other hand, using a surface that is generated by rotating an arc of a circle or other geometric shape around an axis that crosses the axis of rotation of the rotating polygonal mirror and the optical axis at right angles, one can change the shape of a section taken in the main scanning direction and, hence, the curvature of a section in the sub-scanning direction depending on the scanning position and this eventually offers the advantage of increasing the degree of freedom in correcting aberrations to thereby improve the imaging performance in sub-scanning operations. A further advantage results if the toric lens is combined with the rotating lens mirror in that distortion (fθ characteristics) can be produced in such a way that the angle of deflection of the beam issuing from the rotating lens mirror will be smaller than the angle of its rotation; this eliminates the need for developing distortion by means of the imaging lens and, hence, the degree of freedom in lens design is sufficiently increased to improve the imaging performance in such aspects as curvature of the field.

DETAILED DESCRIPTION OF THE PREFERRED EMBODIMENTS

Figure 1:
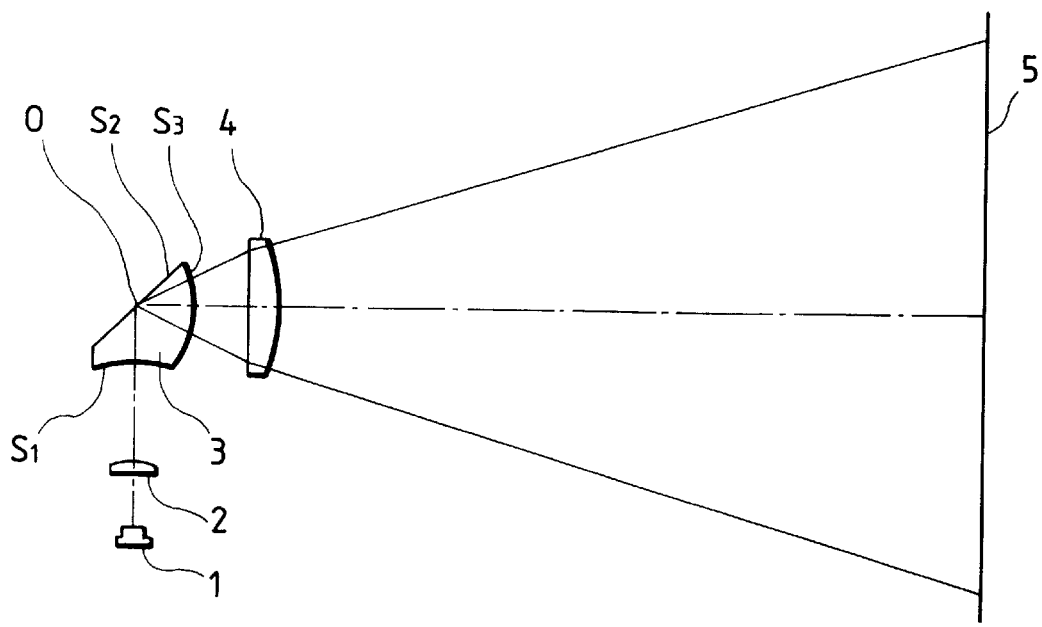
FIG. 1 is a diagram showing the concept of the optics in the beam scanning apparatus of the present invention.
Figure 2:
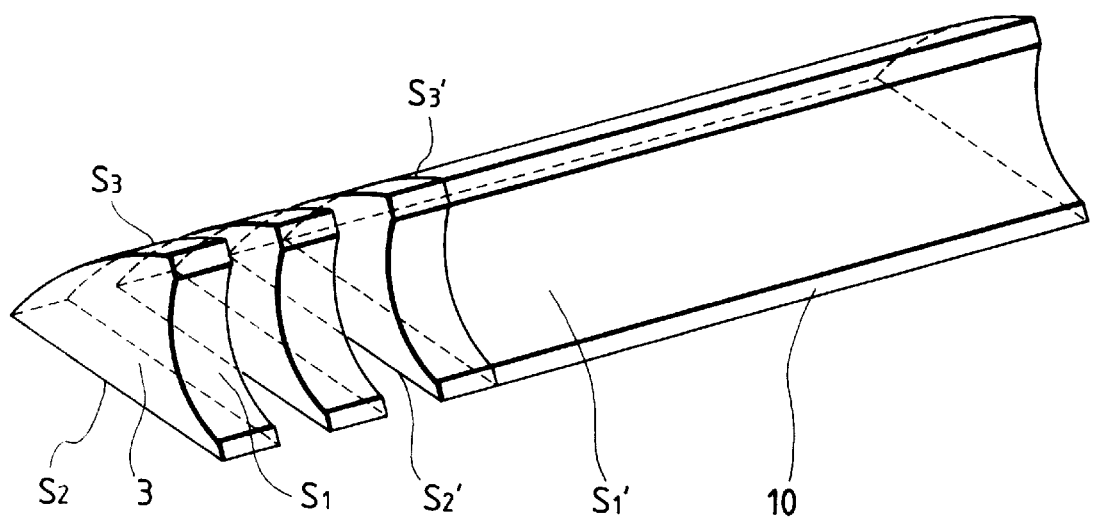
FIG. 2 is a perspective view showing how the rotating lens mirror to be used in the present invention is prepared.

Examples that attain the first object of the present invention are described below in detail. FIGS. 1 to 6 depict a beam scanning apparatus according to a typical example of the present invention. A beam issuing from a semiconductor laser 1 is collimated by means of a collimator lens 2. The beam is incident on the entrance face $S_1$ of a rotating lens mirror 3 working as an optical element; the beam is then reflected by the reflecting face $S_2$ of the lens mirror and emerges therefrom through the exit face $S_3$. The entrance face $S_1$ and the exit face $S_3$ are set in such a way that the beam targeting the center of scanning will pass through those faces in a normal direction; on the other hand, the reflecting face $S_2$ is set in such a way that the beam targeting the center of scanning will fall on the reflecting face $S_2$ at an angle of 45°. The entrance face $S_1$ is a cylindrical surface that has power only in the main scanning direction (i.e., the direction in which a beam spot scans an image plane) and which is concave in a section taken in the main scanning direction; the reflecting face $S_2$ is a flat plane; and the exit face $S_3$ is a cylindrical surface that has power only in the main scanning direction and which is convex in a section taken in the main scanning direction. Hence, both entrance face $S_1$ and exit face $S_3$ have power only in the main scanning direction. The axis of rotation 0 of lens mirror 3 is included in the reflecting face $S_2$ and passes through the point of reflection of the beam targeting the center of scanning. It should be noted here that the optical axis through the entrance face $S_1$ of the rotating lens mirror to be used in the present invention and that through the exit face $S_3$ shall each coincide with the optical path of the beam targeting the center of scanning. The beam is deflected in response to the rotation of the lens mirror 3. The deflected beam passes through an imaging lens 4 to form a spot on the image plane 5.

To produce a scanning apparatus capable of high resolution, it is necessary to improve the imaging performance using an optical element of high precision; if the optical element is a lens, it is desirably manufactured by grinding and polishing a glass material since this provides ease in assuring high surface precision and consistent optical characteristics. The rotating lens mirror to be used in the scanning apparatus of the present invention is such that the entrance and exit faces are each a cylindrical surface having curvature only in the main scanning direction whereas the reflecting face is a flat plane. A method of manufacturing the rotating lens mirror is shown schematically in FIG. 2; first, a three-faced column 10 elongated in the direction of generatrix is prepared from glass; the column consists of a flat plane $S_2'$ that will eventually define the reflecting face $S_2$, as well as two cylindrical surfaces $S_1'$ and $S_3'$ the generatrices of which are parallel to each other and which will eventually define the entrance face $S_1$ and the exit face $S_3$, respectively; then, the prepared column is cut in specified thicknesses through planes normal to the generatrices. This method has the advantage that the optical faces of a number of rotating lens mirrors can be ground and polished at a time and that the conventional process of manufacturing cylindrical lenses can be adopted as such, thereby accomplishing significant reduction in the cost of the rotating lens mirror. As a further advantage, the use of cylindrical surfaces eliminates the need for controlling the precision in the tilting of the surfaces in the direction of their generatrices, thereby providing ease in lens manufacture and improving the geometric precision of lens shape. The reflecting face of the lens mirror may be coated with a reflecting film such as a thin aluminum film by evaporation or some other suitable technique. If desired, the angle of beam incidence at the reflecting face may be adjusted to be greater than the critical value so as to accomplish the total reflection of the beam and this eliminates the need for providing the reflecting film. It is also possible to manufacture the three-faced column 10 by molding a resin material and this contributes to a further reduction in the cost of the rotating lens mirror.

If only one rotating lens mirror is used, one scan cycle is performed in response to one revolution of the motor. It should, however, be noted that more than one lens mirror may be used and in this case more than one scan cycle is performed per revolution of the motor, thereby enabling faster scanning operations. In this alternative case, if any one of the lens mirrors experiences the slightest departure from the symmetry with respect to its axis of rotation, unevenness in the scanning pitch (i.e., the positions of scanning lines formed by the imaging spot are offset in a direction crossing the main scanning direction at right angles, namely, the sub-scanning direction) or unevenness in the scanning position (i.e., the scanning position in the main scanning direction is offset) will occur. To avoid this problem, very close tolerances for symmetry are required; in fact, however, using a plurality of lens mirrors that have been cut from the three-faced column described above is effective in minimizing the differences in geometry between the individual lens mirrors to thereby improve their symmetry with respect to the axis of rotation.

At least one imaging lens element need be used to insure sufficient performance for conventional laser beam printers; however, two or more imaging lens elements may be used to provide better performance. If more than one imaging lens element is to be used, the overall imaging lens system has desirably a positive refractive power. This is because the optical characteristics of the beam scanning apparatus can be improved by generating negative distortion for assuring uniform scanning (at constant speed). In one embodiment, an elongated cylindrical lens having power only in the sub-scanning direction may be provided near the image plane, whereby "attenuated" tilt correcting optics is composed which is characterized by reduced optical magnification in the sub-scanning direction. In another embodiment, a cylindrical lens having power only in the sub-scanning direction may be provided between the collimator lens and the rotating lens mirror so that the beam is focused only in the sub-scanning direction near the reflecting face of the lens mirror to form a line image, whereby "conjugative" tilt correcting optics is composed which is characterized by the conjugate relationship between the reflecting face of the lens mirror and the image plane. The rotating lens mirror to be used in the present invention does not have power in the sub-scanning direction and, hence, even if the entrance and exit faces of the mirror tilt due to the tilting of the latter, the beam deflection by these faces in the sub-scanning direction is negligibly small and tilt correcting optics of high precision can be composed even with the rotating lens mirror. As a further advantage, highly precise and uniform beam scanning can be accomplished without requiring close tolerances for mechanical precision even if more than one rotating lens mirror is employed.

If the axis of rotation of the lens mirror is included in its reflecting face, reference positions for the mounting of that mirror such as the center of rotation and the reflecting face are definite enough to insure that the lens mirror can be mounted on a motor or some other rotating member in an easy and precise manner. If the center of rotation of the lens mirror coincides with the point on the reflecting face at which the beam targeting the center of scanning is reflected by that face, the arrangement of surfaces in the optics will become substantially symmetric with respect to the center of scanning and so will be its optical characteristics such as aberrations. Hence, optics having symmetry with respect to a line that is typified by a spherical lens will suffice to correct aberrational and other characteristics. If desired, two lens mirrors may be provided symmetrically with respect to the center of rotation so that two scan cycles are performed per revolution of the motor; if, in this case, the center of rotation lies in the reflecting face of each lens mirror, the reflecting faces of the respective lens mirrors can be brought into intimate contact with each other, thereby assuring that the two lens mirrors can be mounted with high precision to provide a high degree of symmetry.

Figure 3:
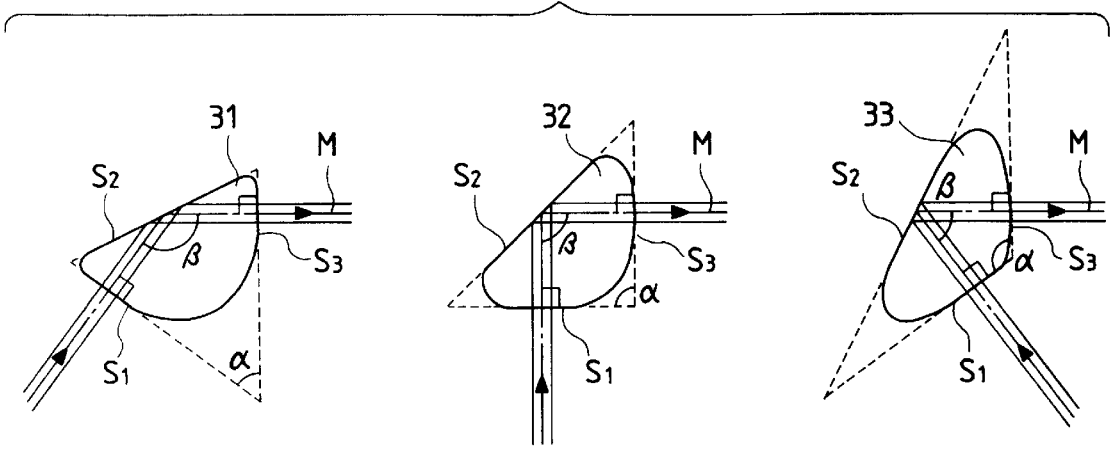
FIG. 3 shows in cross section three geometric forms of the rotating lens mirror in the beam scanning apparatus of the present invention.
Figure 4:
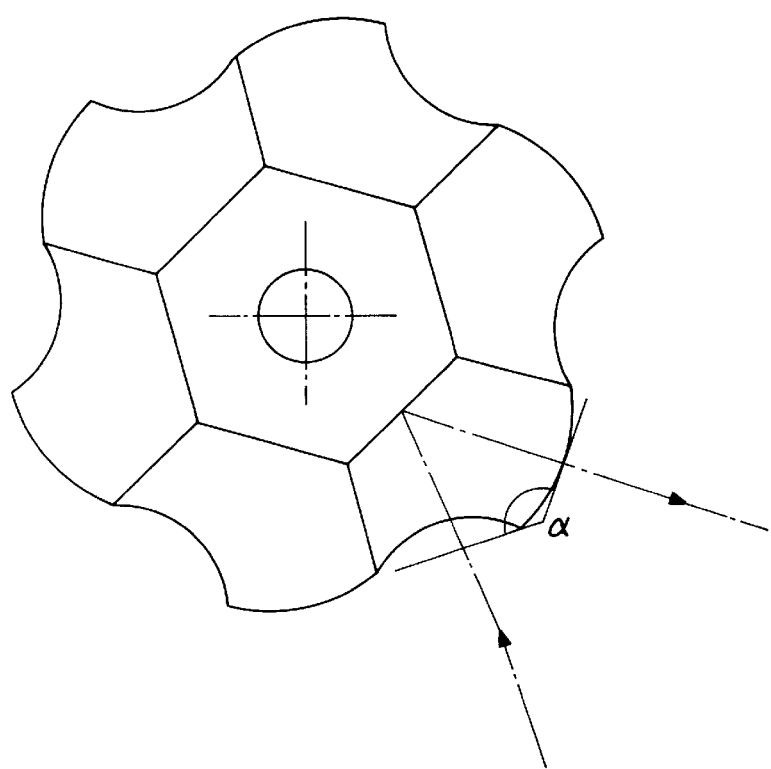
FIG. 4 showing in cross section the case where a plurality of rotating lens mirrors are used in the beam scanning apparatus of the present invention.

FIG. 3 shows three rotating lens mirrors 31, 32 and 33 that have different values of angle α which is formed between the entrance face $S_1$ and the exit face $S_3$ of the lens mirror 3. Angle α is set in accordance with angle β the optical axis M to the image plane 5 forms with the beam issuing from the light source; from the viewpoint of effective aberration correction, angle α is desirably set at such values that the beam targeting the center of scanning will pass through both the entrance face $S_1$ and the exit face $S_3$ in a normal direction as shown in FIG. 3. In this case, greater values of angle α offer the advantage of requiring smaller areas of the reflecting face $S_3$ (see FIG. 3) Further, each of the lens mirrors 31, 32 and 33 is rotated at fast speed and, hence, its apexes are desirably formed as arcs of a circle in order to reduce the whine and the wind loss. It should also be noted that if a plurality of rotating lens mirrors are to be arranged in such a way that they are symmetrical with respect to the axis of rotation the value of angle α is preferably large as shown in FIG. 4 for allowing more lens mirrors to be assembled together.

On the pages that follow, several specific examples of the first aspect of the present invention are described together with their optical specifications and the aberrations that develop in them. In each of those examples, the lens mirror is assumed to rotate by angle 2ω from the start to the end of one scan cycle. Various optical specifications are expressed by the following symbols: $r_i$ for the radius of curvature of an ith surface $S_i$; $d_i$ for the on-axis distance from an ith surface to the next surface; if a surface of interest is cylindrical and has power only in the main scanning direction, the radius of its curvature in the main scanning direction is denoted by $r_{iy}$; if said cylindrical surface has power only in the sub-scanning direction, the radius of its curvature in the sub-scanning direction is denoted by $r_{ix}$; if the surface of interest is toric, the radii of its curvature in the main and sub-scanning directions are denoted by $r_{iy}$ and $r_{ix}$, respectively; if the shape of the surface through a section taken in the main scanning direction is other than an arc of a circle, the aspheric coefficients $K_{iy}$ and $A_{iy}$ are expressed by the following equation:

$$Z_i = \frac{h^2/r_i}{1 + \sqrt{1 - (K_i + 1)(h/T_i)^2}} + A_i h^4$$

where $Z_i$ is the distance by which the point on the aspheric surface where the height from the optical axis is h departs from the plane tangent to the vertex of the aspheric surface; $S_1$, $S_2$ and $S_3$ refer to the entrance face, the reflecting face and the exit face, respectively, of the rotating lens mirror; $n_1$ and $n_2$ each refer to the refractive index of a rotating lens mirror.

In some examples, the data of optical specifications cover a light source, a collimator lens, a cylindrical lens provided between the collimator lens and the rotating lens mirror, a first imaging lens and a second imaging lens. In such examples, the light source is denoted by $S_0$; the entrance and exit faces of the collimator lens are denoted by $S_a$ and $S_b$, respectively; the entrance and exit faces of the cylindrical lens are denoted by $S_c$ and $S_d$, respectively; the entrance and exit faces of the first imaging lens are denoted by $S_e$ and $S_f$, respectively; the entrance and exit faces of the second imaging lens are denoted by $S_g$ and $S_h$, respectively; the refractive indices of the collimator lens, the cylindrical lens, the first imaging lens and the second imaging lens are denoted by $n_a$, $n_c$, $n_e$ and $n_g$, respectively.

Speaking of the graphs plotting aberration curves, curvature of the field that develops in the main scanning direction is expressed by dashed lines and one that develops in the sub-scanning direction is expressed by solid lines. As for scanning linearity, it is usual in the case of an fθ lens to express the departure of the actual image height from the ideal value y=fθ in percentages. However, in the present invention where both the entrance and exit faces of the lens mirror are adapted to rotate, the ideal image height is not equal to fθ and, hence, an equivalent method of presentation is substituted, according to which the departure from the ideal image height Y=ζθ is expressed in percentages with representing the change in image height with the angle of rotation of the lens mirror for paraxial rays. The design wavelength is set at 780 nm in all examples that follow.

EXAMPLE 1

Example 1 relates to a system containing not only the rotating lens mirror but also an imaging lens that is a single toric lens element. Details of this system are given below.

Figure 5A:
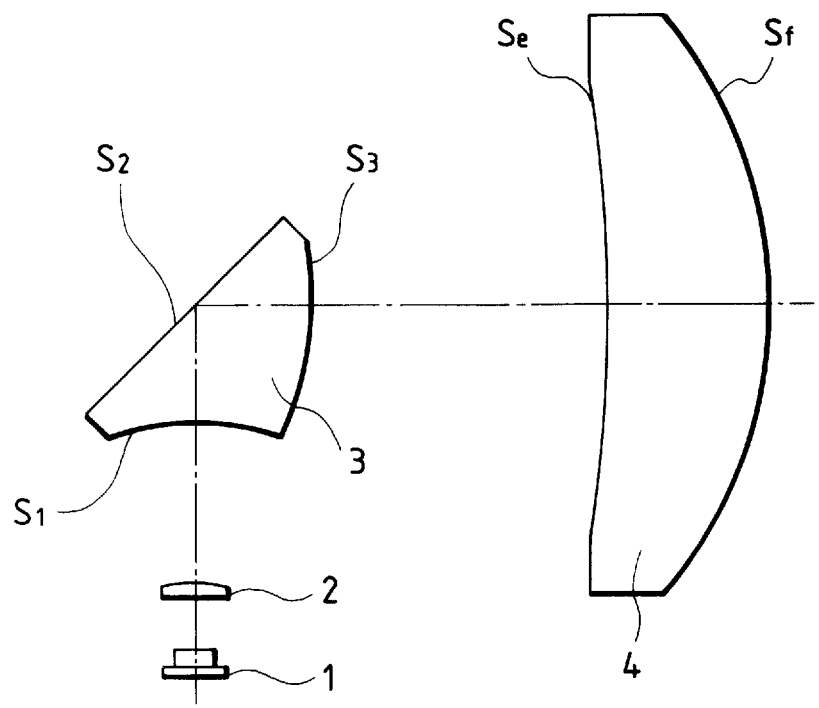
FIG. 5(a) is a cross-sectional view of the on-axis components of the system of Example 1.
Figure 5B:
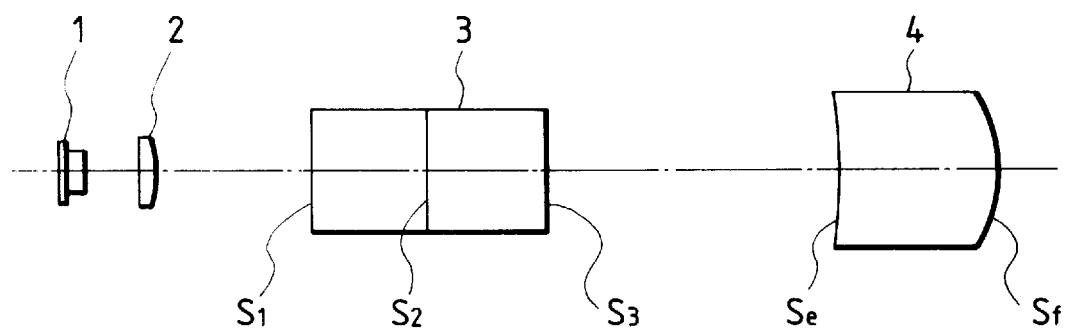
FIG. 5(b) is a side view of the on-axis components as expanded along the optical axis.
Figure 6:
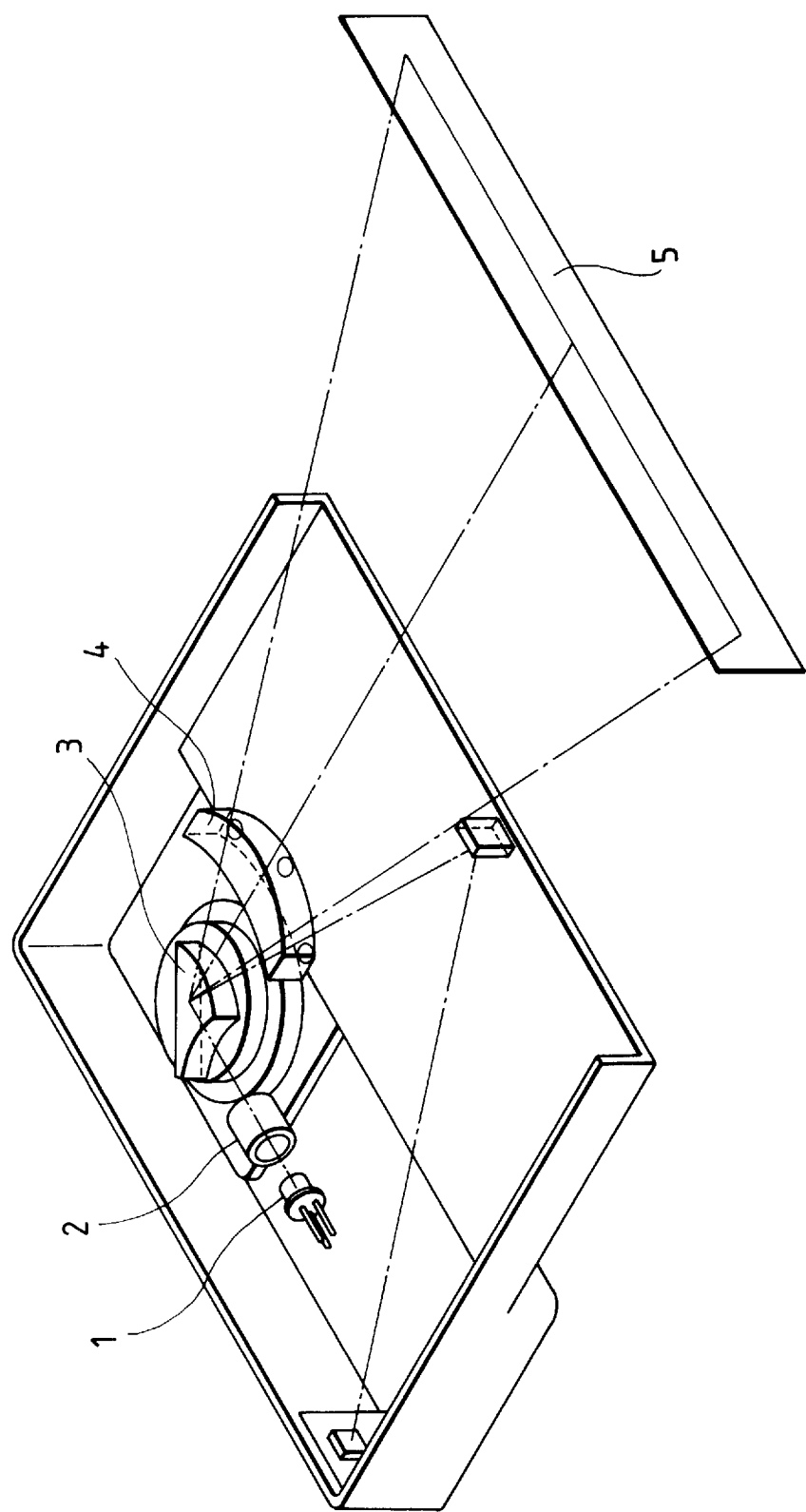
FIG. 6 is a perspective view of the optics of Example 1.

FIG. 5 shows schematically two sections of the system of Example 1; FIG. 5(a) refers to the section taken in the main scanning direction and FIG. 5(b) refers to the section taken in the sub-scanning direction and expanded along the optical axis. FIG. 6 is a perspective view of the beam scanning apparatus constructed in accordance with Example 1 using not only the rotating lens mirror 3 but also the imaging lens 4. The entrance face $S_e$ and the exit face $S_f$ of the imaging lens 4 are each designed as a toric surface. The rotating lens mirror 3 receives the beam that has been collimated by means of the collimator lens 2.

Shown below are the data of typical optical specifications of the system according to Example 1.

| | 2ω = 40.6° | | |
|---|---|---|---|
| Surface | Radius of curvature | Distance between surfaces | Refractive index |
| $S_1$ | $r_{1y} = -36.923$ | $d_1 = 10.000$ | $n_1 = 1.523613$ |
| $S_2$ | $r_2 = \infty$ | $d_2 = 10.000$ | $n_2 = 1.523613$ |
| $S_3$ | $r_{3y} = -40.001$ | $d_3 = 44.961$ | |
| $S_e$ | $r_{ey} = 5459.312$ | $d_e = 15.113$ | $n_e = 1.523613$ |
| | $r_{ex} = -107.027$ | | |
| $S_f$ | $r_{fy} = -97.649$ | $d_f = 150.128$ | |
| | $r_{fx} = -46.315$ | | |
| ↑ | | | |

Figure 7:
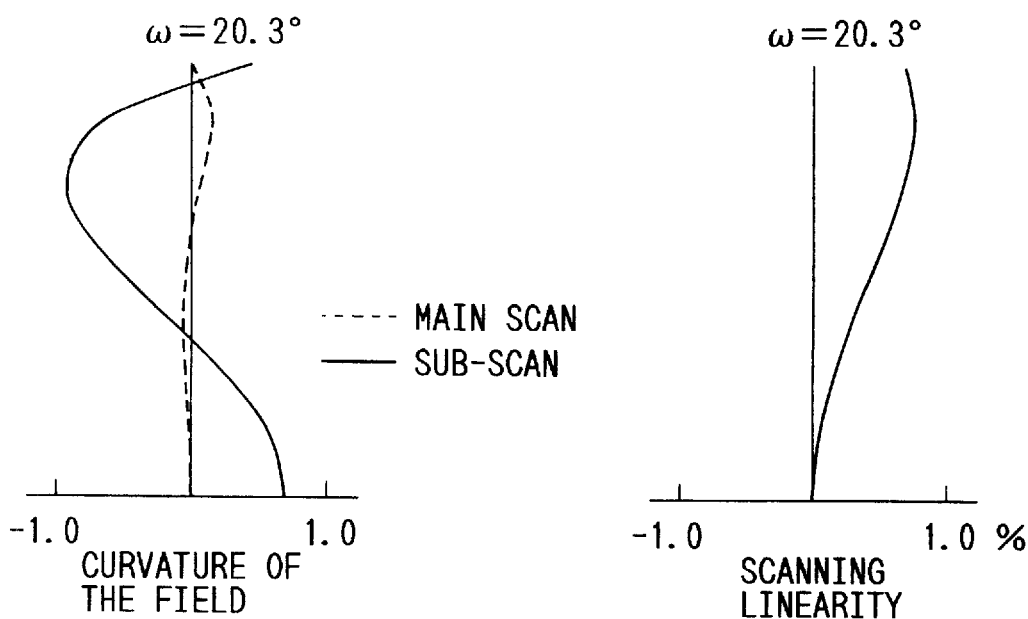
FIG. 7 plots the aberration curves that are obtained in the optics of Example 1.

FIG. 7 plots the aberration curves that are obtained with the system of Example 1; obviously, aberrations are effectively corrected in Example 1.

EXAMPLE 2

Example 2 relates to a system containing not only the rotating lens mirror but also two imaging lens elements. Details of this system are given below.

Figure 8A:
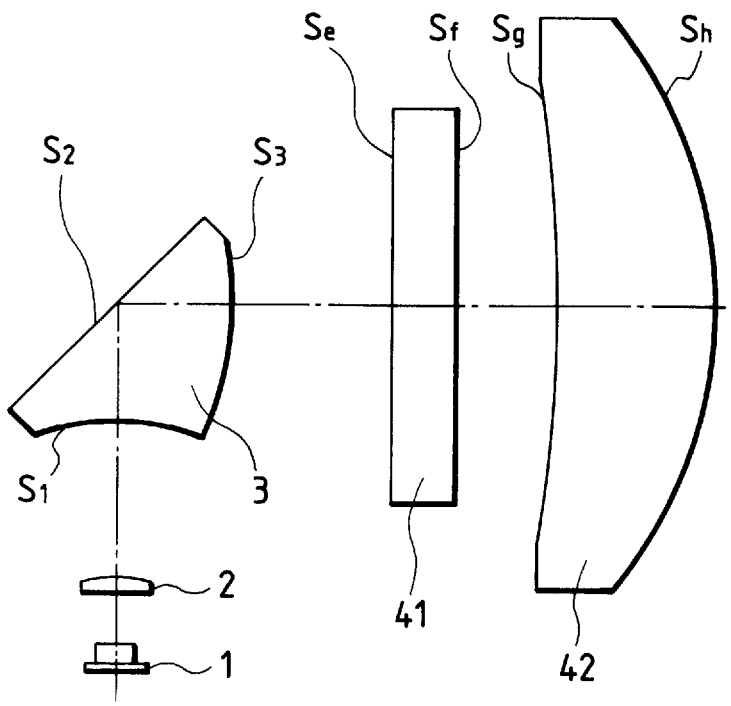
FIG. 8(a) is a cross-sectional view of the on-axis components of the system of Example 2.
Figure 8B:
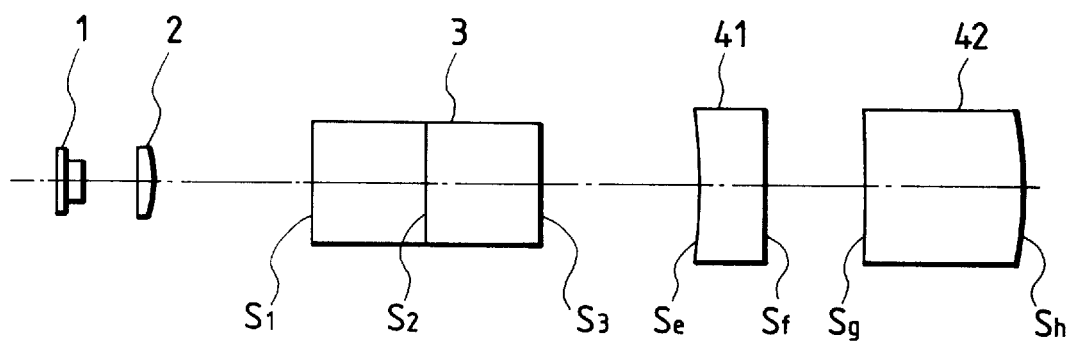
FIG. 8(b) is a side view of the on-axis components as expanded along the optical axis.

FIG. 8 shows schematically two sections of the system of Example 2; FIG. 8(a) refers to the section taken in the main scanning direction and FIG. 8(b) refers to the section taken in the sub-scanning direction and expanded along the optical axis. The system of Example 2 includes not only the rotating lens mirror 3 but also a first imaging lens 41 and a second imaging lens 42; the entrance face $S_e$ of the first imaging lens 41 is a cylindrical surface having power only in the sub-scanning direction, and its exit face $S_f$ is a flat plane. The entrance face $S_g$ and the exit face $S_h$ of the second imaging lens 42 are both comprised as a spherical surface. The rotating lens mirror 3 receives the beam that has been collimated by means of the collimator lens 2.

In Example 2, two imaging lens elements are used and, hence, satisfactory optical characteristics are attained even if the thus composed lens surfaces are neither aspheric surfaces having rotation symmetry nor toric surfaces. Thusly, all lenses can be manufactured at a comparatively low cost even if they are made from glass and, accordingly, precise and consistent scanning optics can be composed at low cost with the characteristics of the glass being exploited to the fullest extent.

Shown below are the data of typical optical specifications of the system according to Example 2.

| | $2\omega = 32.2°$ | | |
|---|---|---|---|
| Surface | Radius of curvature | Distance between surfaces | Refractive index |
| $S_1$ | $r_{1y} = -25.208$ | $d_1 = 10.000$ | $n_1 = 1.523613$ |
| $S_2$ | $r_2 = \infty$ | $d_2 = 10.000$ | $n_2 = 1.523613$ |
| $S_3$ | $r_{3y} = -41.999$ | $d_3 = 10.000$ | |
| $S_e$ | $r_{ex} = -138.125$ | $d_e = 3.809$ | $n_e = 1.511187$ |
| $S_f$ | $r_f = \infty$ | $d_f = 2.828$ | |
| $S_g$ | $r_g = -276.526$ | $d_g = 8.000$ | $n_g = 1.785668$ |
| $S_h$ ↑ | $r_h = -73.245$ | $d_h = 225.363$ | |

Figure 9:
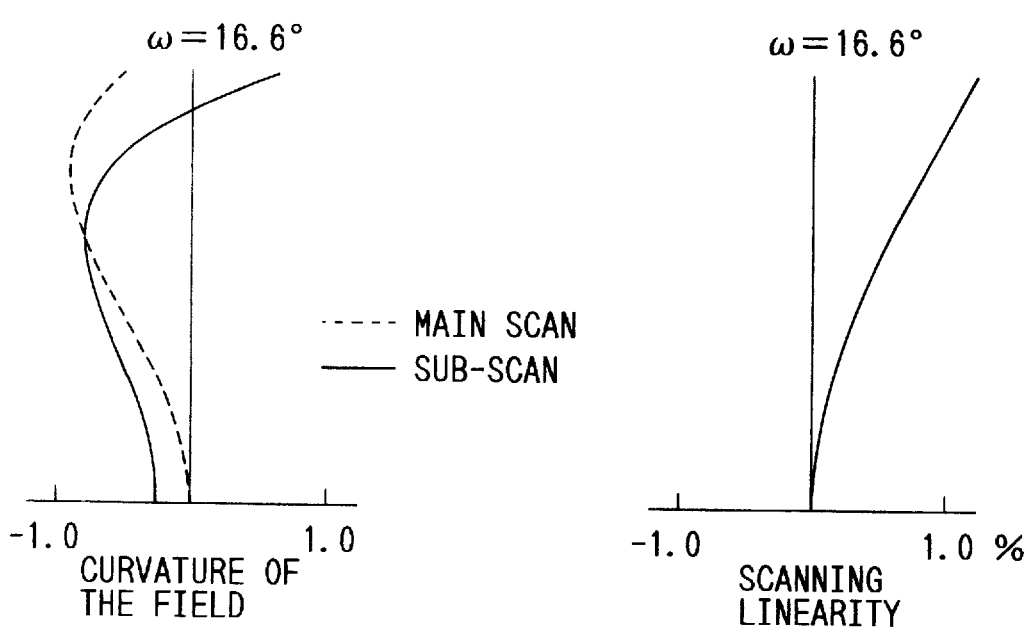
FIG. 9 plots the aberration curves that are obtained in the optics of Example 2.

FIG. 9 plots the aberration curves that are obtained with the system of Example 2; obviously, aberrations are corrected as effectively as in Example 1.

EXAMPLE 3

Example 3 relates to a system containing not only the rotating lens mirror and the imaging lens but also another (second) imaging lens that is a cylindrical lens having power only in the sub-scanning direction and which is provided near the image plane. Details of this system are given below.

Figure 10A:
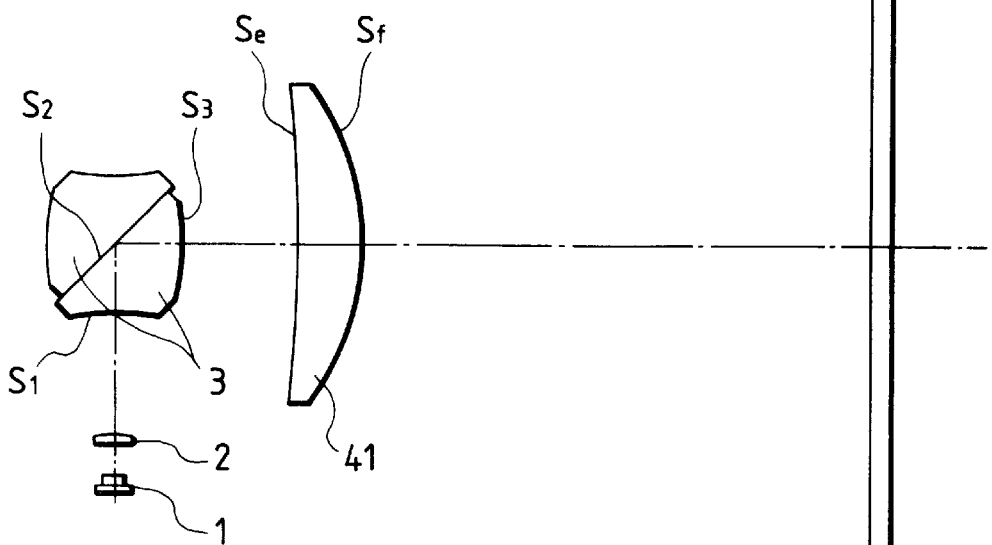
FIG. 10(a) is a cross-sectional view of the on-axis components of the system of Example 3.
Figure 10B:
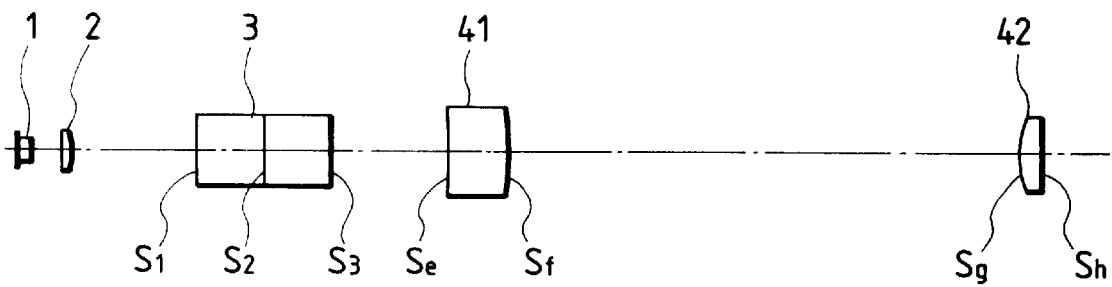
FIG. 10(b) is a side view of the on-axis components as expanded along the optical axis.

FIG. 10 shows schematically two sections of the system of Example 3; FIG. 10(a) refers to the section taken in the main scanning direction and FIG. 10(b) refers to the section taken in the sub-scanning direction and expanded along the optical axis. In Example 3, two rotating lens mirrors 3 of identical shape are arranged symmetrically with respect to the axis of rotation in such a way that their reflecting faces $S_2$ contact each other in a back-to-back relationship. The system of Example 3 includes not only the rotating lens mirrors 3 but also the first imaging lens 41 and the second imaging lens 42; the entrance face $S_e$ and the exit face $S_f$ of the first imaging lens 41 are both spherical; the entrance face $S_g$ of the second imaging lens 42 is a cylindrical surface having power only in the sub-scanning direction, and its exit face $S_h$ is a flat plane. The rotating lens mirrors 3 receive the beam that has been collimated by means of the collimator lens 2.

In Example 3, the second imaging lens 42 which is an elongated cylindrical lens having power only in the sub-scanning direction is provided near the image plane, whereby "attenuating" tilt correcting optics is composed which is characterized by reduced optical magnification in the sub-scanning direction.

Shown below are the data of typical optical specifications of the system according to Example 3.

| | $2\omega = 40.2°$ | | |
|---|---|---|---|
| Surface | Radius of curvature | Distance between surfaces | Refractive index |
| $S_1$ | $r_{1y} = -30.443$ | $d_1 = 10.000$ | $n_1 = 1.523613$ |
| $S_2$ | $r_2 = \infty$ | $d_2 = 10.000$ | $n_2 = 1.523613$ |
| $S_3$ | $r_{3y} = -76.901$ | $d_3 = 10.000$ | |
| $S_e$ | $r_e = -205.050$ | $d_e = 7.866$ | $n_e = 1.523613$ |
| $S_f$ | $r_f = -37.180$ | $d_f = 169.000$ | |
| $S_g$ | $r_{gx} = 10.000$ | $d_g = 3.000$ | $n_g = 1.511176$ |
| $S_h$ ↑ | $r_h = \infty$ | $d_h = 20.853$ | |

Figure 11:
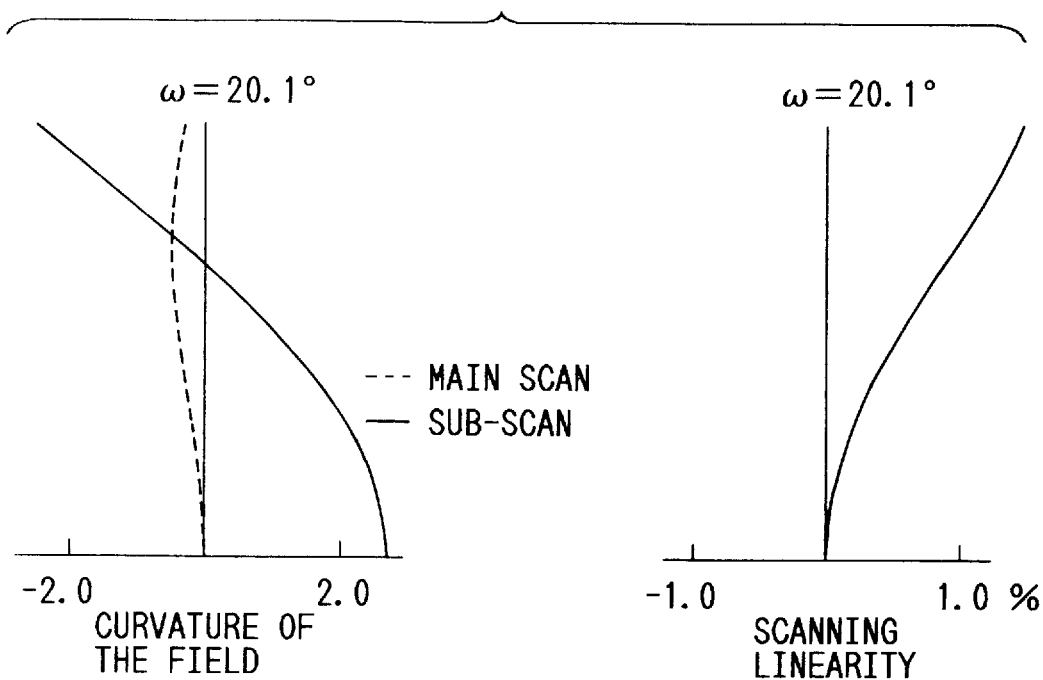
FIG. 11 plots the aberration curves that are obtained in the optics of Example 3.

FIG. 11 plots the aberration curves that are obtained with the system of Example 3.

In a modified version of Example 3, the second imaging lens 42 which is an elongated cylindrical lens may be curved in such a way that the distance to the image plane 5 will vary between the center of scanning and either edge thereof; this modification is effective in further improving the imaging performance of the optics.

EXAMPLE 4

Example 4 relates to a system containing not only the rotating lens mirror but also the first imaging lens which is a cylindrical lens having power only in the main scanning direction and the second imaging lens which is a cylindrical lens having power only in the sub-scanning direction and which is provided near the image plane. Details of this system are given below.

Figure 12A:
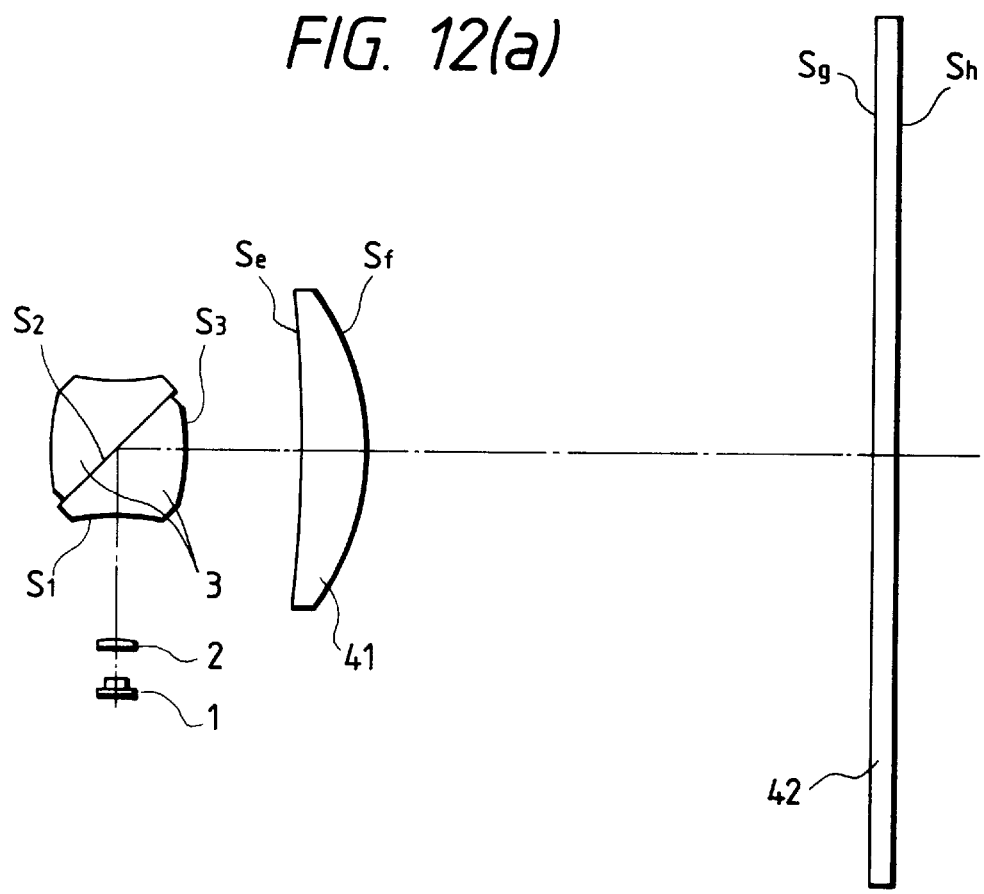
FIG. 12(a) is a cross-sectional view of the on-axis components of the system of Example 4.
Figure 12B:
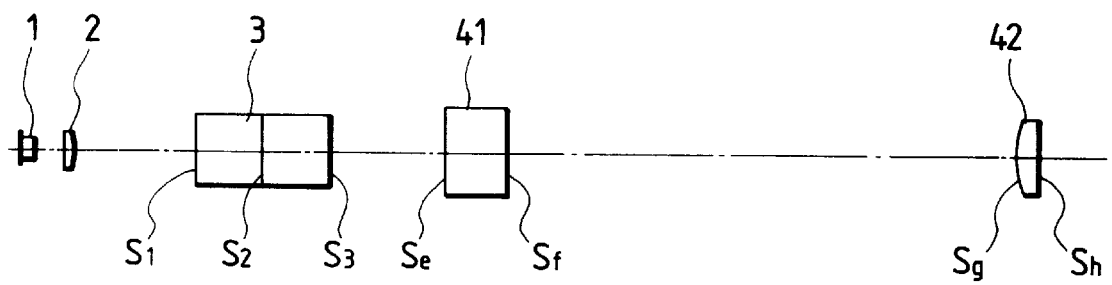
FIG. 12(b) is a side view of the on-axis components as expanded along the optical axis.

FIG. 12 shows schematically two sections of the system of Example 4; FIG. 12(a) refers to the section taken in the main scanning direction and FIG. 12(b) refers to the section taken in the sub-scanning direction and expanded along the optical axis. In Example 4, two rotating lens mirrors 3 of identical shape are arranged symmetrically with respect to the axis of rotation in such a way that their reflecting faces $S_2$ contact each other in a back-to-back relationship. The system of Example 4 includes not only the rotating lens mirrors 3 but also the first imaging lens 41 and the second imaging lens 42; the entrance face $S_e$ and the exit face $S_f$ of the first imaging lens 41 are both a cylindrical surface having power only in the main scanning surface; the entrance face $S_g$ of the second imaging lens 42 is a cylindrical surface having power only in the sub-scanning direction; and its exit face $S_h$ is comprised as a flat plane. The rotating lens mirrors 3 receive the beam that has been collimated by means of the collimator lens 2.

In Example 4, the second imaging lens 42 which is an elongated cylindrical lens having power only in the sub-scanning direction is provided near the image plane, whereby "attenuating" tilt correcting optics is composed which is characterized by reduced optical magnification in the sub-scanning direction. In addition, the optical magnification that is achieved in the sub-scanning direction is lower than in the system of Example 3 which uses the imaging lens 41 having no power in the sub-scanning direction and, hence, the optics is capable of more effective tilt correction, as accompanied by good results in the correction of aberrations. Shown below are the data of typical optical specifications of the system according to Example 4.

| | 2ω = 39.8° | | |
|---|---|---|---|
| Surface | Radius of curvature | Distance between surfaces | Refractive index |
| $S_1$ | $r_{1y} = -28.882$ | $d_1 = 10.000$ | $n_1 = 1.523613$ |
| $S_2$ | $r_2 = \infty$ | $d_2 = 10.000$ | $n_2 = 1.523613$ |
| $S_3$ | $r_{3y} = -42.498$ | $d_3 = 20.000$ | |
| $S_e$ | $r_{ey} = -809.291$ | $d_e = 9.057$ | $n_e = 1.523613$ |
| $S_f$ | $r_{fy} = -62.586$ | $d_f = 162.400$ | |
| $S_g$ | $r_{gx} = 10.000$ | $d_g = 3.000$ | $n_g = 1.511176$ |
| $S_h$ | $r_h = \infty$ | $d_h = 16.107$ | |
| ↑ | | | |

Figure 13:
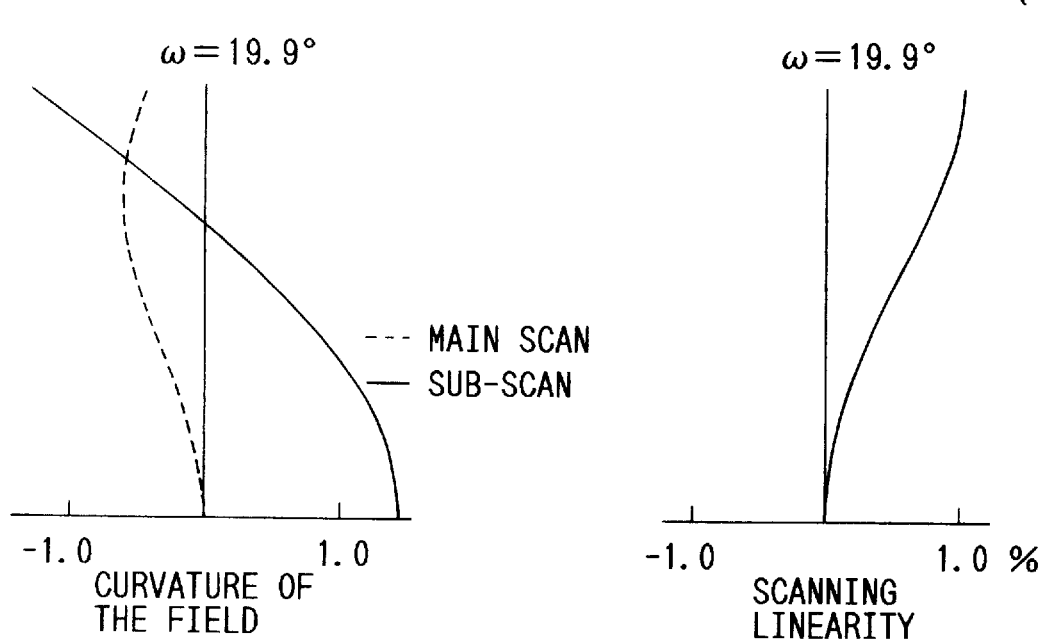
FIG. 13 plots the aberration curves that are obtained in the optics of Example 4.

FIG. 13 plots the aberration curves that are obtained with the system of Example 4; obviously, efficient aberration correction is possible in Example 4.

In a modified version of Example 4, the second imaging lens 42 which is an elongated cylindrical lens may be curved in such a way that the distance to the image plane 5 will vary between the center of scanning and either edge thereof; this modification is effective in further improving the imaging performance of the optics.

EXAMPLE 5

Example 5 relates to a system containing not only the rotating lens mirror and the imaging lens but also a cylindrical lens that has power only in the sub-scanning direction and which is provided ahead of the rotating lens mirror. Details of this system are given below.

Figure 14A:
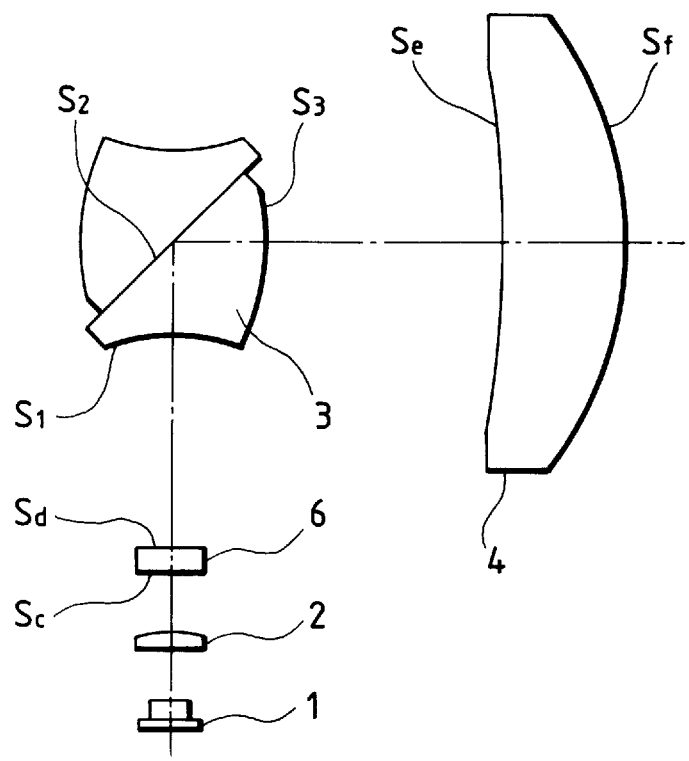
FIG. 14(a) is a cross-sectional view of the on-axis components of the system of Example 5.
Figure 14B:
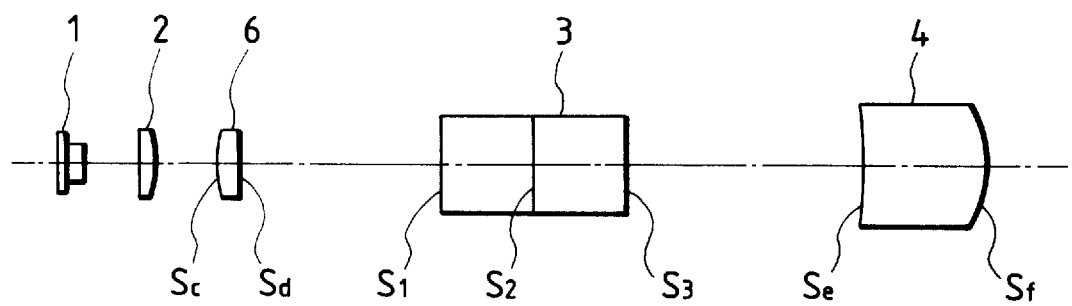
FIG. 14(b) is a side view of the on-axis components as expanded along the optical axis.

FIG. 14 shows schematically two sections of the system of Example 5; FIG. 14(a) refers to the section taken in the main scanning direction and FIG. 14(b) refers to the section taken in the sub-scanning direction and expanded along the optical axis. In Example 5, two rotating lens mirrors 3 of identical shape are arranged symmetrically with respect to the axis of rotation in such a way that their reflecting faces $S_2$ contact each other in a back-to-back relationship. The system of Example 5 includes not only the rotating lens mirrors 3 but also a cylindrical lens 6 provided between the collimator lens 2 and the assembly of lens mirrors 3, as well as the imaging lens 4. The entrance face $S_c$ of the cylindrical lens 6 is a cylindrical surface having power only in the sub-scanning direction and its exit face $S_d$ is a flat plane; the entrance face $S_e$ and the exit face $S_f$ of the imaging lens 4 are each comprised as a toric surface. The cylindrical lens 6 receives the beam that has been collimated by means of the collimator lens 2.

In Example 5, the cylindrical lens 6 is provided ahead of the assembly of rotating lens mirrors 3 and the beam emerging from the collimator lens 2 is focused only in the sub-scanning direction near the reflecting face $S_2$ of each contacting lens mirror 3 to form a line image, thereby constructing "conjugative" tilt correcting optics in which each of the reflecting faces $S_2$ and the image plane 5 are conjugative with each other in the section taken in the sub-scanning direction. This optics is capable of precise optical scanning which is substantially free from unevenness in the scanning pitch efficiency.

Shown below are the data of typical optical specifications of the system of Example 5.

| | 2ω = 41.6° | | |
|---|---|---|---|
| Surface | Radius of curvature | Distance between surfaces | Refractive index |
| $S_c$ | $r_{cx} = 30.000$ | $d_c = 3.000$ | $n_c = 1.523613$ |
| $S_d$ | $r_d = \infty$ | $d_d = 48.700$ | |
| $S_1$ | $r_{1y} = -35.749$ | $d_1 = 10.000$ | $n_1 = 1.523613$ |
| $S_2$ | $r_2 = \infty$ | $d_2 = 10.000$ | $n_2 = 1.523613$ |
| $S_3$ | $r_{3y} = -41.074$ | $d_3 = 40.759$ | |
| $S_e$ | $r_{ey} = -1568.43$ | $d_e = 14.952$ | $n_e = 1.523613$ |
| | $r_{ex} = -70.300$ | | |
| $S_f$ | $r_{fy} = -82.457$ | $d_f = 154.288$ | |
| | $r_{fx} = -18.232$ | | |
| ↑ | | | |

Figure 15:
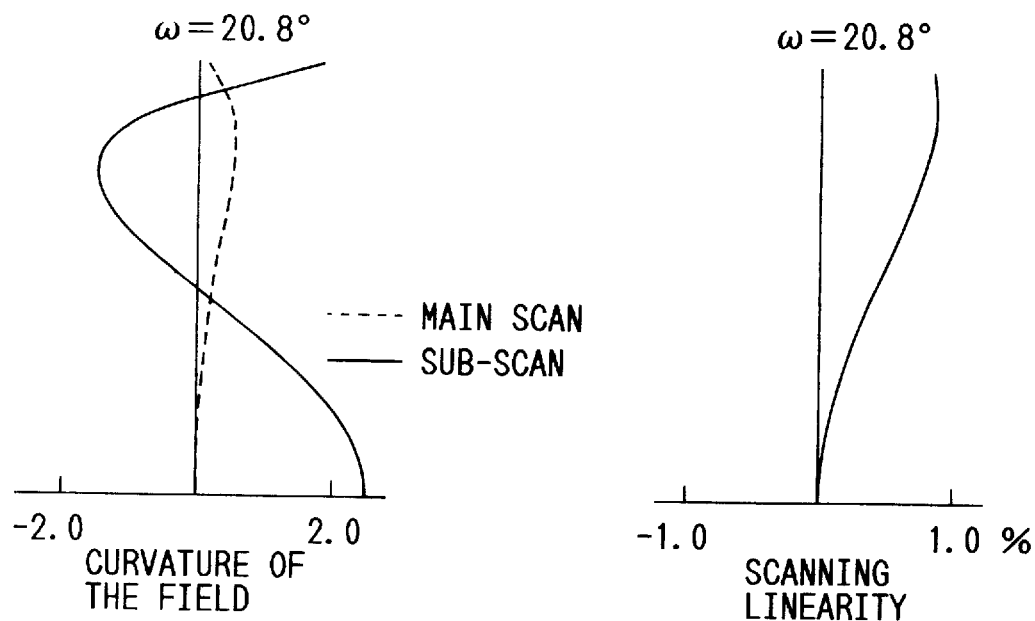
FIG. 15 plots the aberration curves that occur in the optics of Example 5.

FIG. 15 plots the abstract curves that are obtained with the system of Example 5.

EXAMPLE 6

Example 6 relates to a system containing not only the rotating lens mirror and the imaging lens but also a cylindrical lens that has power only in the sub-scanning direction and which is provided ahead of the rotating lens mirror, with converging light being launched into the cylindrical lens. Details of this system are given below.

Figure 16A:
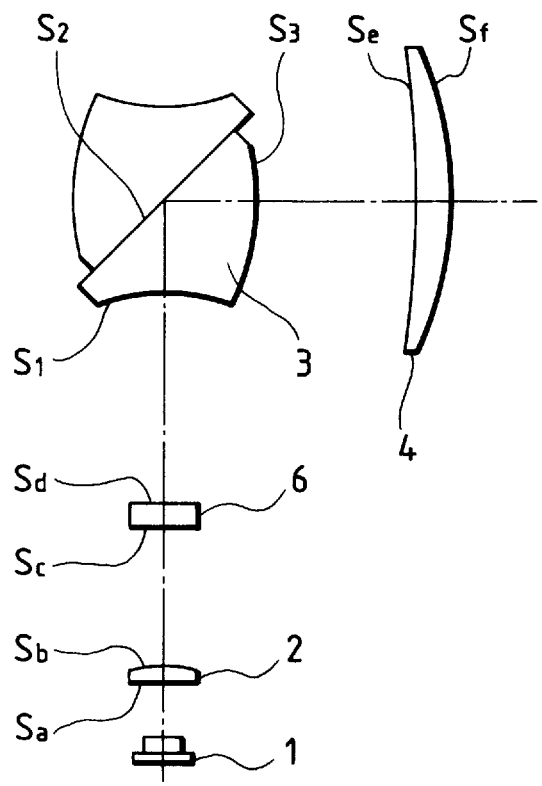
FIG. 16(a) is a cross-sectional view of the on-axis components of the system of Example 6.
Figure 16B:
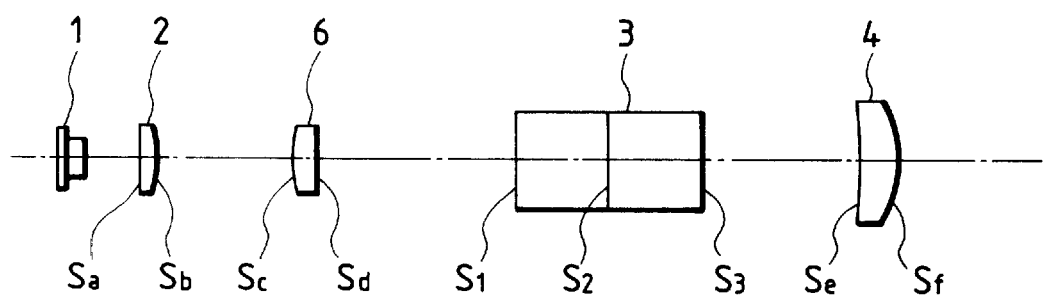
FIG. 16(b) is a side view of the on-axis components as expanded along the optical axis.

FIG. 16 shows schematically two sections of the system of Example 6; FIG. 16(a) refers to the section taken in the main scanning direction and FIG. 16(b) refers to the section taken in the sub-scanning direction and expanded along the optical axis. In Example 6, two rotating lens mirrors 3 of identical shape are arranged symmetrically with respect to the axis of rotation in such a way that their reflecting faces $S_2$ contact each other in a back-to-back relationship. The system of Example 6 includes not only the rotating lens mirrors 3 but also the cylindrical lens 6 provided between the collimator lens 2 and the assembly of rotating lens mirrors 3, as well as the imaging lens 4. The entrance face $S_c$ of the cylindrical lens 6 is a cylindrical surface having power only in the sub-scanning direction and its exit face $S_d$ is a flat plane; the entrance face $S_e$ of the imaging lens 4 is a toric surface such that a section taken in the main scanning direction is other than an arc of a circle, and its exit face $S_f$ is comprised as a toric surface. The beam that issued from the semiconductor laser 1 and which has passed through the collimator lens 2 is not completely parallel but somewhat convergent and the cylindrical lens 6 will receive such a slightly converging light beam.

In Example 6, the cylindrical lens 6 is provided ahead of the assembly of rotating lens mirrors 3 and the beam emerging from the collimator lens 2 is focused only in the sub-scanning direction near the reflecting face $S_2$ of each contacting lens mirror 3 to form a line image, thereby constructing "conjugative" tilt correcting optics in which each of the reflecting faces $S_2$ and the image plane 5 are conjugative with each other in the section taken in the sub-scanning direction. This optics is capable of precise optical scanning which is substantially free from unevenness in the scanning pitch efficiency. Another feature of Example 6 is that a convergent beam is admitted into the cylindrical lens 6 and this is effective in reducing the power of the imaging lens 4 and therefore its thickness by a sufficient degree to lower the cost of its manufacture. This offers a further advantage in the case where the imaging lens 4 is molded from a resin material; that is, the internal distortion and other defects with the resin that occur in the molding operation will cause only small effects on the optical performance of the system and, at the same time, the molding time can be shortened.

Shown below are the data of typical optical specifications of the system of Example 6.

| | ω = 37.6° | | |
|---|---|---|---|
| Surface | Radius of curvature | Distance between surfaces | Refractive index |
| $S_0$ | | $d_0 = 9.395$ | |
| $S_a$ | $r_a = \infty$ | $d_a = 2.000$ | $n_a = 1.523613$ |
| $S_b$ | $r_b = -5.236$ | $d_b = 10.000$ | |
| $S_c$ | $r_c = 30.000$ | $d_c = 3.000$ | $n_c = 1.523613$ |
| $S_d$ | $r_d = \infty$ | $d_d = 32.140$ | |
| $S_1$ | $r_{1y} = -24.390$ | $d_1 = 10.000$ | $n_1 = 1.523613$ |
| $S_2$ | $r_2 = \infty$ | $d_2 = 10.000$ | $n_2 = 1.523613$ |
| $S_3$ | $r_{3y} = -50.000$ | $d_3 = 25.000$ | |
| $S_e$ | $r_{ey} = -100.00$ | $d_e = 5.000$ | $n_e = 1.523613$ |
| | $r_{ex} = -46.950$ | | |
| | $K_{ey} = -3.00000$ | $A_{ey} = 0.10000 \times 10^{-5}$ | |
| $S_f$ | $r_{fy} = -49.972$ | $d_f = 180.000$ | |
| | $r_{fx} = -12.170$ | | |
| ↑ | | | |

Figure 17:
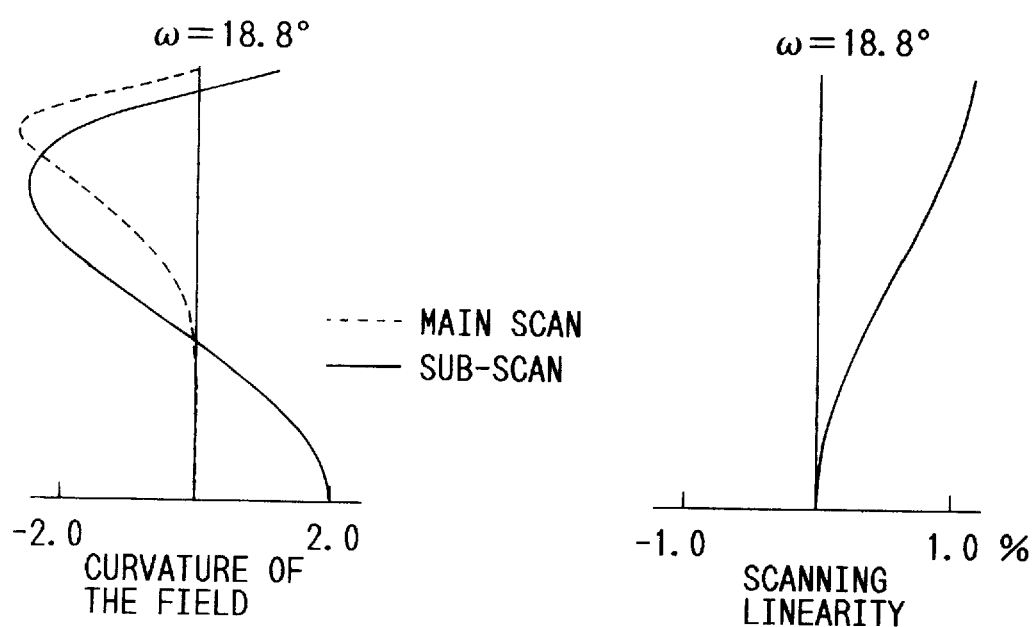
FIG. 17 plots the aberration curves that occur in the optics of Example 6.

FIG. 17 plots the aberration curves that are obtained with the system of Example 6.

EXAMPLE 7

Example 7 relates to a system containing the rotating lens mirror, the cylindrical lens that has power only in the sub-scanning direction and which is provided ahead of the rotating lens mirror, the first imaging lens, and the second imaging lens that is a cylindrical lens having power only in the sub-scanning direction and which is provided near the image plane. Details of this system are given below.

Figure 18A:
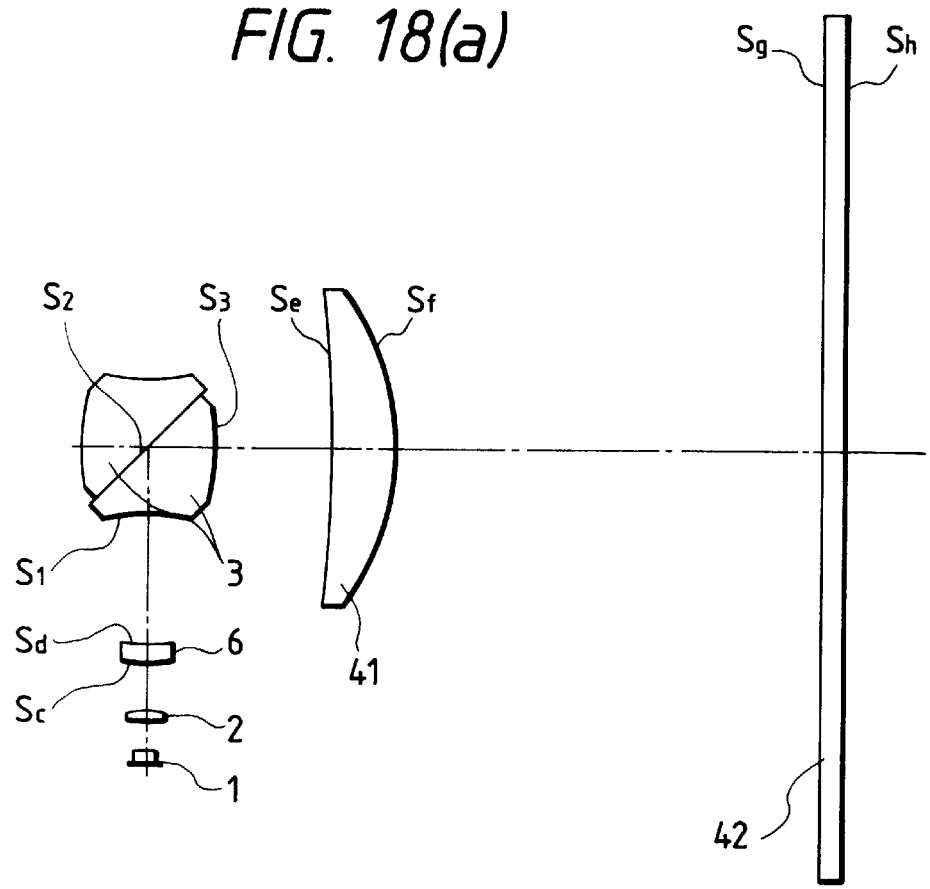
FIG. 18(a) is a cross-sectional view of the on-axis components of the system of Example 7.
Figure 18B:
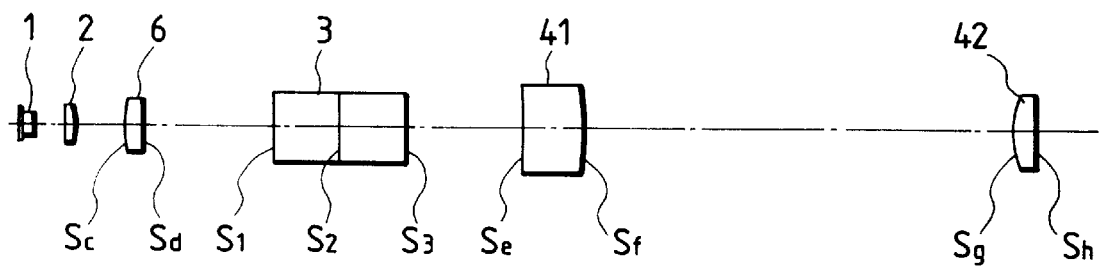
FIG. 18(b) is a side view of the on-axis components as expanded along the optical axis.

FIG. 18 shows schematically two sections of the system of Example 7; FIG. 18(a) refers to the section taken in the main scanning direction and FIG. 18(b) refers to the section taken in the sub-scanning direction and expanded along the optical axis. In Example 7, two rotating lens mirrors 3 of identical shape are arranged symmetrically with respect to the axis of rotation in such a way that their reflecting faces $S_2$ contact each other in a back-to-back relationship. The system of Example 7 includes not only the rotating lens mirrors 3 but also the cylindrical lens 6 provided between the collimator lens 2 and the assembly of rotating lens mirror 3, as well as the first imaging lens 4 and the second imaging lens 42. The entrance face $S_c$ of the cylindrical lens 6 is a cylindrical surface having power only in the sub-scanning direction and its exit face $S_d$ is a flat plane; the entrance face $S_e$ and the exit face $S_f$ of the first imaging lens 41 are both a spherical surface; the entrance face $S_g$ of the second imaging lens 42 is a cylindrical surface having power only in the sub-scanning direction and its exit face $S_h$ is comprised as a flat plane. The cylindrical lens 6 receives the beam that has been collimated by means of the collimator lens 2.

In Example 7, the cylindrical lens 6 is provided ahead of the assembly of rotating lens mirrors 3 and the beam emerging from the collimator lens 2 is focused only in the sub-scanning direction near the reflecting face $S_2$ of each contacting lens mirror 3 to form a line image, thereby constructing "conjugative" tilt correcting optics in which each of the reflecting faces $S_2$ and the image plane 5 are conjugative with each other in the section taken in the sub-scanning direction. This optics is capable of precise optical scanning which is substantially free from unevenness in the scanning pitch efficiency. Another feature of Example 7 is that two imaging lens elements are used and, hence, satisfactory optical characteristics are attained even if the thus composed lens surfaces are neither aspheric surfaces having rotation symmetry nor toric surfaces. Thusly, all lenses can be manufactured at a comparatively low cost even if they are made from glass and, accordingly, precise and consistent scanning optics can be composed at low cost with the characteristics of the glass being exploited to the fullest extent.

Shown below are the data of typical optical specifications of the system according to Example 7.

| | ω = 19.9 | | |
|---|---|---|---|
| Surface | Radius of curvature | Distance between surfaces | Refractive index |
| $S_c$ | $r_{cx} = 30.000$ | $d_c = 3.000$ | $n_c = 1.523613$ |
| $S_d$ | $r_d = \infty$ | $d_d = 48.700$ | |
| $S_1$ | $r_{1y} = -28.882$ | $d_1 = 10.000$ | $n_1 = 1.523613$ |
| $S_2$ | $r_2 = \infty$ | $d_2 = 10.000$ | $n_2 = 1.523613$ |
| $S_3$ | $r_{3y} = -42.498$ | $d_3 = 20.000$ | |
| $S_e$ | $r_e = -809.291$ | $d_e = 9.057$ | $n_e = 1.523613$ |
| $S_f$ | $r_f = -62.586$ | $d_f = 160.489$ | |
| $S_g$ | $r_{gx} = 10.000$ | $d_g = 3.000$ | $n_g = 1.511173$ |
| $S_h$ | $r_h = \infty$ | $d_h = 17.454$ | |
| ↑ | | | |

Figure 19:
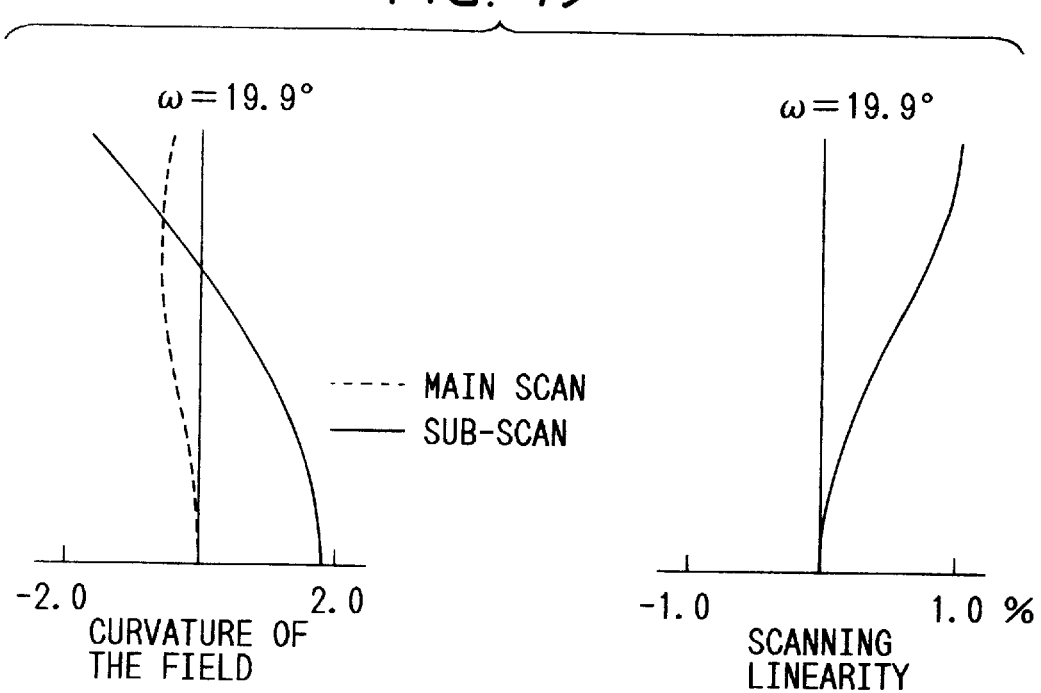
FIG. 19 plots the aberration curves that are obtained in the optics of Example 7.

FIG. 19 plots the aberration curves that are obtained with the system of Example 7; obviously, aberrations are corrected as effectively as in Examples 5 and 6.

In a modified version of Example 7, the second imaging lens 42 which is an elongated cylindrical lens may be curved in such a way that the distance to the image plane 5 will vary between the center of scanning and either edge thereof; this modification is effective in further improving the imaging performance of the optics.

The foregoing description of Examples 1 to 7 assumes that the rotating lens mirror or mirrors rotate at constant speed but it should be understood that those examples can also be easily implemented in other cases such as where the lens mirror or mirrors are subjected to sinusoidal oscillations around the axis of rotation. Examples 1 to 7 are designed for operation at a specified wavelength but it should also be understood that only slight modifications are necessary to attain comparable results with beams in a broad spectrum of wavelengths including the visible range, such as ir, uv and X-rays.

The beam scanning apparatus of the present invention is suitable for use with image recording apparatuses (e.g. laser printers, digital copiers, facsimile equipment and laser scanning displays), image inputting devices (e.g. scanners), or optical mark reading laser scanners and surface inspecting laser scanners.

As described on the foregoing pages, according to the first aspect of the present invention, the rotating lens mirror which is an optical element having a reflecting face, as well as an entrance face and an exit face that have power only in the main scanning direction is caused to rotate and this enables an incident light beam to be deflected for scanning by the optical element per se. Further, the use of a cylindrical surface having power only in the main scanning direction enables the rotating lens mirror to be manufactured from glass with high precision and at low cost.

In a preferred embodiment, two imaging lens elements may be used and, in this case, satisfactory optical characteristics are attained even if the composed lens surfaces are neither aspheric surfaces having rotation symmetry nor toric surfaces. Thusly, all lenses can be manufactured at a comparatively low cost even if they are made from glass and, accordingly, precise and consistent scanning optics can be composed at low cost with the characteristics of the glass being exploited to the fullest extent.

In another preferred embodiment, "attenuating" tilt correcting optics may be composed using a cylindrical lens that has power only in the sub-scanning direction and which is provided near the image plane; alternatively, "conjugative" tilt correcting optics may be composed using a cylindrical lens that has power only in the sub-scanning direction and which is provided ahead of the rotating lens mirror. These optics contribute to the fabrication of a precise beam scanner that is free from the problem of uneven scanning pitches.

Thus, according to the present invention, the number of expensive optical parts that need be used is not only reduced but, at the same time, the precision of optical parts can be increased, whereby the two requirements of a beam scanning apparatus for reduction in size and cost, as well as for higher resolution, can be satisfied simultaneously.

In the next place, several examples that can attain the second object of the present invention are described below.

The basic concept of the optical scanner according to this second aspect of the present invention is that a plurality of lens mirrors are rotated as a unit around one axis of rotation by means of a drive mechanism such as a motor; as a result, an incident light beam will pass through each of the rotating lens mirrors, making it possible to perform more than one scan cycle per revolution of the axis of rotation. If a plurality of rotating lens mirrors are to be used, unevenness in the scanning pitch will occur unavoidably due to the error in the mounting of individual lens mirrors (which is generally referred to as "tilting"); in accordance with the present invention, an optical scanning apparatus that uses a plurality of rotating lens mirrors can be corrected for any unevenness in the scanning pitch by optical means.

Figure 20:
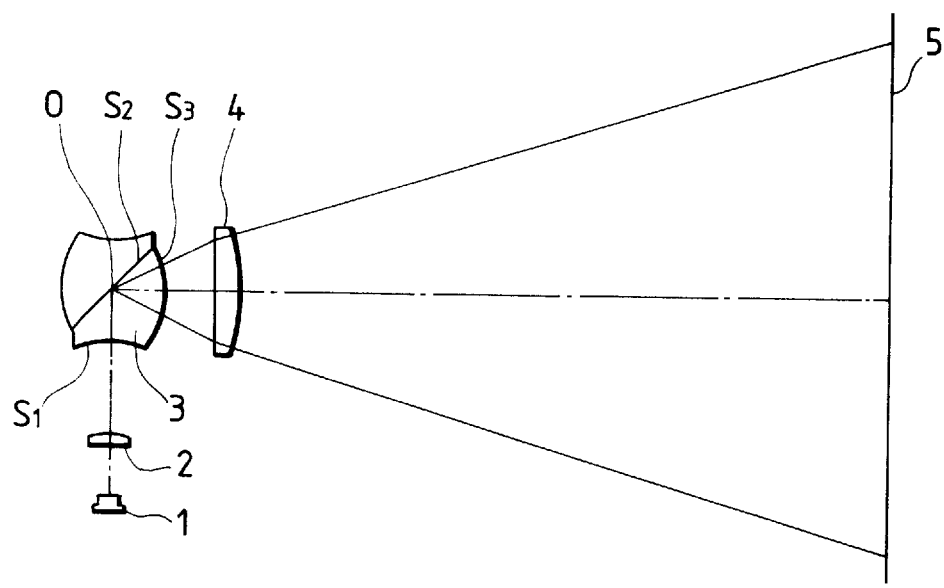
FIG. 20 shows the layout of the scanning optics in the second aspect of the present invention with reference to a cross section taken in the main scanning direction.

FIG. 20 depicts a typical example of a laser scanner that employs the optics of the present invention. A light beam issuing from a semiconductor laser 1 (light source) is collimated by means of a collimator lens 2. The beam is incident on the entrance face $S_1$ of a rotating lens mirror 3; the beam is then reflected by the reflecting face $S_2$ of the lens mirror and emerges therefrom through the exit face $S_3$. The entrance face $S_1$ and the exit face $S_3$ are set in such a way that the beam targeting the center of scanning will pass through those faces in a normal direction; on the other hand, the reflecting face $S_2$ is set in such a way that the beam targeting the center of scanning will fall on the reflecting face $S_2$ at an angle of 90° or less. Two lens mirrors 3 of identical shape are used and they are arranged symmetrically with respect to the axis of rotation 0 in such a way that their reflecting faces $S_2$ contact each other in a back-to-back relationship; the thus assembled lens mirrors 3 will rotate as a unit to perform two optical scan cycles per revolution. The axis of rotation 0 of the mirror assembly is included in each reflecting face $S_2$ and passes through the point of reflection of the beam targeting the center of scanning. The incident light beam is deflected as the assembly of lens mirrors 3 rotates and the deflected beam passes through an imaging lens 4 to form a spot on the image plane 5.

Figure 21:
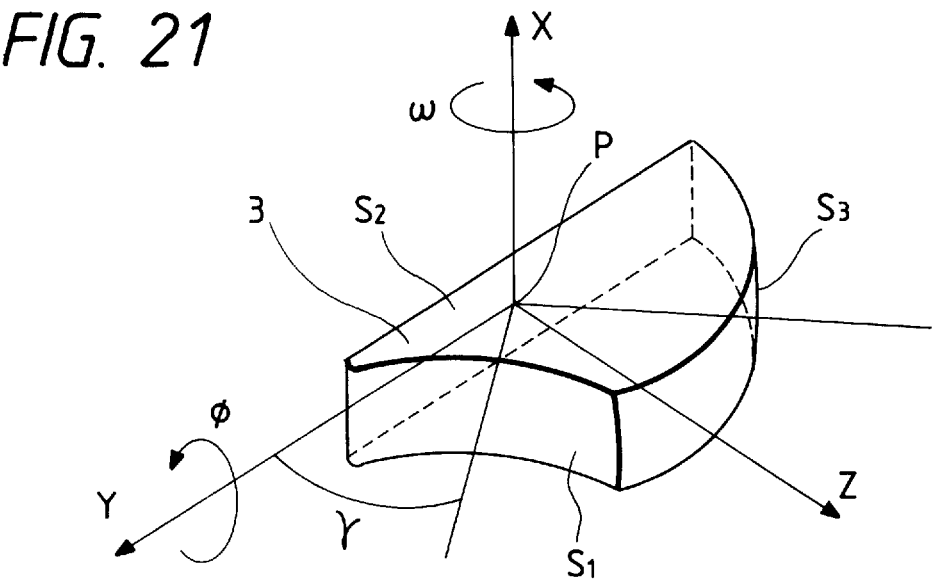
FIG. 21 is a perspective view showing the coordinate system of the rotating lens mirror.

A word must be said here about the tilting of scanning optics that uses a rotating lens mirror. If the tilting to be considered occurs in the rotating lens mirror, one must take into account not only the tilting of its reflecting face but also the tilting of the entrance and exit faces. For the purpose of reviewing the tilting of the rotating lens mirror, let us define the coordinate system X-Y-Z fixed on the lens mirror 3 as illustrated in FIG. 21; the X-axis is a straight line that is normal to the main scanning plane and which is included in the reflecting face $S_2$; the Y-axis is a straight line that is parallel to the main scanning plane and which is included in the reflecting face $S_2$; the Z-axis is a line normal to the reflecting face $S_2$; and the X-axis coincides with the axis of rotation. Assume here that the lens mirror 3 rotates by angle $\omega$ about the X-axis and by angle $\phi$ about the Y-axis; then, as one can see from FIG. 21, the tilting of the lens mirror 3 is biaxial and can occur as a result of rotation about the Y- and Z-axis. In the case of rotation about the Y-axis, entrance face $S_1$, reflecting face $S_2$ and exit face $S_3$ will tilt whereas in the case of rotation about the Z-axis, reflecting face $S_2$ will not tilt and only the entrance face $S_1$ and the exit face $S_3$ will tilt. The deflection of the beam that will occur in the sub-scanning direction as a result of the tilting of the entrance face $S_1$ and the exit face $S_3$ is so small compared to the effect of the tilting of the reflecting face $S_2$ that, when considering the tilting of the lens mirror 3, one only need take into account the tilting about the Y-axis if the tilt angle is not very large. Therefore, in the following discussion of the tilting of the rotating lens mirror, only the tilting about the Y-axis is taken into account and the rotation about the Y-axis is equated as the tilting of the lens mirror, with the angle of rotation being the same as the tilt angle $\phi$.

Figure 22A:
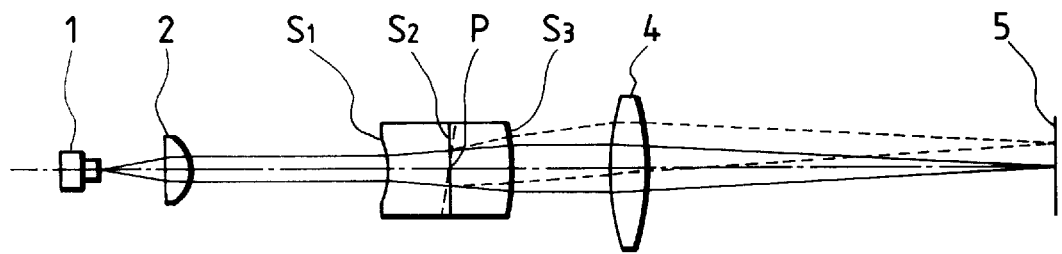
FIG. 22(a) shows the tilting of the rotating lens mirror with reference to a section taken in the sub-scanning direction.
Figure 22B:
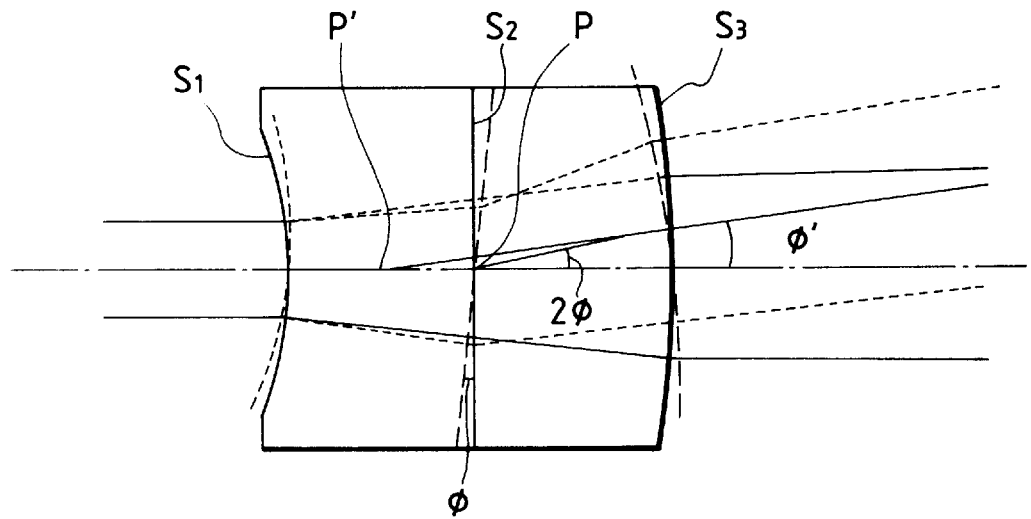
FIG. 22(b) is an enlarged section of the rotating lens mirror.

We then review how the optical path of an incident light beam is affected by the tilting of the rotating lens mirror with reference being made to FIG. 22 in which a section of the scanning optics using the lens mirror as taken in the sub-scanning direction is shown expanded along the optical axis. FIG. 22(a) shows the overall optics and FIG. 22(b) shows enlarged the rotating lens mirror. If the lens mirror 3 rotates about the Y-axis through angle $\phi$, with the center lying at P (i.e., the point of intersection between the reflecting face $S_2$ and the optical axis), both the entrance face $S_1$ and the exit face $S_3$ will also rotate with the center lying at point P. If angle $\phi$ is small enough, the angles by which the optical axis through the entrance face $S_1$ and the exit face $S_3$ rotates with respect to the main scanning plane can be approximated by $\phi \sin \gamma$ and $-\phi \sin \gamma$, respectively, as seen through a section taken in the sub-scanning direction. As is clear from FIG. 21, symbol $\gamma$ refers to the angle the optical axis through the entrance face $S_1$ or exit face $S_3$ forms with the reflecting face $S_2$. As indicated by dashed lines in FIG. 22(b), the beam launched into the tilting lens mirror 3 is deflected consecutively in the sub-scanning direction, first by the tilting of the entrance face $S_1$, then by the tilting of the reflecting face $S_2$ by angle $2\phi$ and finally by the tilting of the exit face $S_3$ before it emerges from the lens mirror 3 forming angle $\phi'$ with respect to the optical axis. Due to the deflecting action of the entrance face $S_1$ and the exit face $S_3$, the beam emerging from the lens mirror 3 will behave as if it were deflected not at point P on the reflecting face $S_2$ but at the point of intersection P' between the principal ray of the beam and the optical axis; thus, point P' is the apparent point of deflection by the tilting lens mirror 3.

Figure 23A:
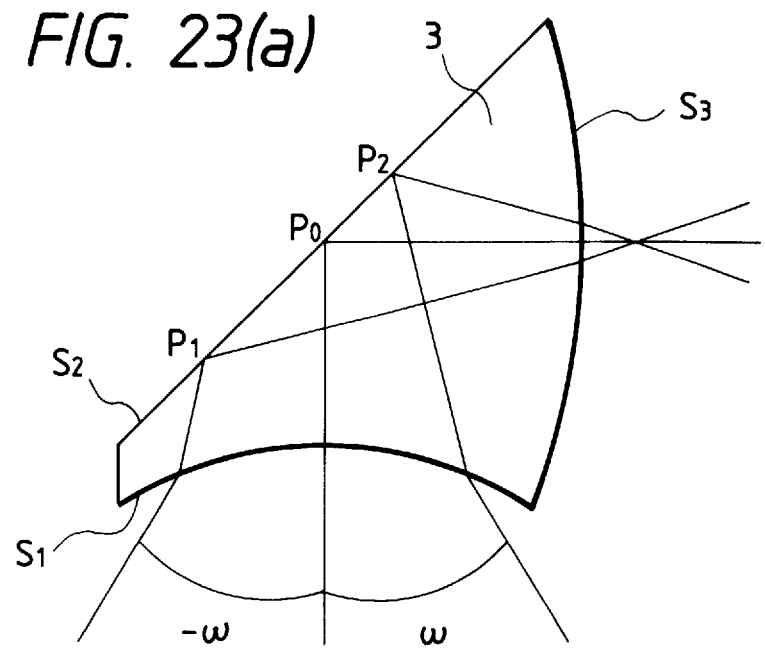
FIG. 23(a) shows the tilting of the lens mirror at various angles of rotation with reference to a cross section taken in the main scanning direction.
Figure 23B:
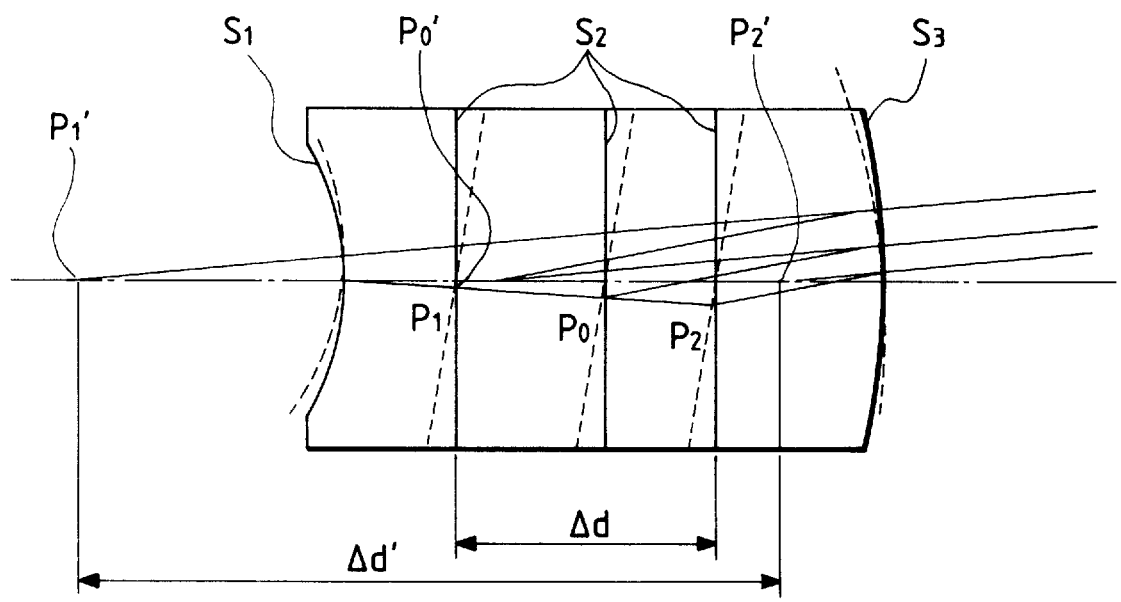
FIG. 23(b) shows the corresponding section taken in the sub-scanning direction.

We then consider the case where the tilting lens mirror rotates about the X-axis to deflect the incident beam for scanning the image plane. FIG. 23(a) is a section of the lens mirror as taken in the main scanning direction and it shows, with the lens mirror fixed, the principal ray of the beam targeting one edge, the center and the other edge of scanning on the image plane as the lens mirror rotates about the X-axis at angles of $-\omega$, 0 and $\omega$. In response to the rotation of the lens mirror 3, the principal ray of the incident beam falls on the entrance face $S_1$ forming angles of $-\omega$, 0 and $\omega$ with the optical axis through the entrance face $S_1$ and the principal ray is deflected accordingly by the reflecting face $S_2$ at points $P_1$, $P_0$ and $P_2$, respectively, and thereafter emerges through the exit face $S_3$. The lens mirror shown in FIG. 23(a) may be cut across a section taken in the sub-scanning direction and expanded along the optical axis; the result is shown in FIG. 23(b), from which one can see that the point of deflection P moves on the optical axis from $P_1$ through $P_0$ to $P_2$ as the angle of rotation of the lens mirror changes from $-\omega$ through zero to $\omega$. As already explained with reference to FIG. 22(b), if the lens mirror 3 tilts, the beam incident on the lens mirror 3 is deflected by the entrance face $S_1$, then deflected by angle $2\phi$ at point $P_1$, $P_0$ or $P_2$ on the reflecting face $S_2$ depending upon the angle of rotation of the lens mirror 3 and finally deflected by the exit face $S_3$ before emergence from the lens mirror 3. The emerging beam will behave as if it were deflected at the tilt point $P_1'$, $P_0'$ or $P_2'$ which are each the point of intersection of its principal ray with the optical axis. Thusly, the point of tilt deflection shifts in response to the rotation of the lens mirror and, as a result, the apparent point of tilt deflection of the beam emerging from the lens mirror will shift greatly in response to its rotation. In the following discussion, such shift of the point of tilt deflection will be referred to as the "displacement of the point of tilt deflection" and the amount of such shift will be expressed as $\Delta d$ (the amount of displacement of the point of tilt deflection); in addition, the amount of shift of the apparent point of tilt deflection of the beam emerging from the lens mirror shall be expressed as $\Delta d'$ (the amount of displacement of the apparent point of tilt deflection).

Figure 42A:
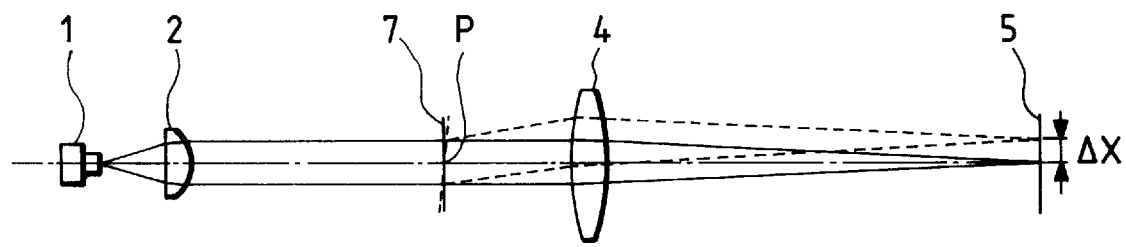
FIGS. 42(a) and (b) are sections, as taken in the sub-scanning directions, that illustrate how an optical scanner using a conventional rotating polygonal mirror is corrected for tilting.
Figure 42B:
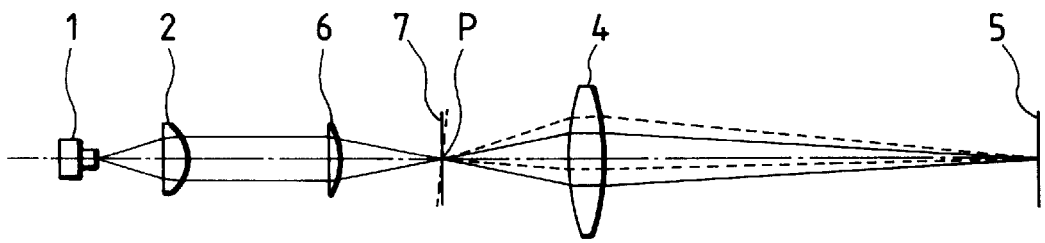

Scanning optics involving such displacements of the point of tilt deflection is unlike the scanning optics using a rotating polygonal mirror which was previously discussed with reference to FIG. 42; stated more specifically, even if such optics is composed as one that satisfies the condition for the conjugative relationship between the light source, deflecting faces and the image plane, the displacement of deflecting faces causes a departure from the conjugate point, thereby making it difficult to assure complete correction of the tilting. In this case, $\Delta X$, or the error in the scanning pitch on the image plane to be scanned is expressed by the following equation:

$$\Delta X = m \cdot \Delta d' \cdot \phi' \quad (1)$$

where $\phi'$ is the angle the principal ray of the beam emerging from the lens mirror forms with the optical axis in a plane crossing the main scanning plane at right angles; m is the optical magnification of the imaging lens in the sub-scanning direction; and $\Delta d'$ is the amount of displacement of the apparent point of tilt deflection of the beam emerging from the lens mirror.

In equation (1), $\phi'$ is primarily dependent on the tilt angle $\phi$ of the lens mirror and the tilt angle $\phi$ in turn is determined by the mechanical precision in the mounting of the lens mirror. It is therefore clear that in order to reduce $\Delta X$, or the error in scanning pitch, by optical means, either $\Delta d'$ (the amount of displacement of the point of tilt deflection) or m (the optical magnification of the imaging lens in the sub-scanning direction) must be reduced. Thus, methods of reducing $\Delta X$ (the error in scanning pitch) in scanning optics using the lens mirror may be classified in two categories, one that depends chiefly on the decrease in $\Delta d$ (the amount of displacement of the point of tilt deflection) and the other that depends chiefly on the decrease in m (the optical magnification of the imaging lens). The two approaches are described below more specifically.

Figure 24A:
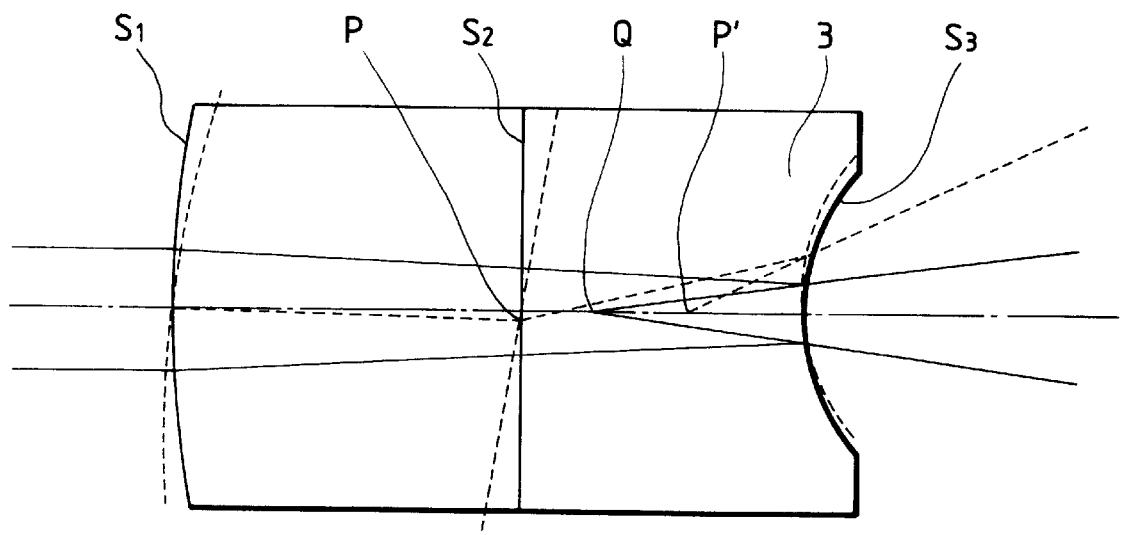
FIGS. 24(a) and (b) depict the first method of tilt correction in the present invention with reference to a section of the rotating lens mirror as taken in the sub-scanning direction.
Figure 24B:
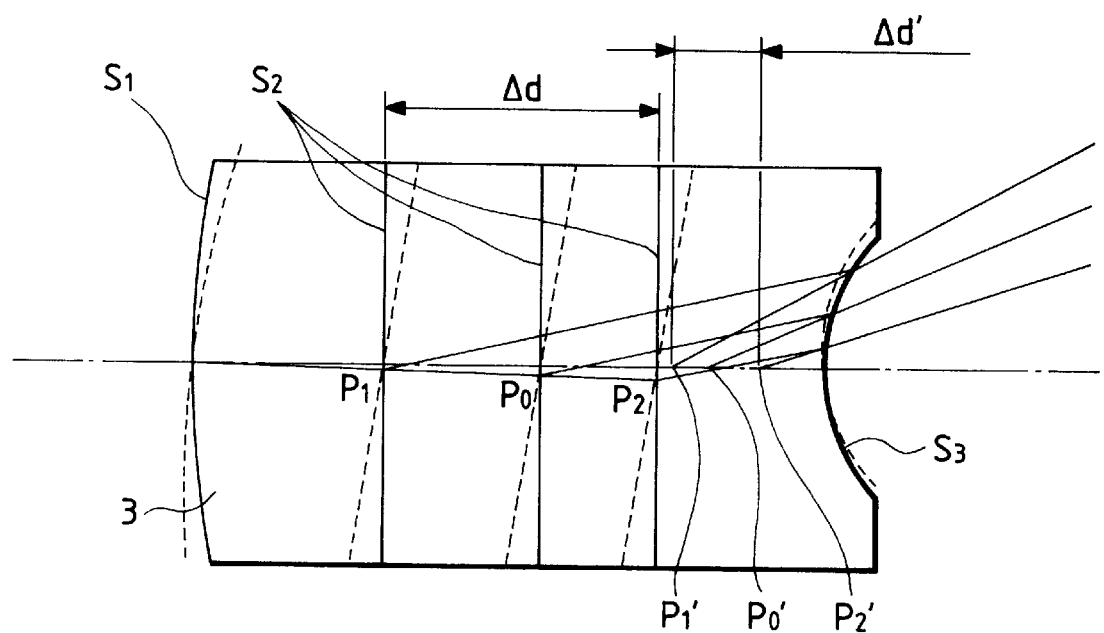

FIG. 24 illustrates the first approach of reducing $\Delta X$ by reducing the displacement of the point of tilt deflection. FIG. 24(a) is a section, taken in the sub-scanning direction, of scanning optics using the lens mirror which is shown expanded along the optical axis. The lens mirror indicated by 3 has an entrance face $S_1$ which is convex in the sub-scanning direction and an exit face $S_3$ which is concave in the sub-scanning direction; the lens mirror 3 has an overall negative power in the sub-scanning direction. As shown, the parallel beams of light entering the lens mirror 3 are made convergent by the positive power of the entrance face $S_1$ and then rendered divergent by the negative power of the exit face $S_3$; the divergent beams pass through the imaging lens to form a spot on the image plane. In this case, the beams are not focused at any point between the collimator lens and the image plane and, hence, they have no conjugate point with the image plane. Nevertheless, the beams emerging from the lens mirror 3 will behave as if they were focused at point Q where they intersect the optical axis if they are extended toward the lens mirror 3; thus, point Q may be regarded as the apparent conjugate point with respect to the image plane. As indicated by dashed lines, if the lens mirror 3 tilts by angle $\phi$, the principal ray of the beam entering the lens mirror 3 is deflected by the reflecting face $S_2$ through angle $2\phi$, then deflected by the exit face $S_3$ to form a large angle with the optical axis before emerging from the lens mirror 3. Point P' at which a backward extension of the principal ray of the emerging beam intersects the optical axis may be regarded as the apparent point of tilt deflection of the lens mirror 3 and this point is located near the aforementioned apparent conjugate point Q. Suppose also the case where the lens mirror 3 rotates about the X-axis and the point of tilt deflection is displaced to $P_1$ or $P_2$ as shown in FIG. 24(b). As shown, the apparent point of tilt deflection of the beam emerging from the lens mirror 3 is located at $P_1'$ or $P_2'$ which are the point of intersection between the principal ray of the relevant beam and the optical axis. One can see from FIG. 24(b) that since the exit face $S_3$ has a negative power, the amount of displacement of the apparent point of tilt deflection is smaller than the amount of displacement of the actual point of tilt deflection ($\Delta d' < \Delta d$). Thus, by designing the lens mirror 3 in such a way that its power is negative in the sub-scanning direction and that the exit face $S_3$ is concave in the section taken in the sub-scanning direction, the value of $\Delta d$, or the amount of departure of the point of tilt deflection from the conjugate point, can be reduced and equation (1) shows that this results in the decrease in $\Delta X$, or the error in scanning pitch.

Figure 25:
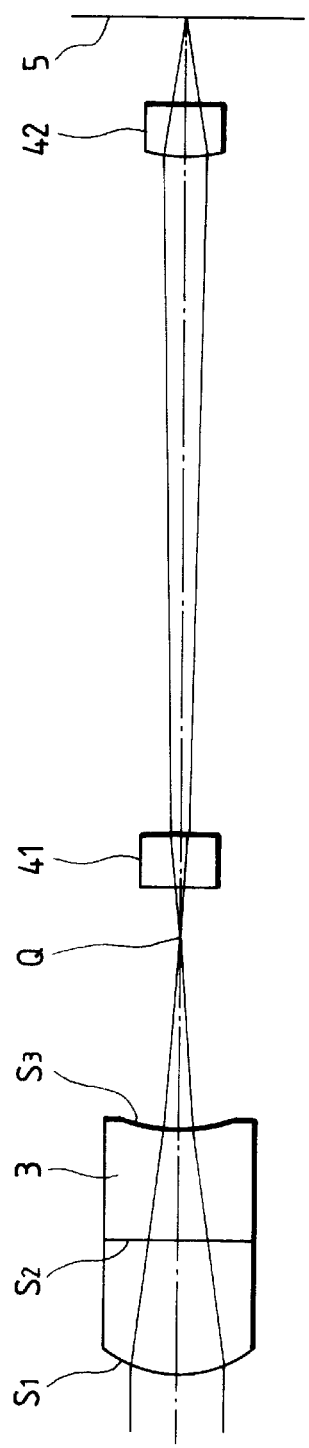
FIGS. 25(a) and (b) depict the second method of tilt correction in the present invention with reference to a section of the rotating lens mirror as taken in the sub-scanning direction.

The second approach of reducing $\Delta X$ by reducing the optical magnification of the imaging lens in the sub-scanning direction is described below with reference to FIG. 25, which shows scanning optics using the lens mirror as seen in the sub-scanning direction, with the lens mirror 3 being shown expanded along the optical axis. The lens mirror 3 has an entrance face $S_1$ which is convex in the sub-scanning direction and an exit face $S_3$ which is concave in the sub-scanning direction; the lens mirror 3 has an overall positive power in the sub-scanning direction. The imaging lens is composed of two elements, the first element 41 which is disposed near the lens mirror 3 and the second element 42 which is disposed near the image plane. As shown, the parallel beam entering the rotating lens mirror 3 is focused by its positive power to form an image at point Q ahead of the first imaging lens 41; thereafter, the beam passes through the first imaging lens 41 and the second imaging lens 42 to form a spot on the image plane 5. Thus, by composing the imaging lens unit of two elements, its optical magnification m can be set at a small value and equation (1) shows that this results in the decrease in ΔX, or the error in scanning pitch.

With such optics that is unable to perform complete correction of the error in scanning pitch due to the tilting of deflecting faces, it is necessary to quantitate the effect of tilt correction and optical design must be made in such a way that the quantified value will be either greater or smaller than a threshold level. To this end, the effect of tilt correction in the optics is quantitated as the factor of tilt correction H, which is defined by:

$$H = \Delta X(\phi)/\Delta X_0(\phi) = \Delta X(\phi)/2L\cdot\phi \quad (2)$$

where $\phi$ is the tilt angle of the rotating lens mirror; $\Delta X(\phi)$ is a maximum pitch error that occurs in the sub-scanning direction when the rotating lens mirror in the optics tilts by angle $\phi$; L is the distance from the center of rotation of the lens mirror to the image plane; and $\Delta X_0(\phi)$ is the pitch error that occurs in the sub-scanning direction when a deflecting face tilts by angle $\phi$ in the case where lenses or any other optical elements are not present between the deflecting face and the image plane and, in the situation under consideration, $\Delta X_0(\phi)$ is equal to $2L\cdot\phi$. If the tilt angle $\phi$ is reasonably small, the relationship between $\Delta X(\phi)$ and $\phi$ is linear as expressed by equation (1) and the factor of tilt correction H is a function of the optics including the rotating lens mirror, which is independent of the tilt angle $\phi$.

To estimate the permissible level of the factor of tilt correction H, the present inventors simulated printing operations with scanning optics at various H values. The conditions of the simulation were as follows.

Factor of tilt correction, H: 0, 0.25, 0.50, 0.75

Tilt angle, $\phi$ : 10 sec

Resolution : 300 dpi

Spot diameter : 100 $\mu$m

Optical pathlength : 200 mm

Print pattern : black solid

No. of deflecting faces : 2

Figure 26:
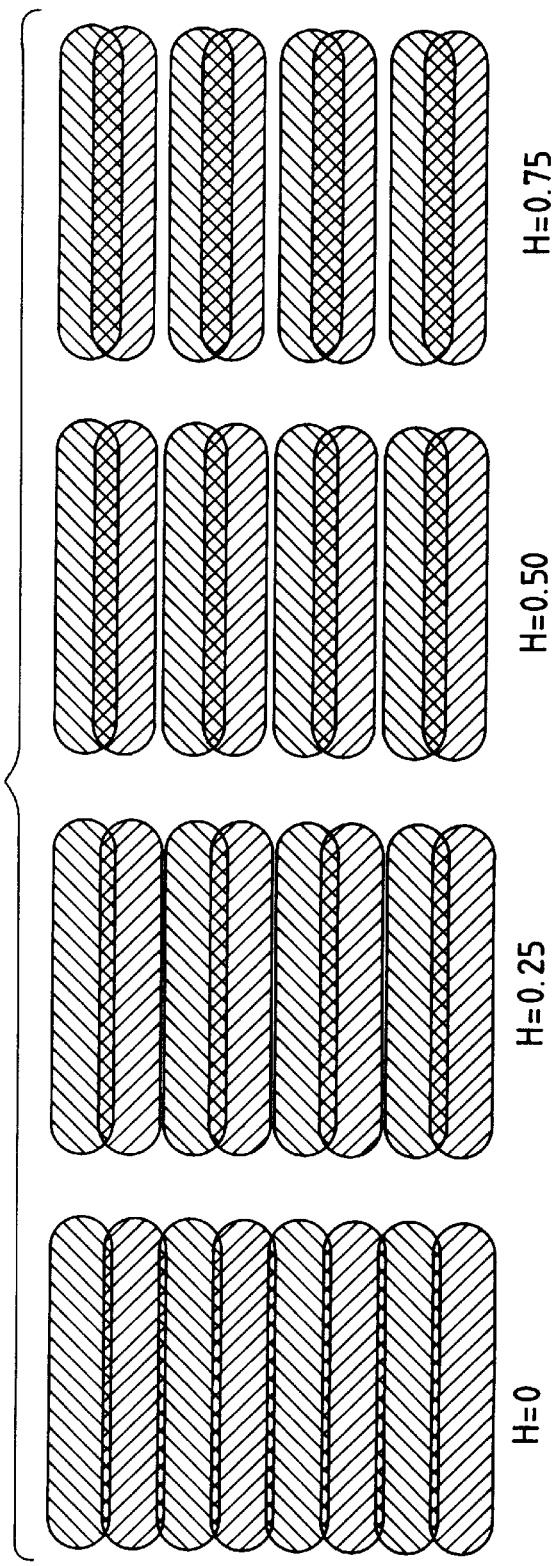
FIG. 26 shows how the result of simulated printing changes at various factors of tilt correction.

The actual value of tilt angle $\phi$ is determined by the angular error the mounting face of the lens mirror on the deflecting motor has with respect to the axis of rotation. Since the limits on the precision in the mounting face on the motor are usually on the order of ±10 sec, the tilt angle $\phi$ in the simulation was set at 10 sec. FIG. 26 shows enlarged the results of the simulated printing which was conducted under the conditions specified above. As one can see from FIG. 26, if the factor of tilt correction H is 0.5 or greater, an unexposed area forms between adjacent spots in the sub-scanning direction after two scan cycles and this area appears in the image as a white line in the main scanning direction. Such white lines will reduce the image density and deteriorate the image quality considerably. Based on these results of the simulated printing, the assignee conducted a printing experiment under the same conditions of simulation, except that the factor of tilt correction was set at about 0.5 which was equivalent to about 10 $\mu$m in terms of scanning pitch error ΔX. As a result, it was found that at long as no white lines appeared in the main scanning direction, there was not recognized any marked deterioration in image quality. This would be because scanning pitch errors of about 10 $\mu$m are less than the resolving power of the ordinary human eye and, hence, cannot be recognized by the naked eye. On the basis of this observation, one may well conclude that image having no practical problems can be produced if the factor of tilt correction H is no more than 0.5; hence, the permissible level of H is set at 0.5 or less for the purposes of the present invention.

The rotating lens mirror 3 and the imaging lens 4 may be made of either optical glass or resins. However, if the lenses to be manufactured are aspheric in the entrance or exit face, they are desirably made from optical resins since their manufacture is possible at a lower cost.

On the pages that follow, several specific examples of the second aspect of the present invention are described together with their optical specifications and the aberrations that develop in them. In each of those examples, the lens mirror is assumed to rotate by angle $2\omega$ from the start to the end of one scan cycle. Various optical specifications are expressed by the following symbols: $r_i$ for the radius of curvature of an ith surface $S_i$; $d_i$ for the on-axis distance from an ith surface to the next surface; if a surface of interest is toric, the radii of its curvature in the sub- and main scanning directions are denoted by $r_{ix}$ and $r_{iy}$, respectively; if the shape of a section of the toric surface as taken in the main or sub-scanning direction is other than an arc of a circle, the aspheric coefficients $K_{iy}$, $A_{iy}$ and $B_{iy}$ (for the section taken in the main scanning direction) or $K_{ix}$, $A_{ix}$ and $B_{ix}$ (for the section taken in the sub-scanning direction) are expressed by the following equation:

$$z_i = \frac{h^2/r_i}{1 + \sqrt{1 - (K_i + 1)(h/r_i)^2}} + A_i h^4 + B_i h^6$$

where $z_i$ the distance by which the point on the aspheric surface where the height from the optical axis is h departs from the plane tangent to the vertex of the aspheric surface; $n_1$ and $n_2$ each refer to the refractive index of a rotating lens mirror. The entrance and exit faces of the imaging lens are denoted by $S_c$ and $S_d$, respectively, and its refractive index by $n_c$. In some examples, the data of optical specifications cover a cylindrical lens provided between the collimator lens and the rotating lens mirror, a second imaging lens and a toric reflecting mirror. In such cases, the entrance and exit faces of the cylindrical lens, the entrance and exit faces of the second imaging lens, and the toric reflecting face are denoted by $S_a$, $S_b$, $S_e$, $S_f$ and $S_g$, respectively, and the refractive indices of the cylindrical lens and the second imaging lens are denoted by $n_a$ and $n_e$, respectively. The reflecting face of the rotating lens mirror is a flat plane. Symbol H denotes the factor of tilt correction which was set at various values in the following examples.

Speaking of the graphs plotting aberration curves, curvature of the field that develops in the main scanning direction is expressed by dashed lines and one that develops in the sub-scanning direction is expressed by solid lines. As for scanning linearity, it is usual in the case of an f– lens to express the departure of the actual image height from the ideal value y=fθ in percentages. However, in the present invention where both the entrance and exit faces of the lens mirror are adapted to rotate, the ideal image height is not equal to fθ and, hence, an equivalent method of presentation is substituted, according to which the departure from the ideal image height Y=ζθ is expressed in percentages with representing the change in image height with the angle of rotation of the lens mirror for paraxial rays. The design wavelength is set at 780 nm in all examples that follow.

EXAMPLE 8

Example 8 of the present invention is described in detail.

Figure 27A:
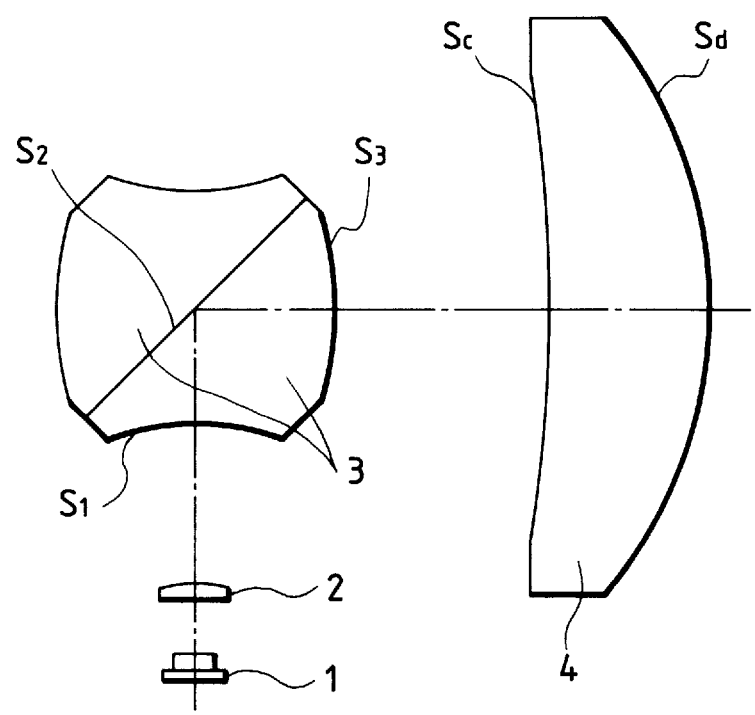
FIGS. 27(a) and (b) are diagrammatic views showing Example 8 of the present invention in sections that are taken in the main and sub-scanning directions, respectively.
Figure 27B:
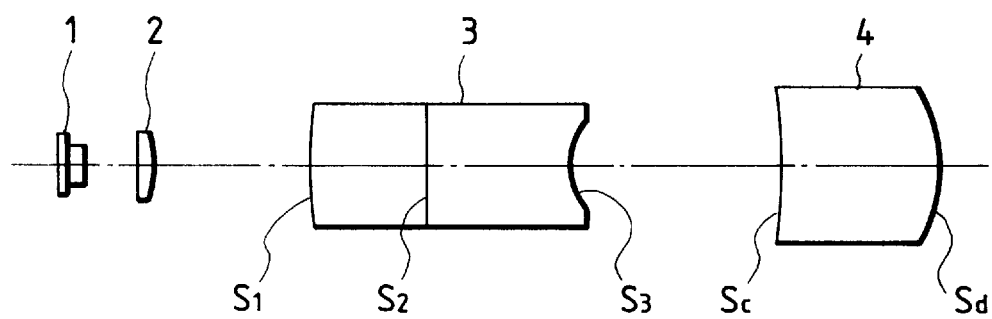
Figure 29:
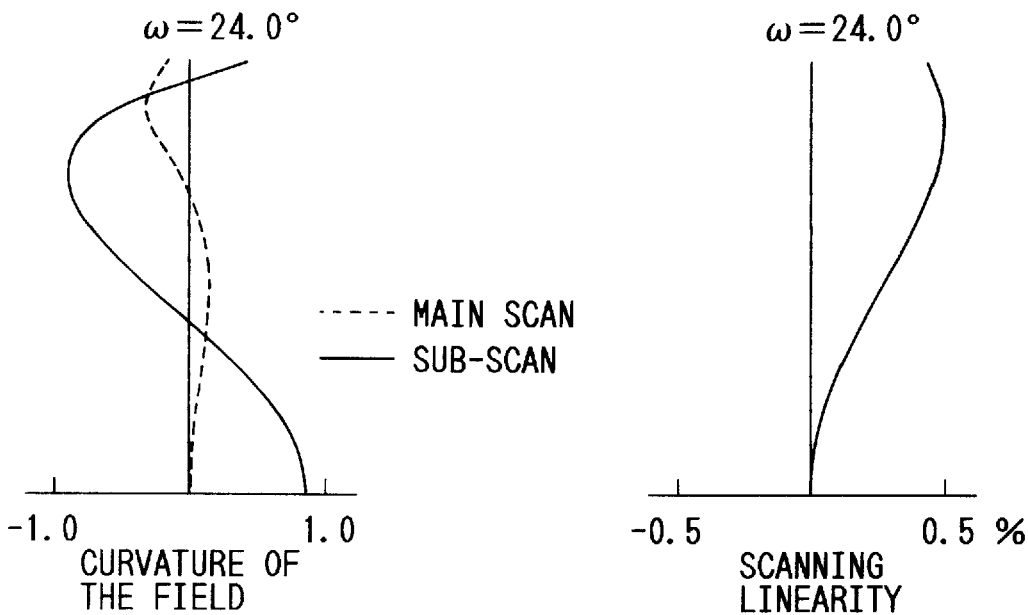
FIG. 29 plots the aberration curves that are obtained in Example 8.

FIG. 27 shows schematically two sections of the system of Example 8; FIG. 27(a) refers to the section taken in the main scanning direction and FIG. 27(b) refers to the section taken in the sub-scanning direction and expanded along the optical axis. FIG. 29 is a perspective view of the beam scanning apparatus constructed in accordance with Example 8. In Example 8, two rotating lens mirrors 3 of identical shape are arranged symmetrically with respect to the axis of rotation in such a way that their reflecting faces $S_2$ contact each other in a back-to-back relationship. The entrance face $S_1$ and the exit face $S_3$ of each lens mirror 3 are both a toric surface and the overall power of the lens mirror unit 3 is negative in the sub-scanning direction. The system of Example 8 includes not only the rotating lens mirrors 3 but also one imaging lens element 4. Shown below are the data of optical specifications of a typical design based on Example 8.

$2\omega = 40.834°$

| Surface | Radius of curvature | Distance between surfaces | Refractive index |
|---|---|---|---|
| $S_1$ | $r_{1y} = -17.818$ | $d_1 = 10.000$ | $n_1 = 1.51922$ |
|  | $r_{1x} = 54.267$ |  |  |
|  | $K_{1y} = 0.41022$ |  |  |
|  | $A_{1y} = 0.50400 \times 10^{-4}$ |  |  |
|  | $B_{1y} = -0.25110 \times 10^{-7}$ |  |  |
| $S_2$ | $r_2 = \infty$ | $d_2 = 12.000$ | $n_2 = 1.51922$ |
| $S_3$ | $r_{3y} = -34.585$ | $d_3 = 14.000$ |  |
|  | $r_{3x} = 6.096$ |  |  |
|  | $K_{3x} = -13.12841$ |  |  |
|  | $A_{3x} = 0.36533 \times 10^{-2}$ |  |  |
|  | $B_{3x} = \infty$ |  |  |
| $S_c$ | $r_{cy} = -162.803$ | $d_c = 15.000$ | $n_c = 1.51922$ |
|  | $r_{cx} = -55.778$ |  |  |
| $S_d$ | $r_{dy} = -39.211$ | $d_d = 179.000$ |  |
|  | $r_{dx} = -14.019$ |  |  |
|  | $K_{dy} = -3.91307$ |  |  |
|  | $A_{dx} = -0.12097 \times 10^{-3}$ |  |  |
|  | $B_{dx} = 0$ |  |  |
| $H = 0.21$ |  |  |  |

FIG. 29 plots the aberration curves that are obtained with the design according to Example 8.

Figure 28:
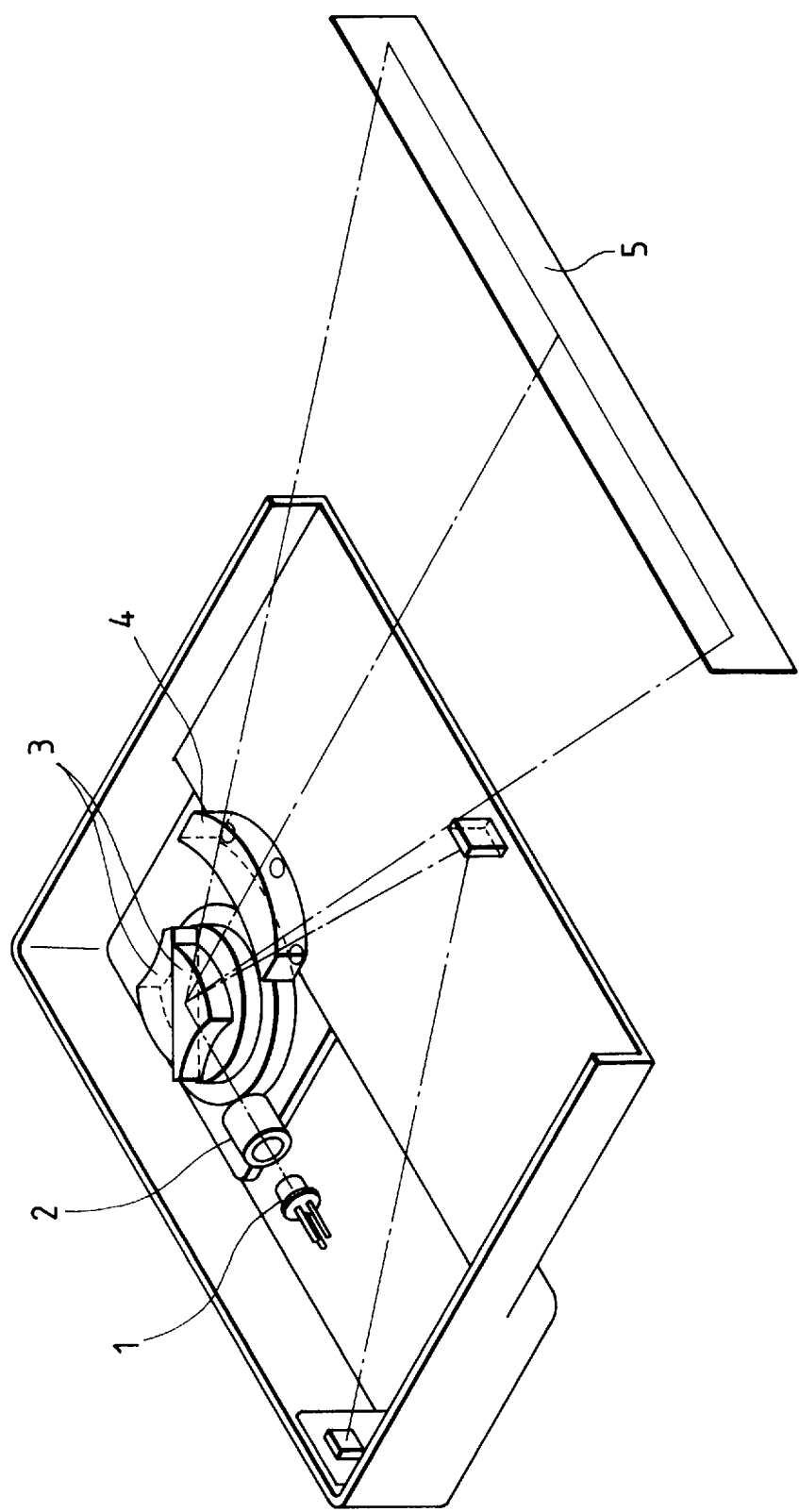
FIG. 28 is a perspective view of the optical scanning apparatus of Example 8.

In Example 8, the rotating lens mirror unit 3 is adapted to have negative power in the sub-scanning direction and, as a result, the rays emerging from the exit face $S_3$ behave as if the conjugate point were within the mirror unit 3; in addition, the exit face $S_3$ is concave in the section taken in the sub-scanning direction and, hence, the apparent point of tilt deflection in the mirror unit 3 is located near the apparent conjugate point and this is effective in reducing the displacement of deflection point even if the lens mirror unit 3 rotates about the axis of rotation. Eventually, the factor of tilt correction H can be reduced to as small as 0.21. Further, as one can see from the FIG. 29 graphs, curvature of the field was held within ±1.0 mm and it was possible to perform very precise optical scanning with a spot diameter of about 40 to 50 μm at a resolution of about 600 to 800 dpi. The scanning linearity was also satisfactory as demonstrated by values not exceeding 0.5%. As one can see from FIG. 28, the optical scanner of Example 8 uses only two small kinds of optical elements for attaining the purpose of correcting distortion and other aberrations, as well as the tilting of deflecting faces. Hence, the optical scanner is very small in size and yet it produces images of high quality suffering from very small errors in scan pitch due to the tilting of deflecting faces.

EXAMPLE 9

Figure 30A:
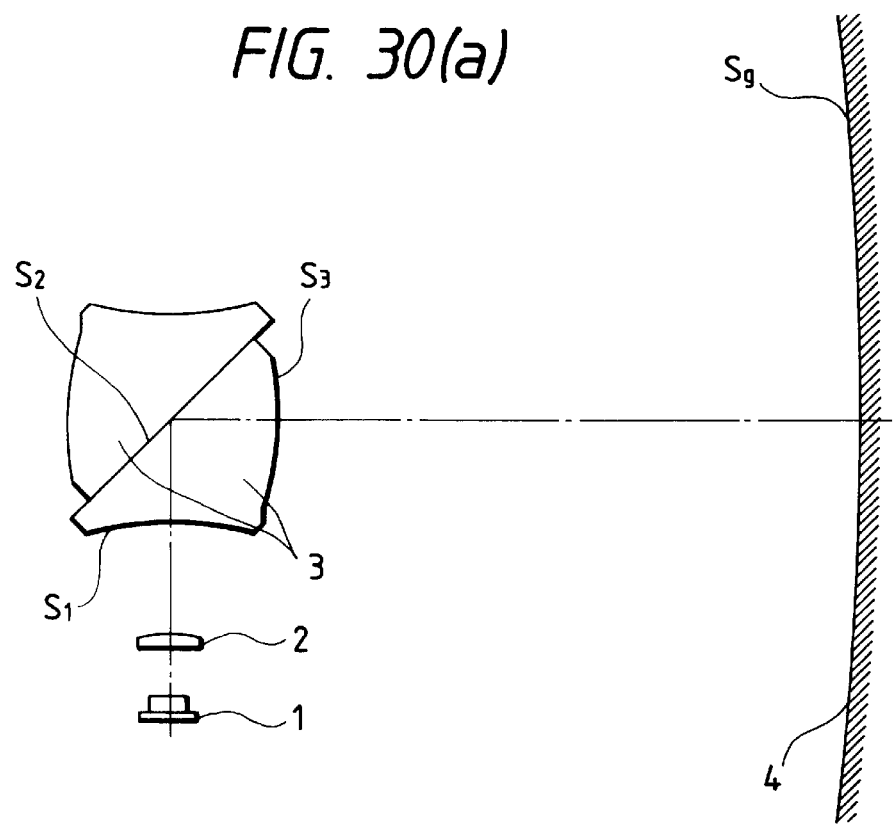
FIGS. 30(a) and (b) are diagrammatic views showing Example 9 of the present invention in sections that are taken in the main and sub-scanning directions, respectively.
Figure 30B:
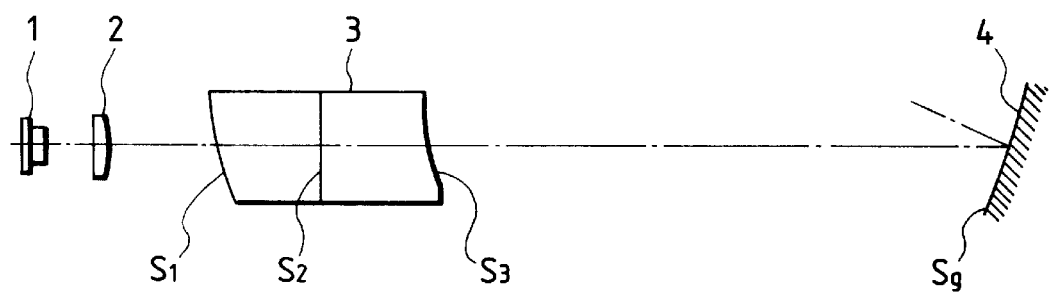
Figure 31:
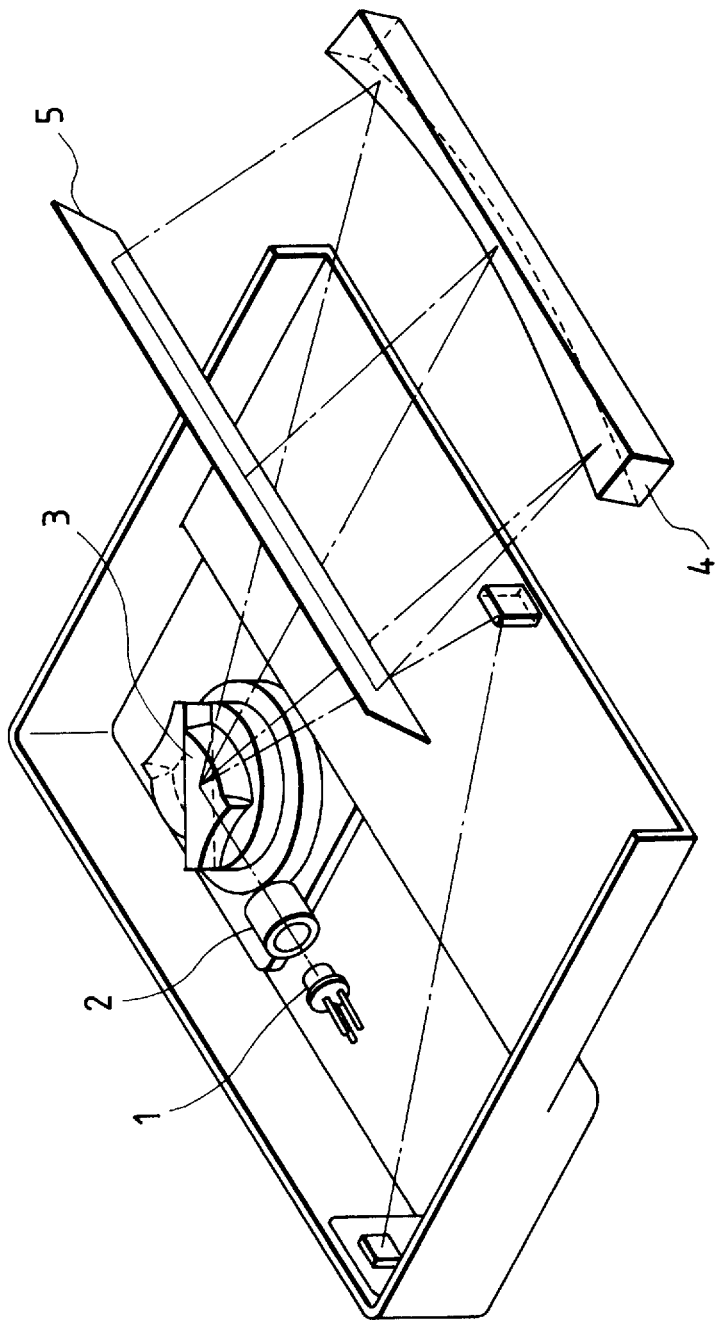
FIG. 31 is a perspective view of the optical scanning apparatus of Example 9.

FIG. 30 shows schematically two sections of the system of Example 9; FIG. 30(a) refers to the section taken in the main scanning direction and FIG. 30(b) refers to the section taken in the sub-scanning direction and expanded along the optical axis. FIG. 31 is a perspective view of the optical scanner constructed in accordance with Example 9. In Example 9, two rotating lens mirrors 3 of identical shape are arranged symmetrically with respect to the axis of rotation) in such a way that their reflecting faces $S_2$ contact each other in a back-to-back relationship. The entrance face $S_1$ and the exit face $S_3$ of each lens mirror 3 are both a toric surface and the overall power of the lens mirror unit 3 is negative in the sub-scanning direction. The system of Example 9 includes not only the rotating lens mirrors 3 but also one mirror lens element 4. Shown below are the data of optical specifications of a typical design based on Example 9. In the following datasheet, $X_{id}$ designates the amount of decentration of surface $S_i$ in the sub-scanning direction, and $B_{id}$ denotes the angle by which surface $S_i$ rotates about an axis intersecting at right angles the optical axis through the section taken in the main scanning direction, with the center lying at the point of intersection between surface $S_i$ and the optical axis.

$2\omega = 41.616°$

| Surface | Radius of curvature |  | Distance between surfaces |  | Refractive index |
|---|---|---|---|---|---|
| $S_1$ | $r_{1y} =$ | $-32.172$ | $d_1 =$ | $10.000$ | $n_1 = 1.51118$ |
|  | $r_{1x} =$ | $28.000$ |  |  |  |
|  | $x_{1d} =$ | $0.159$ | $B_{1d} =$ | $14.342°$ |  |
| $S_2$ | $r_2 =$ | $\infty$ | $d_2 =$ | $10.000$ | $n_2 = 1.51118$ |
| $S_3$ | $r_{3y} =$ | $-28.533$ | $d_3 =$ | $95.000$ |  |
|  | $r_{3x} =$ | $20.629$ |  |  |  |
|  | $x_{3d} =$ | $0.071$ | $B_{3d} =$ | $11.153°$ |  |
| $S_g$ | $r_{gy} =$ | $-411.154$ | $d_g =$ | $115.000$ |  |
|  | $r_{gx} =$ | $-178.158$ |  |  |  |
|  | $x_{gd} =$ | $-18.469$ | $B_{gd} =$ | $-12.000°$ |  |
| $H = 0.31$ |  |  |  |  |  |

Figure 32:
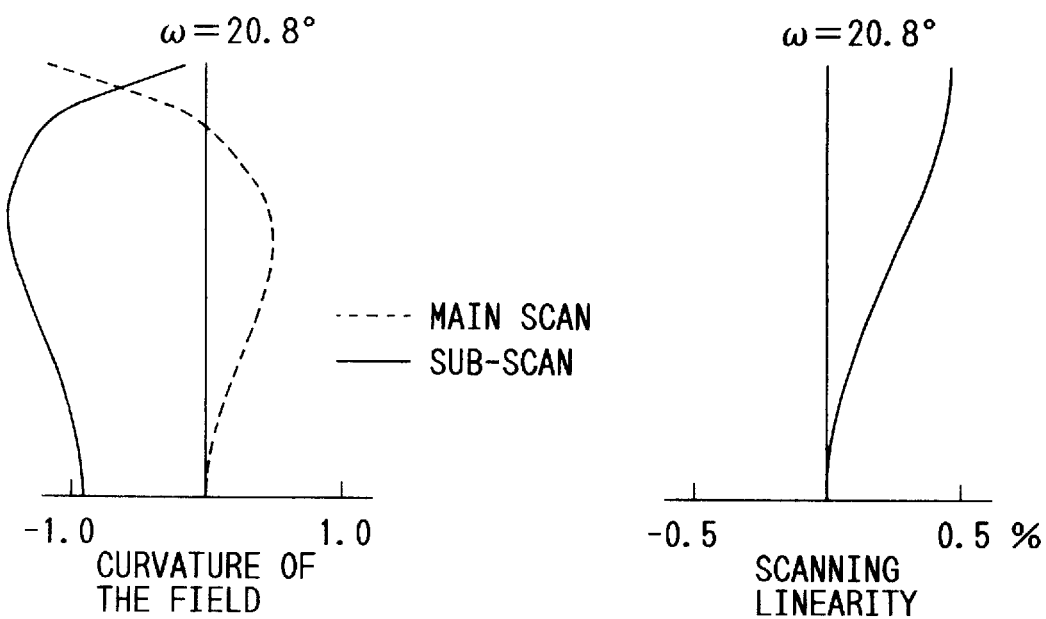
FIG. 32 plots the aberration curves that are obtained in Example 9.

FIG. 32 plots the aberration curves that are obtained with the design according to Example 9.

Lenses having a toric surface such as the imaging lens used in the system of Example 8 are customarily manufactured by the molding of resins. However, resins have a serious drawback in that compared to glass, they experience great fluctuations in refractive index with the temperature of the environment in which they are used, and the imaging performance of the plastic lens will deteriorate as a result of the variation in the environment in which the system is used. In Example 9, the toric reflector mirror 4 having a concave surface is adapted to be responsible for focusing rays and this assures that even if the mirror 4 is molded from a resin, one can construct a precise optical scanning apparatus that will not experience deterioration in imaging performance in the face of fluctuations in the temperature of the environment in which the system is used. If, as in Example 9, a reflector mirror having a curvature admits a light beam that enters at an angle with the optical axis through the reflector mirror, the scanning line formed on the image plane will be curved in the sub-scanning direction. However, in Example 9, this problem of curvature is corrected not only by introducing decentration into the optical surfaces of the lens mirror 3 and toric reflector mirror 4 but also by rotating those surfaces. Further, as one can see from the FIG. 29 graphs, curvature of the field was ±1.5 mm and it was possible to perform very precise optical scanning at a resolution of about 600 dpi. The scanning linearity was also satisfactory as demonstrated by values not exceeding 0.5%. Small optical scanners are usually equipped with a ray bending mirror that is provided in the optical path of rays for size reduction. In the system of Example 9, the toric reflector mirror also serves as a ray bending mirror and, hence, the number of necessary parts is sufficiently reduced to enable the construction of an inexpensive optical scanning apparatus.

EXAMPLE 10

Figure 33A:
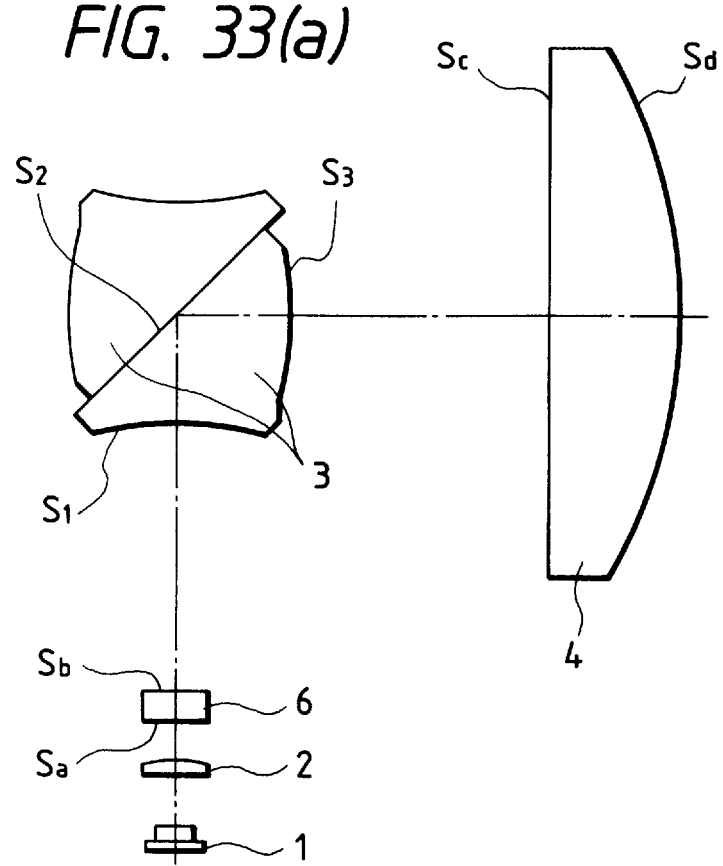
FIGS. 33(a) and (b) are diagrammatic views showing Example 10 of the present invention in sections that are taken in the main and sub-scanning directions, respectively.
Figure 33B:
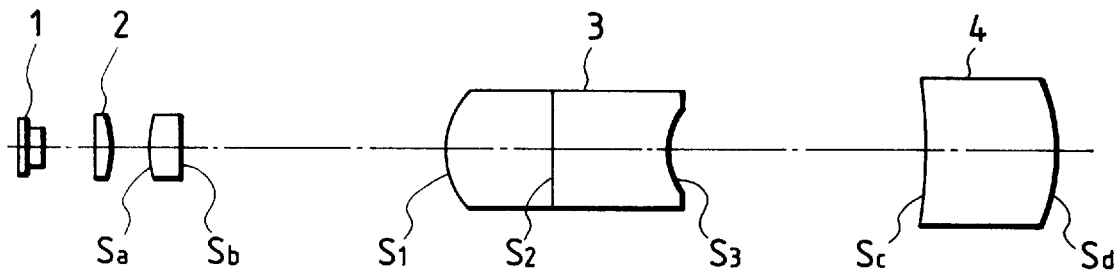

FIG. 33 shows schematically two sections of the system of Example 10; FIG. 33(a) refers to the section taken in the main scanning direction and FIG. 33(b) refers to the section taken in the sub-scanning direction and expanded along the optical axis. In Example 10, two rotating lens mirrors 3 of identical shape are arranged symmetrically with respect to the axis of rotation in such a way that their reflecting faces $S_2$ contact each other in a back-to-back relationship. The entrance face $S_1$ and the exit face $S_3$ of each lens mirror 3 are both a toric surface. The system of Example 10 includes not only the rotating lens mirrors 3 but also a cylindrical lens 6 having power only in the sub-scanning direction and which is provided ahead of the lens mirror unit 3, and one imaging lens element 4. Shown below are the data of optical specifications of a typical design based on Example 10.

$2\omega = 40.344°$

| Surface | Radius of curvature | | Distance between surfaces | | Refractive index |
|---|---|---|---|---|---|
| $S_a$ | $r_{ay} =$ | ∞ | $d_a =$ | 3.000 | $n_a = 1.52361$ |
| | $r_{ax} =$ | 20.000 | | | |
| $S_b$ | $r_b =$ | ∞ | $d_b =$ | 29.502 | |
| $S_1$ | $r_{1y} =$ | −31.628 | $d_1 =$ | 10.000 | $n_1 = 1.52361$ |
| | $r_{1x} =$ | 8.861 | | | |
| $S_2$ | $r_2 =$ | ∞ | $d_2 =$ | 10.000 | $n_2 = 1.52361$ |
| $S_3$ | $r_3 =$ | −38.762 | $d_3 =$ | 29.033 | |
| | $r_3 =$ | −7.011 | | | |
| $S_c$ | $r_{cy} =$ | 7349.783 | $d_c =$ | 16.036 | $n_c = 1.52361$ |
| | $r_{cx} =$ | −47.592 | | | |
| $S_d$ | $r_{dy} =$ | −86.093 | $d_d =$ | 164.931 | |
| | $r_{dx} =$ | −17.953 | | | |
| H = 0.11 | | | | | |

Figure 34:
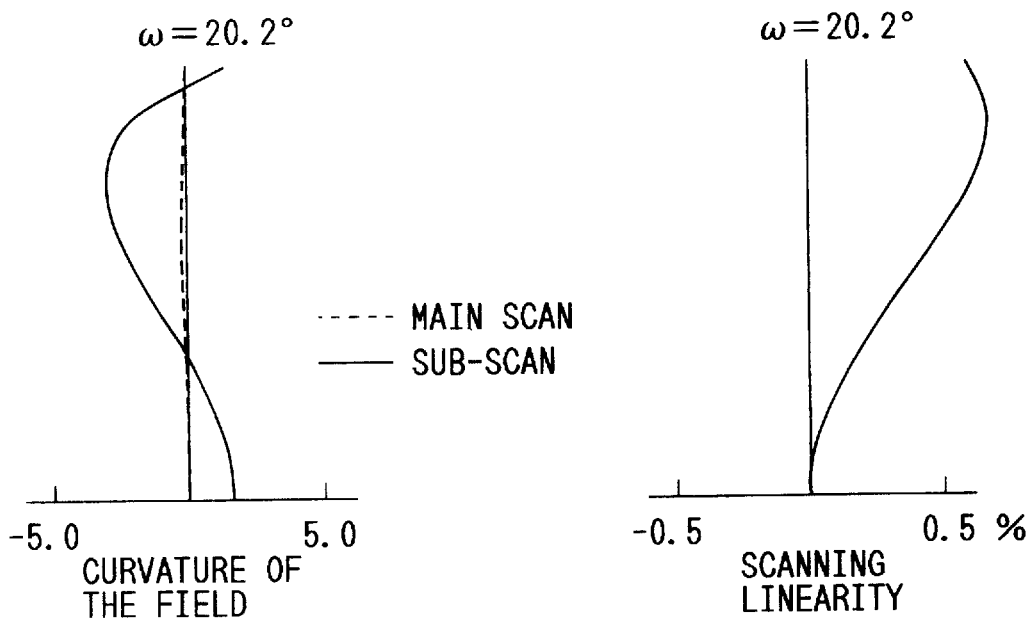
FIG. 34 plots the aberration curves that are obtained in Example 10.

FIG. 34 plots the aberration curves that are obtained with the design according to Example 10.

In Example 10, the cylindrical lens 6 is provided ahead of the lens mirror unit 3 so that the incident beams are made to converge only in the sub-scanning direction before they enter the lens mirror unit 3. Optics using a rotating lens mirror has the point of deflection within the lens mirror 3; hence, by providing the conjugate point within the lens mirror, the displacement of the point of tilt deflection, or the distance between the point of deflection and the conjugate point, can be made small enough to enhance the effectiveness of tilt correction. In order to have the conjugate point located within the lens mirror unit without providing the cylindrical lens ahead of the lens mirror, it is necessary that the entrance face of the lens mirror be rendered to have a fairly small radius of curvature in the sub-scanning direction. However, if the entrance face has an extremely small radius of curvature in the sub-scanning direction, the variations in the conjugate point in accordance with the rotating lens mirror will increase due to the difference in the angle of beam incidence on the entrance face and this increases, rather than decrease, the displacement of the point of tilt deflection. As a further problem, if the radius of curvature of a certain surface is extremely small compared to other surfaces, deterioration in aberrations will occur or there is the need to assure closer tolerances in the precision of that particular surface. In Example 10, the cylindrical lens 6 is provided ahead of the lens mirror unit 3 and by so doing, the conjugate point can be provided within the lens mirror unit 3 without unduly reducing the curvature radius of the entrance face $S_1$ of the lens mirror unit 3; hence, the factor of tilt correction H can be reduced to about one half the value in Example 8 and this contributes to enhanced effectiveness in tilt correction. As a further advantage the light beam entering the lens mirror unit 3 is narrow in the sub-scanning direction and, hence, the lens mirror unit 3 can be made thin enough in the sub-scanning direction to lower the cost of manufacturing the lens mirrors 3.

EXAMPLE 11

Figure 35A:
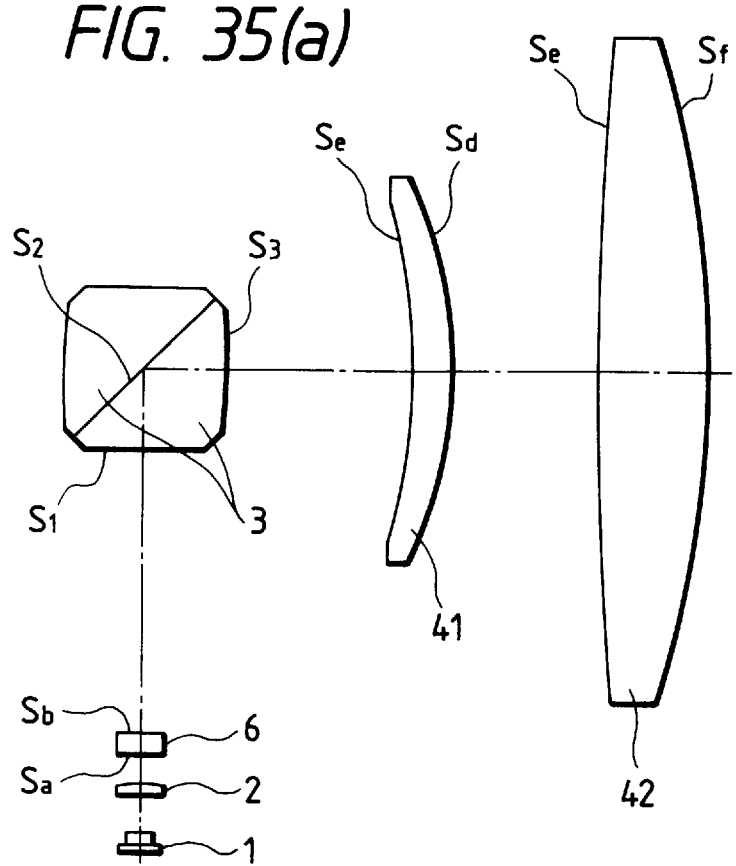
FIGS. 35(a) and (b) are diagrammatic views showing Example 11 of the present invention in sections that are taken in the main and sub-scanning directions, respectively.
Figure 35B:
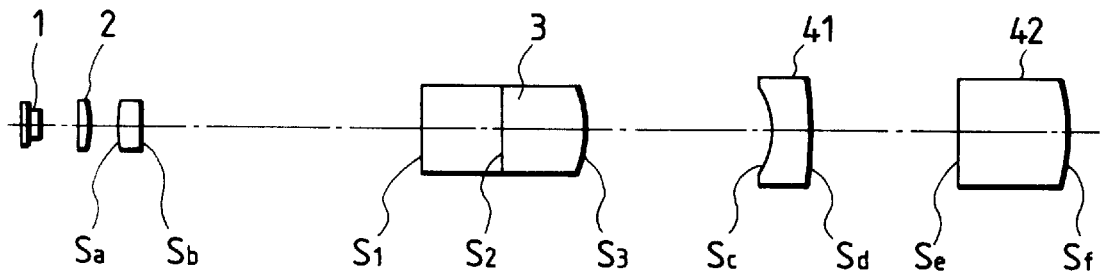

FIG. 35 shows schematically two sections of the system of Example 11; FIG. 35(a) refers to the section taken in the main scanning direction and FIG. 35(b) refers to the section taken in the sub-scanning direction and expanded along the optical axis. In Example 11, two rotating lens mirrors 3 of identical shape are arranged symmetrically with respect to the axis of rotation in such a way that their reflecting faces $S_2$ contact each other in a back-to-back relationship. The entrance face $S_1$ of each lens mirror 3 is a flat plane and the exit face $S_3$ is a toric surface. The system of Example 11 includes not only the rotating lens mirrors 3 but also a cylindrical lens 6 having power only in the sub-scanning direction and which is provided ahead of the lens mirror unit 3, as well as a first imaging lens 41 and a second imaging lens 42. Shown below are the data of optical specifications of a typical design based on Example 11.

$2\omega = 40.054°$

| Surface | Radius of curvature | | Distance between surfaces | | Refractive index |
|---|---|---|---|---|---|
| $S_a$ | $r_{ay} =$ | ∞ | $d_a =$ | 3.000 | $n_a = 1.52361$ |
| | $r_{ax} =$ | 50.000 | | | |
| $S_b$ | $r_b =$ | ∞ | $d_b =$ | 86.800 | |
| $S_1$ | $r_1 =$ | ∞ | $d_1 =$ | 10.000 | $n_1 = 1.52361$ |
| $S_2$ | $r_2 =$ | ∞ | $d_2 =$ | 10.000 | $n_2 = 1.52361$ |
| $S_3$ | $r_{3y} =$ | −3919.819 | $d_3 =$ | 28.999 | |
| | $r_x =$ | −16.336 | | | |
| $S_c$ | $r_{cy} =$ | −76.029 | $d_c =$ | 5.002 | $n_c = 1.52361$ |
| | $r_{3cx} =$ | −11.615 | | | |
| $S_d$ | $r_{dy} =$ | −58.144 | $d_d =$ | 20.186 | |
| | $r_{dx} =$ | −11.745 | | | |
| $S_e$ | $r_{ey} =$ | 579.918 | $d_e =$ | 14.788 | $n_e = 1.52361$ |
| | $r_{dx} =$ | −1375.390 | | | |
| $S_f$ | $r_{fy} =$ | −147.792 | $d_f =$ | 141.024 | |
| | $r_{fx} =$ | −30.598 | | | |
| H = 0.02 | | | | | |

Figure 36:
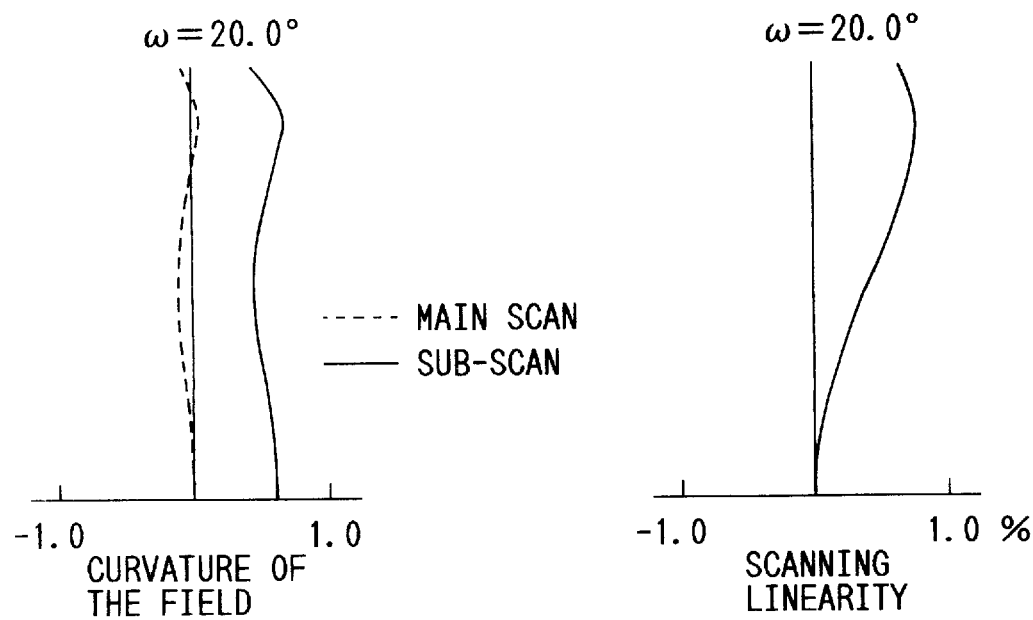
FIG. 36 plots the aberration curves that are obtained in Example 11.

FIG. 36 plots the aberration curves that are obtained with the design according to Example 11.

In Example 11, the cylindrical lens 6 is provided ahead of the lens mirror unit 3. Providing the cylindrical lens 6 ahead of the lens mirror unit 3 offers the advantage of having the conjugate point located within the lens mirror unit 3. In addition, the flat entrance face $S_1$ of each lens mirror 3 insures that the displacement of the point of deflection is held substantially zero even if the lens mirror unit 3 rotates about the axis of rotation. Consequently, the light source 1, deflecting face $S_2$ and the image plane 5 can optically be controlled to satisfy the conjugate relationship in Example 11 and, as in the case of tilt correcting optics that is used in ordinary polygonal mirrors, the scanning pitch error can be corrected almost completely. As a further advantage, the provision of two imaging lens elements increases the degree of freedom in optical design and, as one can see from the FIG. 35 graphs, curvature of the field can be held within ±0.7 mm so that the system is capable of attaining a resolution better than 800 dpi. Scanning linearity is also satisfactory as demonstrated by values not exceeding 0.8%. Thus, one can fabricate scanning optics of high precision and resolution in accordance with Example 11.

EXAMPLE 12

Figure 37A:
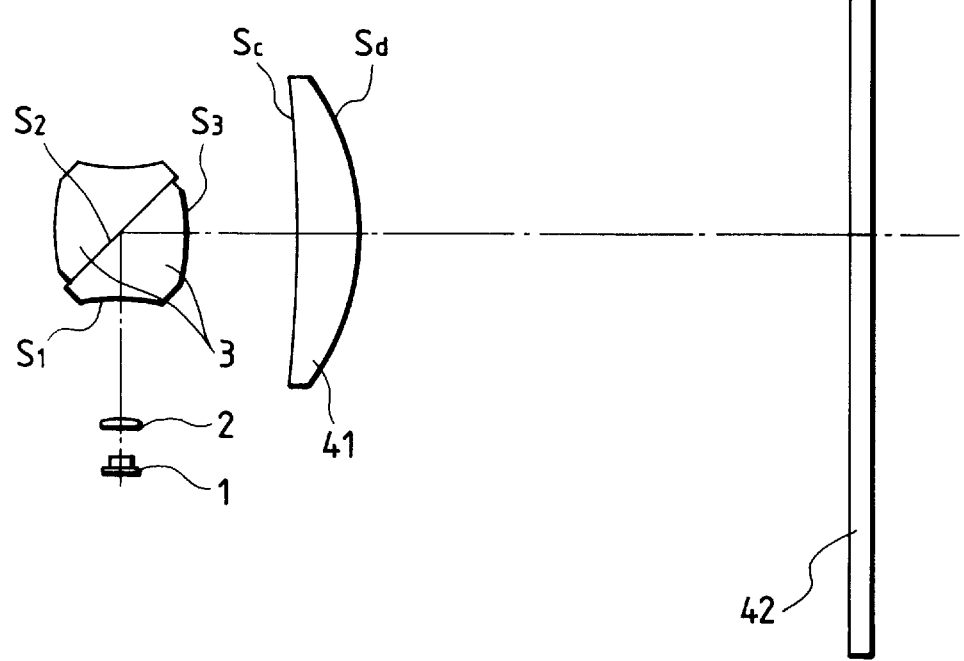
FIGS. 37(a) and (b) are diagrammatic views showing Example 12 of the present invention in sections that are taken in the main and sub-scanning directions, respectively.
Figure 37B:
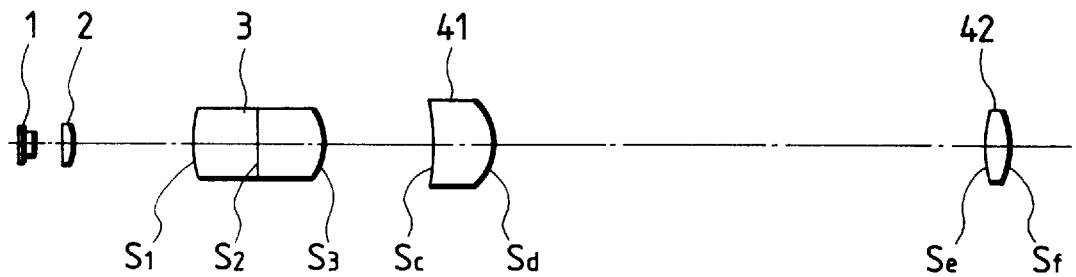

FIG. 37 shows schematically two sections of the system of Example 12; FIG. 37(a) refers to the section taken in the main scanning direction and FIG. 37(b) refers to the section taken in the sub-scanning direction and expanded along the optical axis. In Example 12, two rotating lens mirrors 3 of identical shape are arranged symmetrically with respect to the axis of rotation in such a way that their reflecting faces $S_2$ contact each other in a back-to-back relationship. The entrance face $S_1$ and the exit face $S_3$ of each lens mirror 3 are both a toric surface. The system of Example 12 includes not only the rotating lens mirrors 3 but also a first imaging lens 41, and a cylindrical lens 42 (also serving as a second imaging lens) that has power only in the sub-scanning direction and which is provided near the image plane. Shown below are the data of optical specifications of a typical design based on Example 12.

$2\omega = 45.974°$

| Surface | | Radius of curvature | Distance between surfaces | Refractive index |
|---|---|---|---|---|
| $S_1$ | $r_1 =$ | −26.042 | $d_1 =$ 10.000 | $n_1 = 1.48261$ |
| | $r_1 =$ | 23.192 | | |
| $S_2$ | $r_2 =$ | ∞ | $d_2 =$ 10.000 | $n_2 = 1.48261$ |
| $S_3$ | $r_{3y} =$ | −41.612 | $d_3 =$ 28.579 | |
| | $r_{3x} =$ | −9.228 | | |
| $S_c$ | $r_{cy} =$ | −212.019 | $d_c =$ 11.421 | $n_3 = 1.51118$ |
| | $r_{cx} =$ | −33.824 | | |
| $S_d$ | $r_{dy} =$ | −46.132 | $d_d =$ 152.000 | |
| | $r_{dx} =$ | −9.829 | | |
| $S_e$ | $r_{ey} =$ | ∞ | $d_e =$ 3.000 | $n_4 = 1.51118$ |
| | $r_{ex} =$ | 29.511 | | |
| $S_f$ | $r_{fy} =$ | ∞ | $d_f =$ 15.000 | |
| | $r_{fx} =$ | −14.446 | | |
| $H = 0.11$ | | | | |

Figure 38:
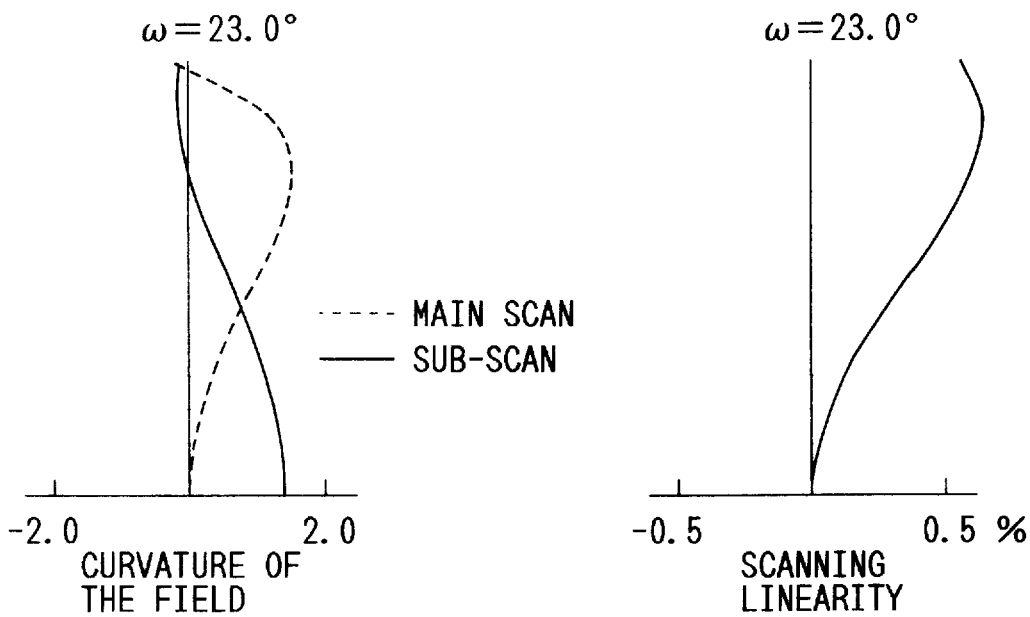
FIG. 38 plots the aberration curves that are obtained in Example 12.

FIG. 38 plots the aberration curves that are obtained with the design according to Example 12.

In Example 12, the cylindrical lens 42 is provided near the image plane and this insures that compared to the case of using only one imaging lens, the optical lens magnification which is the composite value for the combination of the first and second imaging lenses is made small and equation (1) shows that one can enhance the effectiveness in tilt correction. As a further advantage, the conjugate point in the sub-scanning direction lies ahead of the first imaging lens 41 and, hence, the light beam passing through that first imaging lens is narrow in the sub-scanning direction; it should also be mentioned that since the second imaging lens 42 is situated near the image plane, the light beam passing through that second imaging lens is also narrow. Consequently, the thicknesses of the two imaging lenses 41 and 42 can be sufficiently reduced to lower the cost of manufacturing those lenses.

EXAMPLE 13

Figure 39A:
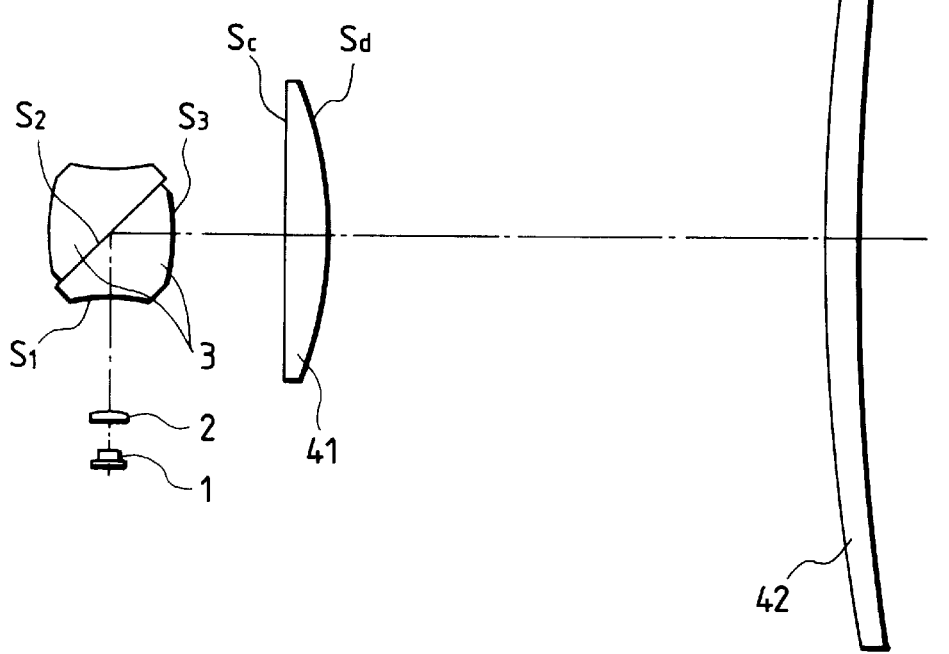
FIGS. 39(a) and (b) are diagrammatic views showing Example 13 of the present invention in sections that are taken in the main and sub-scanning directions, respectively.
Figure 39B:
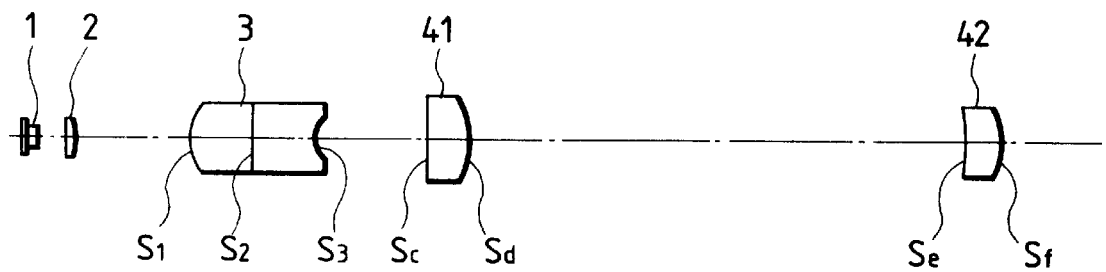

FIG. 39 shows schematically two sections of the system of Example 13; FIG. 39(a) refers to the section taken in the main scanning direction and FIG. 39(b) refers to the section taken in the sub-scanning direction and expanded along the optical axis. In Example 13, two rotating lens mirrors 3 of identical shape are arranged symmetrically with respect to the axis of rotation in such a way that their reflecting faces $S_2$ contact each other in a back-to-back relationship. The entrance face $S_1$ and the exit face $S_3$ of each lens mirror 3 are both a toric surface. The system of Example 13 includes not only the rotating lens mirrors 3 but also a first imaging lens 41 and a second imaging lens 42 which is provided near the image plane. Shown below are the data of optical specifications of a typical design based on Example 13.

$2\omega = 40.293°$

| Surface | | Radius of curvature | Distance between surfaces | Refractive index |
|---|---|---|---|---|
| $S_1$ | $r_{1y} =$ | −27.085 | $d_1 =$ 10.000 | $n_1 = 1.48261$ |
| | $r_{1x} =$ | 9.165 | | |
| $S_2$ | $r_2 =$ | ∞ | $d_2 =$ 10.000 | $n_2 = 1.48261$ |
| $S_3$ | $r_{3y} =$ | −41.156 | $d_3 =$ 19.538 | |
| | $r_{3x} =$ | 4.000 | | |
| $S_c$ | $r_{cy} =$ | −1459.288 | $d_c =$ 7.000 | $n_3 = 1.51118$ |
| | $r_{cx} =$ | 4041.76 | | |
| $S_d$ | $r_{dy} =$ | −61.746 | $d_d =$ 135.121 | |
| | $r_{dx} =$ | −13.200 | | |
| $S_e$ | $r_{ey} =$ | 348.184 | $d_e =$ 5.000 | $n_4 = 1.51118$ |
| | $r_{ex} =$ | −31.162 | | |
| $S_f$ | $r_{fy} =$ | 461.607 | $d_f =$ 43.341 | |
| | $r_{fx} =$ | −11.597 | | |
| $H = 0.07$ | | | | |

Figure 40:
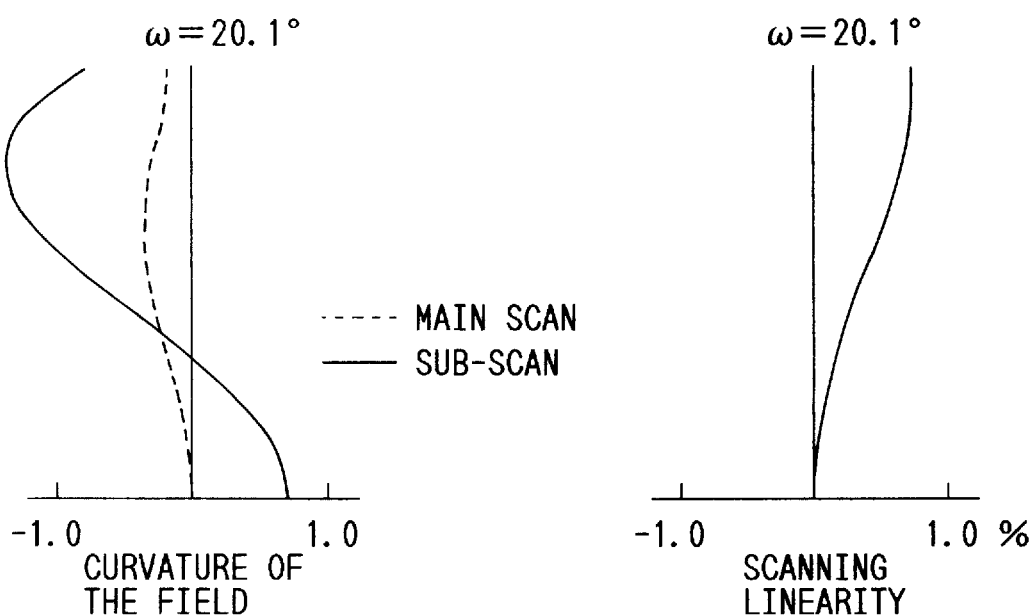
FIG. 40 plots the aberration curves that are obtained in Example 13.

FIG. 40 plots the aberration curves that are obtained with the design according to Example 13.

In Example 13, the second imaging lens 42 is provided near the image plane and this offers the advantage that compared to the case of using only one imaging lens, the optical lens magnification which is the composite value for the combination of the first and second imaging lenses is made small and equation (1) shows that one can enhance the effectiveness in tilt correction. Further, the use of a toric lens as the second imaging lens 42 insures that curvature of the field is held within ±1.4 mm while the scanning linearity can be made no greater than 0.7%; thus, a highly precise optical scanning apparatus can be constructed in accordance with Example 13.

Figure 41:
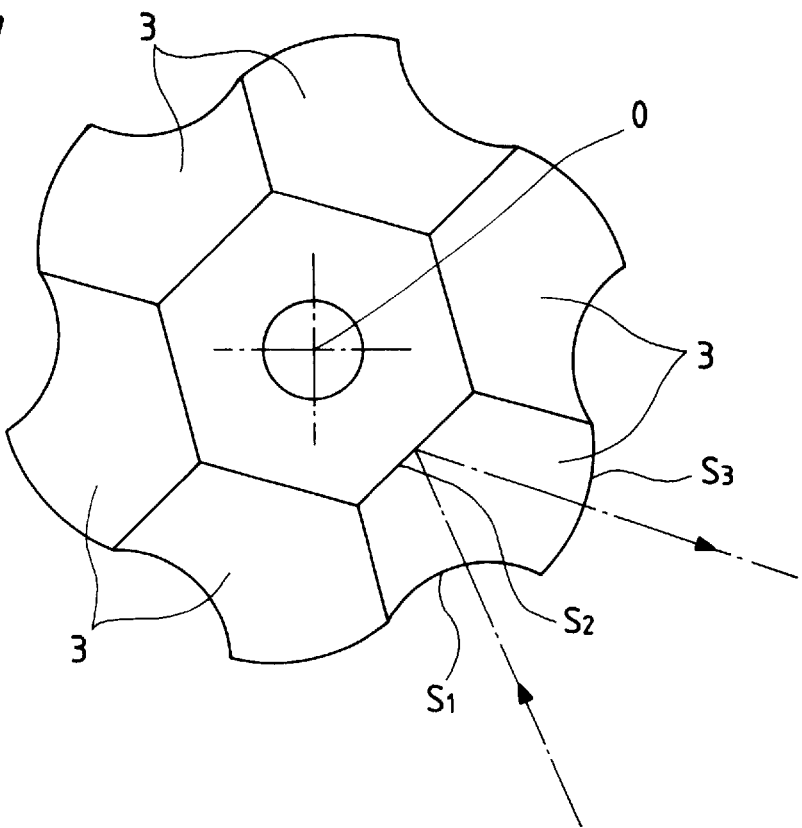
FIG. 41 shows the arrangement of six rotating lens mirrors in a cross section taken in the main scanning direction.

The foregoing description of Examples 8 to 13 assumes that two rotating lens mirrors are used but this is not the sole case of the present invention and, as shown in FIG. 41, three or more lens mirrors 3 may be arranged in positions that have rotation symmetry with respect to the axis of rotation 0 so as to further enhance the scanning efficiency. In a certain case, only one lens mirror will suffice and this is effective in reducing the unevenness in scanning pitch if the motor driving the lens mirror has some trouble such as erratic revolution.

As described on the foregoing pages, the second aspect of the present invention concerns an optical scanning apparatus of a type that uses a plurality of rotating lens mirrors and it is characterized in that the factor of tilt correction in the lens mirror unit is set to be no more than 0.5. This offers the advantage of providing a small, inexpensive and precise optical scanner that features an enhanced scanning efficiency while reducing the unevenness in scanning pitch. Further, it will be obvious to one skilled in the art that the use of this optical scanner with image forming apparatus such as a laser printer, digital copier, facsimile equipment or a laser scanning display makes great contribution to the reduction in the size and cost of those image forming apparatuses.

Before describing several examples that can attain the third object of the present invention, we will first explain the specifications of the optics in the beam scanning apparatuses constructed in accordance with those examples. Since each of the examples relates to a finite optical system, the specifications to be described of the optics refer to the beam scanner as a whole including a light source, a collimator lens, a cylindrical lens provided between the collimator lens and a rotating lens mirror or polygonal mirror, and an imaging lens. Stated more specifically: the surface of the light source is denoted by $S_0$; the entrance and exit faces of the collimator lens by $S_a$ and $S_b$, respectively; the entrance and exit faces of the cylindrical lens by $S_e$ and $S_f$, respectively; the refractive indices of the optical materials in the collimator lens, cylindrical lens and imaging lens by $n_a$, $n_c$, and $n_e$, respectively. The lens mirror is assumed to rotate by angle $2\omega$ or $2\theta$ from the start to the end of one scan cycle. Various specifications of the optics are expressed by the following symbols: $r_i$ for the radius of curvature of an ith surface $S_i$; $d_i$ for the on-axis distance from the ith surface $S_i$ to the next surface; if a surface of interest is cylindrical and has power only in the main scanning direction, the radius of its curvature in the main scanning direction is denoted by $r_{iy}$; if said cylindrical surface has power only in the sub-scanning direction, the radius of its curvature in the sub-scanning direction is denoted by $r_{ix}$; if the surface of interest is toric, the radii of its curvature in the main and sub-scanning directions are denoted by $r_{iy}$ and $r_{ix}$, respectively; if the shape of the surface through a section taken in the main scanning direction is other than an arc of a circle, the aspheric coefficients $K_{iy}$, $A_{iy}$, $B_{iy}$, $C_{iy}$ and $D_{iy}$ are expressed by the following equation:

$$z_i = \frac{h^2}{r_{iy}\{1 + \sqrt{1 - (1 + K_{iy}) h^2/r_{iy}^2}\}} + A_{iy}h^4 + B_{iy}h^6 + C_{iy}h^8 + D_{iy}h^{10}$$

where $z_i$ is the distance by which the point on the aspheric surface where the height from the optical axis is h departs from the plane tangent to the vertex of the aspheric surface; $S_1$, $S_2$ and $S_3$ refer to the entrance face, the reflecting face and the exit face, respectively, of the rotating lens mirror or polygonal mirror; $n_1$, and $n_2$ each refer to the refractive index of the optical material from which a rotating lens mirror is made.

Figure 43A:
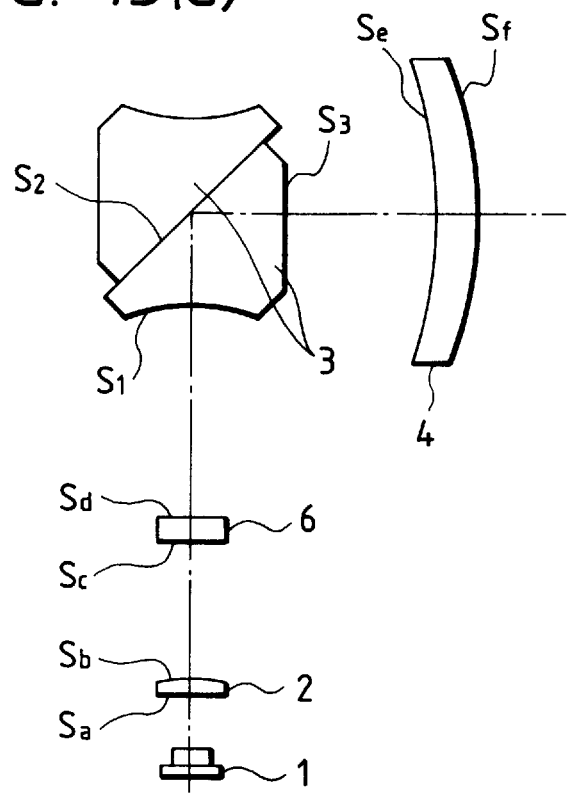
FIG. 43(a) is a cross-sectional view of the on-axis components of the system of Example 14.
Figure 43B:
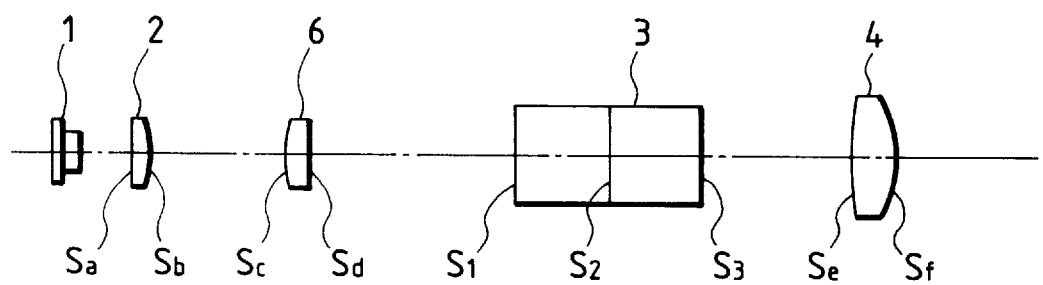
FIG. 43(b) is a side view of the on-axis components as expanded along the optical axis.

Specific examples of the third aspect of the present invention are next described below. FIG. 43(a) is a cross-sectional view of the on-axis components of the system of Example 14, and FIG. 43(b) is a side view of the on-axis components as expanded along the optical axis. In the case shown, the optical pathlength as measured from the center of rotation of the lens mirror unit 3 to the image plane is 220 mm.

The beam issuing from the semiconductor laser 1 is shaped by the collimator lens 2 to become substantially parallel. The collimated beam then passes through the cylindrical lens 6 to become convergent so as to form a line image on the reflecting face $S_2$ of the rotating lens mirror unit 3 in the sub-scanning direction. The lens mirror unit 3 consists of cylindrical lenses that are made from optical glass having consistent optical characteristics. After entering the lens mirror unit 3 through the entrance face $S_1$, the beam is reflected by the reflecting face $S_2$ of the lens mirror unit and emerges therefrom through the exit face $S_3$. The entrance face $S_1$ and the exit face $S_3$ are set in such a way that the beam targeting the center of scanning will pass through those faces in a normal direction; on the other hand, the reflecting face $S_2$ is set in such a way that the beam targeting the center of scanning will fall on the reflecting face $S_2$ at an angle of 45°. The entrance face $S_1$ is a cylindrical surface that has power only in the main scanning direction (i.e., the direction in which the beam scans the image plane) and which is concave in a section taken in the main scanning direction; the reflecting face $S_2$ and the exit face $S_3$ are each a flat plane. The axis of rotation of the lens mirror unit 3 is included in the reflecting face $S_2$ and passes through the point of reflection of the beam targeting the center of scanning. The beam is deflected in response to the rotation of the lens mirror unit 3, and the deflected beam passes through the imaging lens 4 to form a beam spot on the image plane.

The imaging lens 4 is a single plastic lens element having a high degree of freedom in surface design. A section of this lens as taken in the sub-scanning direction is shown in FIG. 43(b); obviously, the imaging lens 4 is a toric lens that is biconvex in cross-sectional shape. The biconvex cross-sectional shape assures that the toric lens has better optical characteristics with uniform thickness and good moldability. Stated more specifically, the radii of curvature of the lens surfaces can be made large enough to reduce spherical aberrations.

Shown below are the specifications of the optics in the system of Example 14. The system comprises tilt correcting optics which, when taken in the main scanning direction, is finite system in which convergent light is launched into the rotating lens mirror unit 3 and which, when taken in the sub-scanning direction, is of a conjugative type in which a line image is formed on the reflecting face $S_2$ of the rotating lens mirror unit 3. Hence, the following datasheet lists the specifications of the beam scanner taken as a whole including the parameters of the collimator lens.

$2\omega = 35.1°$

| Surface | | Radius of curvature | | Distance between surfaces | | Refractive index |
|---|---|---|---|---|---|---|
| $S_0$ | | | $d_0 =$ | 10.182 | | |
| $S_a$ | $r_a =$ | ∞ | $d_a =$ | 2.000 | $n_a = 1.523613$ | |
| $S_b$ | $r_b =$ | −5.236 | $d_b =$ | 11.883 | | |
| $S_c$ | $r_{cx} =$ | 27.825 | $d_c =$ | 3.000 | $n_c = 1.523613$ | |
| $S_d$ | $r_d =$ | ∞ | $d_d =$ | 30.617 | | |
| $S_1$ | $r_{1y} =$ | −25.000 | $d_1$ | 10.000 | $n_1 = 1.51$ | |
| $S_2$ | $r_2 =$ | ∞ | $d_2 =$ | 10.000 | $n_2 = 1.51$ | |
| $S_3$ | $r_{3y} =$ | ∞ | $d_3 =$ | 25.000 | | |
| $S_e$ | $r_{ey} =$ | −33.367 | | | | |
| | $r_{ex} =$ | 249.086 | | | | |
| (Aspheric coefficients) | | | | | | |
| | $K_{ey} = 0.00000$ | | | | | |
| | $A_{ey} = 3.320321 \times 10^{-6}$ | | $B_{ey} = 3.023233 \times 10^{-9}$ | | | |
| | $C_{ey} = 1.588745 \times 10^{-12}$ | | $D_{ey} = 1.790809 \times 10^{-16}$ | | | |
| | | | $d_e =$ | 5.000 | $n_{e-1.52}$ | |
| $S_f$ | $r_{fy} =$ | −30.427 | | | | |
| | $r_{fx} =$ | −15.998 | | | | |
| | | | $d_f =$ | 180.000 | | |

Figure 44:
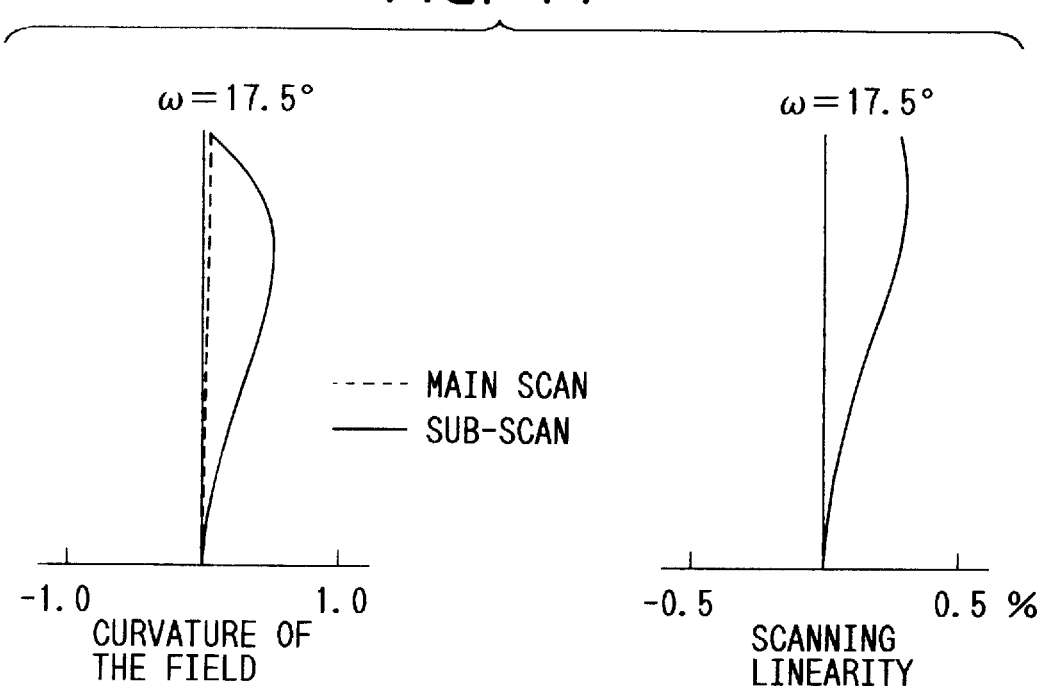
FIG. 44 plots the aberration curves that are obtained with the imaging lens in the beam scanning apparatus of FIG. 43.

The aberration curves obtained with the imaging lens 4 are plotted by graphs in FIG. 44. Curvature of the field that develops in the main scanning direction is expressed by a dashed line and one that develops in the sub-scanning direction is expressed by a solid line. As for scanning linearity, it is usual in the case of an fθ lens to express the departure of the actual image height from the ideal value y=fθ in percentages. However, in the present invention where both the entrance face $S_1$ and the exit face $S_3$ of the lens mirror unit are adapted to rotate, the ideal image height y is not equal to fθ. Hence, an equivalent method of presentation is substituted, according to which the departure from the ideal image height Y=ζθ is expressed in percentages with ζ representing the change in image height with the angle of rotation of the lens mirror unit 3 for paraxial rays. Half view angle ω is the angle through which the lens mirror unit 3 rotates as the imaging spot scans from the center to either edge of scanning. The beam's design wavelength was set at 780 nm. As is clear from FIG. 44, the beam scanner of Example 14 is a high-precision apparatus that is capable of effective aberration correction in terms of both curvature of the field and scanning linearity and which yet is small in size and compact.

Figure 45A:
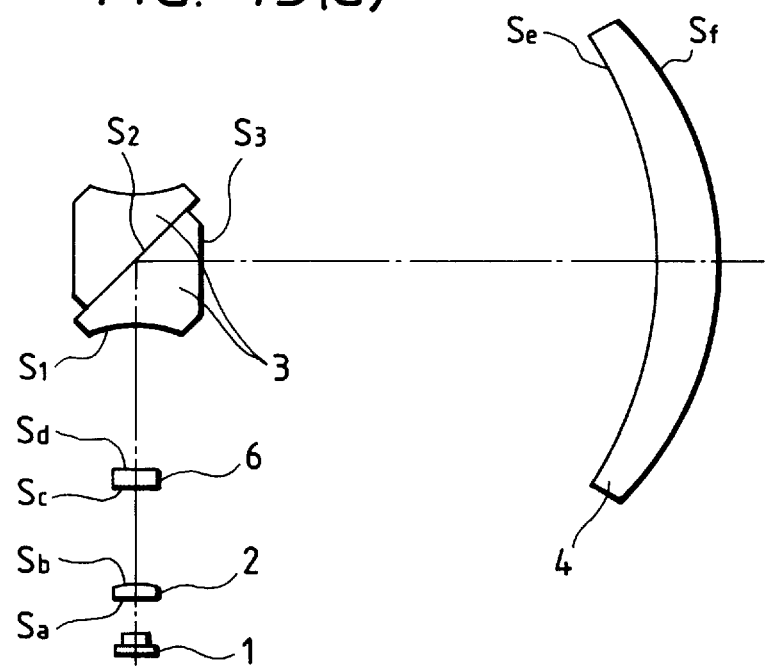
FIG. 45(a) is a cross-sectional view of the on-axis components of the system of Example 15.
Figure 45B:
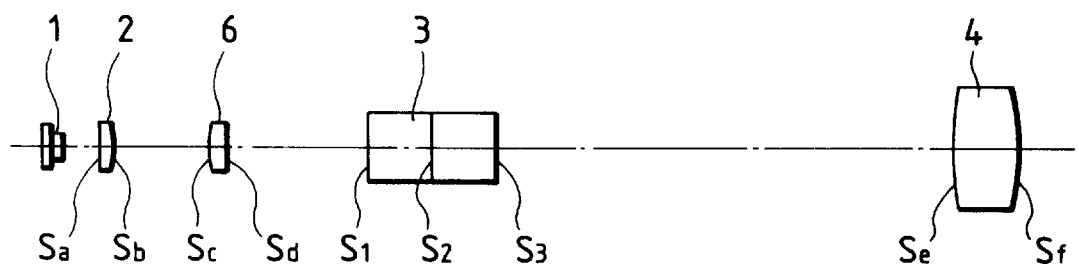
FIG. 45(b) is a side view of the on-axis components as expanded along the optical axis.

FIG. 45(*a*) is a cross-sectional view of the on-axis components of the system of Example 15, and FIG. 45(*b*) is a side view of the on-axis components as expanded along the optical axis. The optical pathlength is 205 mm as measured from the center of rotation of the lens mirror unit 3 to the image plane. In the case shown, the imaging lens 4 is positioned closer to the image plane and this not only requires less exacting precision in surfaces and geometry for the imaging lens 4 but also helps reduce its power in the sub-scanning direction. Hence, one can suppress the variations in curvature of the field to small values even if there are fluctuations in the refractive index due to temperature changes.

By referring to FIGS. 45(*a*) and (*b*), the beam issuing from the semiconductor laser 1 is shaped by the collimator lens 2 to become substantially parallel. The collimated beam then passes through the cylindrical lens 6 to become convergent so as to form a line image on the reflecting face $S_2$ of the rotating lens mirror unit 3 in the sub-scanning direction. As in Example 14, the lens mirror unit 3 consists of cylindrical lenses that are made from optical glass having consistent optical characteristics. After entering the lens mirror unit 3 through the entrance face S1, the beam is reflected by the reflecting face $S_2$ of the lens mirror unit and emerges therefrom through the exit face $S_3$. The entrance face $S_1$ and the exit face $S_3$ are set in such a way that the beam targeting the center of scanning will pass through those faces in a normal direction; on the other hand, the reflecting face $S_2$ is set in such a way that the beam targeting the center of scanning will fall on the reflecting face $S_2$ at an angle of 45°. The entrance face $S_1$ is a cylindrical surface that has power only in the main scanning direction (i.e., the direction in which the beam scans the image plane) and which is concave in a section taken in the main scanning direction; the reflecting face $S_2$ and the exit face $S_3$ are each a flat plane. The axis of rotation of the lens mirror unit 3 is included in the reflecting face $S_2$ and passes through the point of reflection of the beam targeting the center of scanning. The beam is deflected in response to the rotation of the lens mirror unit 3, and the deflected beam passes through the imaging lens 4 to form a beam spot on the image plane.

The imaging lens 4 is a single plastic lens element having a high degree of freedom in surface design. A section of this lens as taken in the sub-scanning direction is shown in FIG. 45(*b*); obviously, the imaging lens 4 is a toric lens that is biconvex in cross-sectional shape. The biconvex cross-sectional shape assures that the toric lens has better optical characteristics with uniform thickness and good moldability. Stated more specifically, the radii of curvature of the lens surfaces can be made large enough to reduce spherical aberrations.

Shown below are the specifications of the optics in the system of Example 15. The system comprises tilt correcting optics which, when taken in the main scanning direction, is a finite system in which convergent light is launched into the rotating lens mirror unit 3 and which, when taken in the sub-scanning direction, is of a conjugative type in which a line image is formed on the reflecting face $S_2$ of the rotating lens mirror unit 3.

$2\omega = 38.6°$

| Surface | Radius of curvature | | Distance between surfaces | | Refractive index |
|---|---|---|---|---|---|
| $S_0$ | | | $d_0 =$ | 9.971 | |
| $S_a$ | $r_a =$ | ∞ | $d_a =$ | 2.000 | $n_a = 1.523613$ |
| $S_b$ | $r_b =$ | −5.236 | $d_b =$ | 11.883 | |
| $S_c$ | $r_{cx} =$ | 24.885 | $d_c =$ | 3.000 | $n_c = 1.523613$ |
| $S_d$ | $r_d =$ | ∞ | $d_d =$ | 30.617 | |
| $S_1$ | $r_{1y} =$ | −35.088 | $d_1 =$ | 10.000 | $n_1 = 1.51$ |
| $S_2$ | $r_2 =$ | ∞ | $d_2 =$ | 10.000 | $n_2 = 1.51$ |
| $S_3$ | $r_{3y} =$ | ∞ | $d_3 =$ | 70.000 | |
| $S_e$ | $r_{ey} =$ | −63.200 | | | |
| | $r_{ex} =$ | 62.740 | | | |
| (Aspheric coefficients) | | | | | |
| | $K_{ey} = 0.00000$ | | | | |
| | $A_{ey} = 1.033837 \times 10^{-7}$ | | $B_{ey} = -3.029096 \times 10^{-11}$ | | |
| | $C_{ey} = 7.816046 \times 10^{-15}$ | | $D_{ey} = -3.336982 \times 10^{-18}$ | | |
| | | | $d_e =$ | 10.000 | $n_e = 1.52$ |
| $S_f$ | $r_{fy} =$ | −49.571 | | | |
| | $r_{fx} =$ | −39.041 | | | |
| | | | $d_f =$ | 115.000 | |

Figure 46:
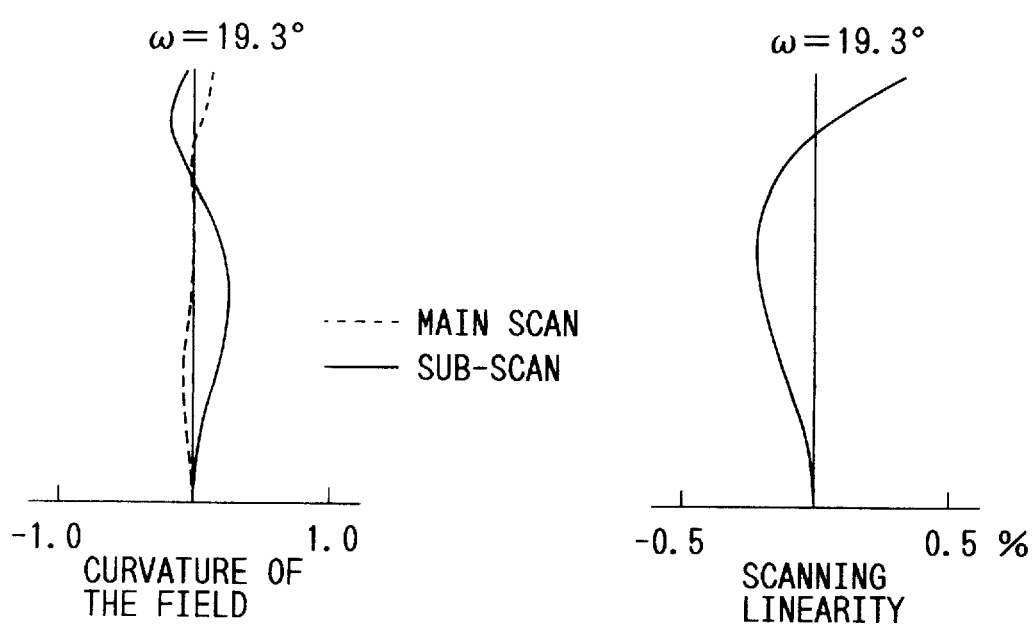
FIG. 46 plots the aberration curves that are obtained with the beam scanning apparatus of FIG. 45.

The aberration curves that are obtained with the imaging lens 4 are plotted by graphs in FIG. 46. Curvature of the field that develops in the main scanning direction is expressed by a dashed line and one that develops in the sub-scanning direction is expressed by a solid line. As for scanning linearity, the departure from the ideal image height Y=ζθ is expressed in percentages with representing the change in image height with the angle of rotation of the lens mirror unit 3 for paraxial rays. Half view angle ω is the angle through which the lens mirror unit 3 rotates as the imaging spot scans from the center to either edge of scanning. The beam's design wavelength was set at 780 nm. As is clear from FIG. 46, the beam scanner of Example 15 is quite satisfactory in terms of both curvature of the field and scanning linearity.

Figure 47A:
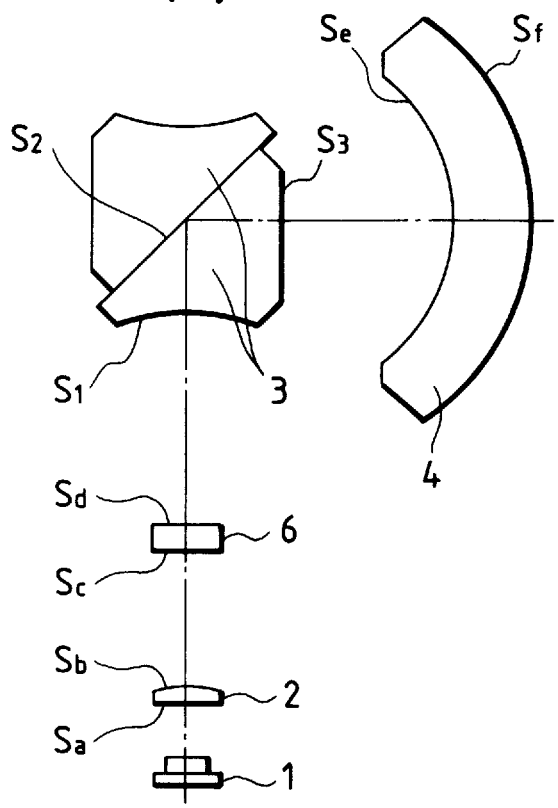
FIG. 47(a) is a cross-sectional view of the on-axis components of the system of Example 16.
Figure 47B:
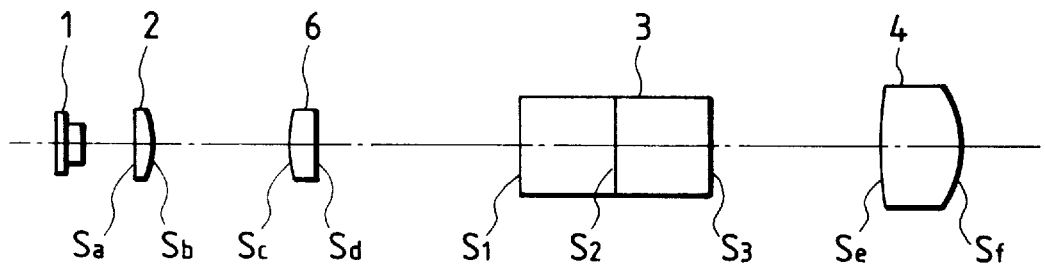
FIG. 47(b) is a side view of the on-axis components as expanded along the optical axis.

FIG. 47(*a*) is a cross-sectional view of the on-axis components of the system of Example 16, and FIG. 47(*b*) is a side view of the on-axis components as expanded along the optical axis. The optical pathlength is 140 mm as measured from the center of rotation of the lens mirror unit 3 to the image plane. In the case shown, the shorter optical pathlength enables further reduction in the size of the beam scanner and the distance from the imaging lens 4 to the image plane becomes even shorter than in the versions of Examples 14 and 15; hence, the precision required for the surfaces and geometry of the imaging lens 4 can be rendered even less exacting and much better optical characteristics are guaranteed.

Shown below are the specifications of the optics in the system of Example 16.

$2\omega = 46.4°$

| Surface | Radius of curvature | | Distance between surfaces | | Refractive index |
|---|---|---|---|---|---|
| $S_0$ | | | $d_0 =$ | 10.424 | |
| $S_a$ | $r_a =$ | ∞ | $d_a =$ | 2.000 | $n_a = 1.523613$ |
| $S_b$ | $r_b =$ | −5.236 | $d_b =$ | 11.883 | |
| $S_c$ | $r_{cx} =$ | 32.153 | $d_c =$ | 3.000 | $n_c = 1.523613$ |

-continued

2ω = 46.4°

| Surface | Radius of curvature | | Distance between surfaces | | Refractive index |
|---|---|---|---|---|---|
| $S_d$ | $r_d =$ | ∞ | $d_d =$ | 30.617 | |
| $S_1$ | $r_{1y} =$ | −25.445 | $d_1 =$ | 10.000 | $n_1 = 1.51$ |
| $S_2$ | $r_2 =$ | ∞ | $d_2 =$ | 10.000 | $n_2 = 1.51$ |
| $S_3$ | $r_{3y} =$ | ∞ | $d_3 =$ | 22.000 | |
| $S_e$ | $r_{ey} =$ | −22.981 | | | |
| | $r_{ex} =$ | 102.061 | | | |

(Aspheric coefficients)

$K_{ey} = 0.00000$
$A_{ey} = 8.291283 \times 10^{-5}$   $B_{ey} = 2.527244 \times 10^{-8}$
$C_{ey} = -3.166518 \times 10^{-11}$   $D_{ey} = 1.069828 \times 10^{-13}$
$d_e = 10.000$   $n_e = 1.52$

| $S_f$ | $r_{fy} =$ | −31.819 |
| | $r_{fx} =$ | −14.100 |

$d_f = 103.000$

Figure 48:
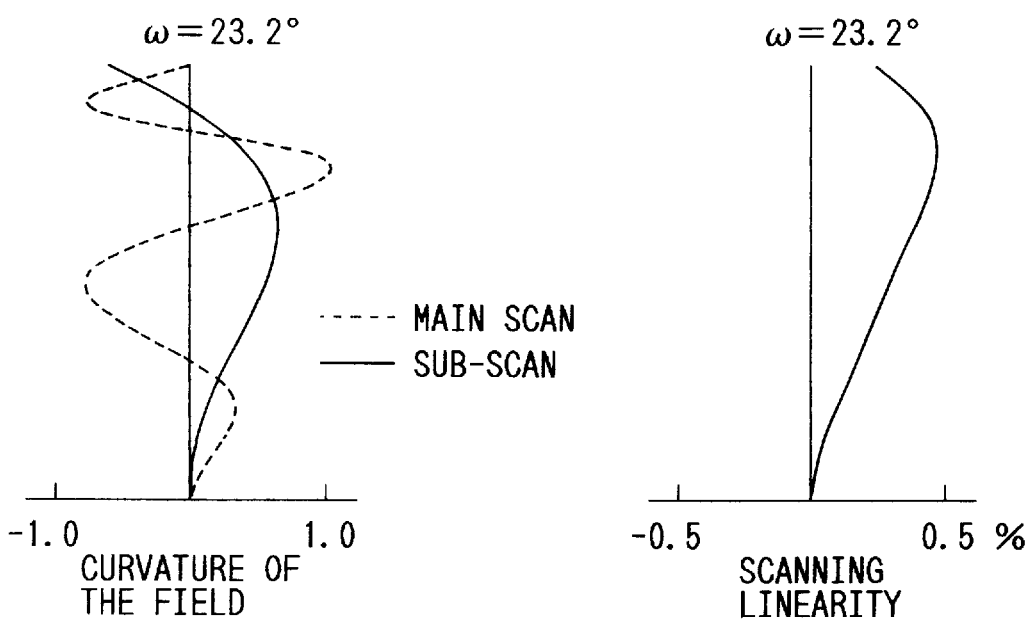
FIG. 48 plots the aberration curves that are obtained with the imaging lens in the beam scanning apparatus of FIG. 47.

The aberration curves that are obtained with the imaging lens 4 are plotted by graphs in FIG. 48. As in the preceding examples, curvature of the field that develops in the main scanning direction is expressed by a dashed line and one that develops in the sub-scanning direction is expressed by a solid line. As for scanning linearity, the departure from the ideal image height Y=ζθ is expressed in percentages with ζ representing the change in image height with the angle of rotation of the lens mirror unit 3 for paraxial rays. Half view angle ω is the angle through which the lens mirror unit 3 rotates as the imaging spot scans from the center to either edge of scanning. The beam's design wavelength was at 780 nm. As is clear from FIG. 48, the beam scanner of Example 16 is quite satisfactory in terms of both curvature of the field and scanning linearity and it yet is small in size and compact.

Figure 49A:
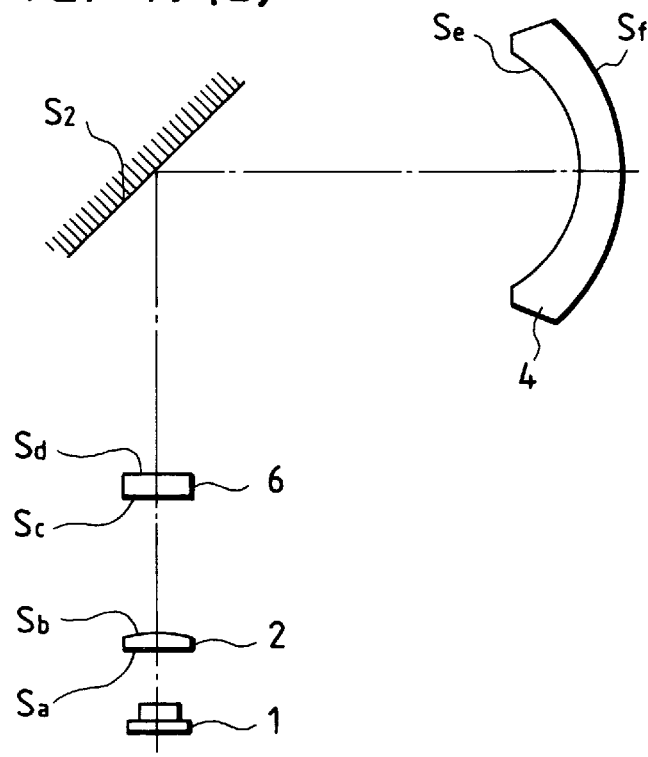
FIG. 49(a) is a cross-sectional view of the on-axis components of the system of Example 17.
Figure 49B:
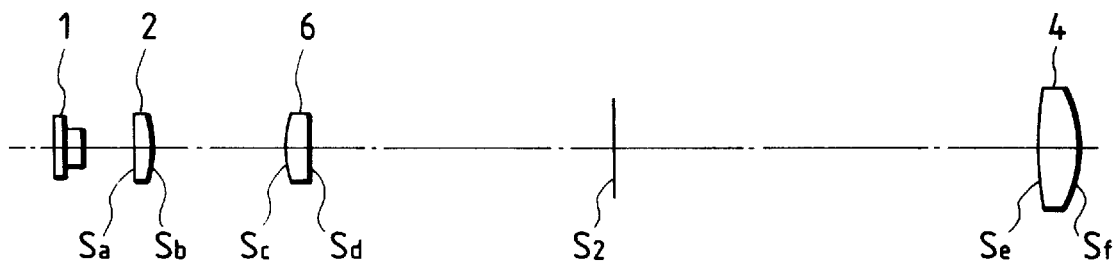
FIG. 49(b) is a side view of the on-axis components as expanded along the optical axis.

Example 17 of the present invention differs from the preceding Examples 14 to 16 in that a polygonal mirror rather than a rotating lens mirror is used as the deflecting optical element. FIG. 49(a) is a cross-sectional view of the on-axis components of the system of Example 17, and FIG. 49(b) is a side view of the on-axis components as expanded along the optical axis. The beam issuing from the semiconductor laser 1 is shaped by the collimator lens 2 to become substantially parallel and the collimated beam then passes through the cylindrical lens 6 to be focused solely in the sub-scanning direction to form a line image on the reflecting face $S_2$ of the polygonal mirror. The reflecting face $S_2$ is adapted to be conjugative with the image plane. The beam deflected by the reflecting face $S_2$ passes through the imaging lens 4 to form a beam spot on the image plane. The imaging lens 4 has the following features: its entrance face $S_e$ is a non-arcuate toric surface that has a shape other than an arc of a circle in a section taken in the main scanning direction and which is generated by rotating said section about an axis that crosses the axis of rotation of the polygonal mirror and the optical axis at right angles, and the exit face $S_f$ is a toric surface that is shaped as an arc of a circle in a section taken in the sub-scanning direction and which is generated by rotating said section about an axis parallel to the axis of rotation of the polygonal mirror. Since the beam entering the imaging lens 4 is convergent, the collimator portion of the optics under consideration is a finite system.

Shown below are the specifications of the optics in the system of Example 17.

2ω = 40.4°

| Surface | Radius of curvature | | Distance between surfaces | | Refractive index |
|---|---|---|---|---|---|
| $S_0$ | | | $d_0 =$ | 9.289 | |
| $S_a$ | $r_a =$ | ∞ | $d_a =$ | 2.000 | $n_a = 1.523613$ |
| $S_b$ | $r_b =$ | −5.236 | $d_b =$ | 3.000 | |
| $S_c$ | $r_{cx} =$ | 38.878 | $d_c =$ | 3.000 | $n_c = 1.523613$ |
| $S_d$ | $r_d =$ | ∞ | $d_d =$ | 50.000 | |
| $S_2$ | $r_2 =$ | ∞ | $d_2 =$ | 60.000 | |
| $S_e$ | $r_{ey} =$ | −17.644 | | | |
| | $r_{ex} =$ | 310.295 | | | |

(Aspheric coefficients)

$K_{ey} = -0.30231$
$A_{ey} = 1.58211 \times 10^{-6}$   $B_{ey} = -1.14840 \times 10^{-8}$
$C_{ey} = 4.63083 \times 10^{-11}$   $D_{ey} = -6.44931 \times 10^{-14}$
$d_e = 5.000$   $n_e = 1.519220$

| $S_f$ | $r_{fy} =$ | −27.044 |
| | $r_{fx} =$ | −24.743 |

$d_f = 150.000$

Figure 50:
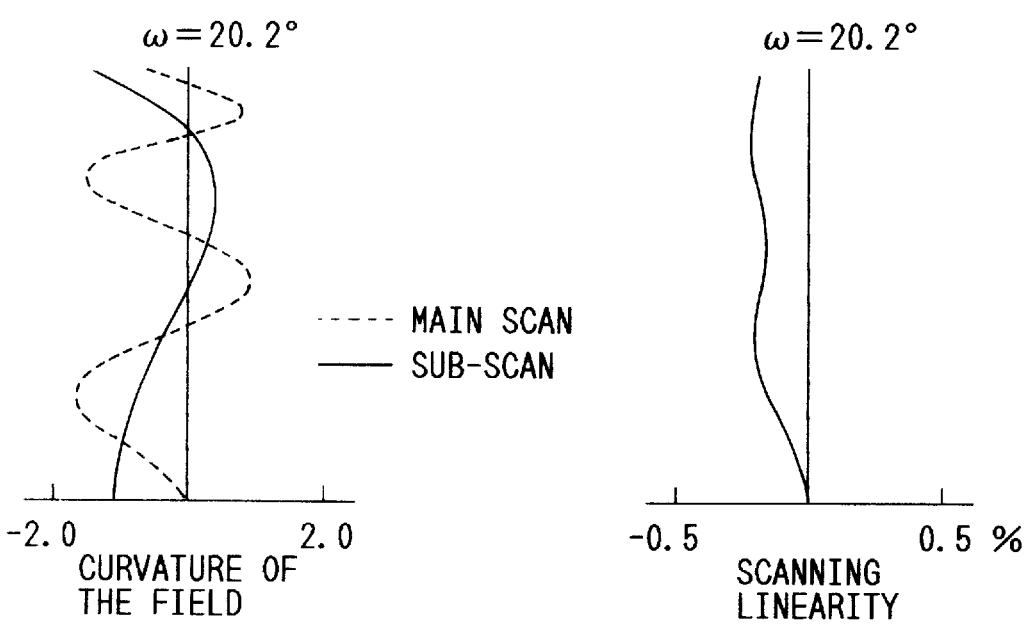
FIG. 50 plots the aberration curves that are obtained with the imaging lens in the beam scanning apparatus of FIG. 49.

The aberration curves that are obtained with the imaging lens 4 in the system of Example 17 are plotted by graphs in FIG. 50. In the case under consideration, the scan angle 2θ is expressed as a view angle and this is the common practice adopted with ordinary fθ lenses. Even if a polygonal mirror is used instead of a rotating lens mirror, the present invention provides a beam scanning apparatus that insures constant beam speed on the image plane. In the system of Example 17, the entrance face of the imaging lens is so shaped in a section taken in the sub-scanning direction that the radius of curvature is small near the optical axis and increases progressively towards the edge of the imaging lens and because of this geometry, the imaging lens has the advantage that the field curvature of the section taken in the sub-scanning direction can be brought closer to linearity.

If the section of an ordinary toric lens as taken in the main scanning direction has a shape other than an arc of a circle, it becomes asymmetric with respect to the axis of rotation (an axis parallel to the axis of rotation of the deflector) and, hence, it is practically impossible to manufacture the desired toric lens by conventional working methods. However, according to the third aspect of the present invention, the axis of rotation for the generation of a toric surface is modified in such a way that the resulting shape remains symmetric with respect to a line (the axis of rotation) even if the shape of a section as taken in the main scanning direction is other than an arc of a circle. Hence, the desired toric lens can be manufactured by conventional working methods and the section taken in the main scanning direction can be rendered to assume a shape other than an arc of a circle without increasing the manufacturing cost or sacrificing the precision of the lens. As a result, the degree of freedom in the correction of aberrations can readily be increased markedly even if they occur in the main scanning direction, whereby one can improve the imaging performance and the scanning linearity in the main scanning direction.

As described on the foregoing pages, the beam scanning apparatus according to the third aspect of the present invention is basically of a type that uses a rotating lens mirror or polygonal mirror as the deflector to be driven for high-speed rotation; the apparatus is characterized in that a single imaging lens element (fθ lens) is used in conjugate type tilt correcting optics, with said imaging lens being a toric lens having a biconvex cross-sectional shape taken in the sub-scanning direction. This offers the advantage that compared to a meniscus lens, the radius of curvature necessary to produce a given power can be great enough to insure reduction in spherical aberration and, hence, better optical characteristics. The large radius of curvature offers another advantage in that the fluidity of molding resins is sufficiently enhanced to achieve an improvement in the efficiency of lens molding operations, whereby the desired imaging lens can be manufactured in an easy manner. In addition, the beam scanning apparatus that employs such imaging lens is reduced in the overall size and, in spite of its simple and compact configuration, the apparatus features high precision and is fully corrected for the problem of the tilting of deflecting faces.

What is claimed is:

1. A beam scanning apparatus comprising:
    a light source;
    a collimator lens for shaping a beam from said light source;
    an optical element having a beam entrance face, a beam reflecting face and a beam exit face, at least one of said beam entrance face and said beam exit face being a cylindrical surface having power only in a main scanning direction; and
    rotation drive means for driving said optical element to rotate at a continuous angular displacement with respect to the beam from said collimator lens.

2. A beam scanning apparatus according to claim 1 wherein said entrance face and said exit face are each a cylindrical surface having power only in the main scanning direction, and wherein said beam reflecting face is a flat plane, said apparatus further comprising imaging optics for focusing the beam deflected by said optical element on an image plane.

3. A beam scanning apparatus according to claim 2 wherein said imaging optics comprises a single lens element having a toric surface.

4. A beam scanning apparatus according to claim 2 wherein said imaging optics comprises two lens elements, wherein a first one of said lens elements is a cylindrical lens having power only in a sub-scanning direction, and a second one of said lens elements is a spherical lens.

5. A beam scanning apparatus according to claim 2 comprising a plurality of said optical elements.

6. A beam scanning apparatus according to claim 5 wherein said imaging optics comprises at least two lens elements, and wherein a lens element closest to the image plane is a cylindrical lens having power only in a sub-scanning direction.

7. A beam scanning apparatus according to claim 5 further comprising a cylindrical lens positioned between said collimator lens and said optical element for focusing the beam only in a sub-scanning direction to form a line image near said reflecting face.

8. A beam scanning apparatus according to claim 7 wherein the beam shaped by said collimator lens and incident on said cylindrical lens is a convergent beam.

9. A beam scanning apparatus as recited in claim 1, wherein said entrance face and said exit face are both cylindrical surfaces having power only in the main scanning direction.

10. A beam scanning apparatus as recited in claim 1, comprising a plurality of interconnected optical elements.

11. A beam scanning apparatus as recited in claim 16, wherein said interconnected optical elements are arranged in a substantially circular fashion.

12. A beam scanning apparatus comprising:
    a light source;
    a collimator lens for shaping a beam from said light source; and
    at least one rotatably driven optical element for deflecting and scanning the beam, said optical element having a beam entrance face, a beam reflecting face and a beam exit face, at least one of said entrance face and said exit face having a predetermined shape for correcting aberrations when the beam is focused on an image plane, wherein a maximum pitch error in a sub-scanning direction is no greater than about one-half a pitch error which exists when there are no lenses or other optical elements between said optical element and the image plane.

13. A beam scanning apparatus comprising:
    a light source;
    a collimator lens for shaping a beam from said light source;
    a deflector driven to rotate at high speed;
    a cylindrical lens for forming a line image on a reflecting face of said deflector; and
    an imaging lens by which the beam deflected by said deflector is focused to form a tilt corrected image on an image plane, said imaging lens comprising a single lens with a toric surface, and said imaging lens having a biconvex shape and a positive refractive power in a section that includes an optical axis and is normal to a deflecting plane of said deflector.

14. A beam scanning apparatus according to claim 13 wherein said deflector comprises a rotating polygonal mirror.

15. A beam scanning apparatus according to claim 13 further comprising a finite system in which convergent light enters said deflector.

16. A beam scanning apparatus according to claim 13 wherein said deflector comprises a rotating polygonal mirror, and wherein said imaging lens has an entrance face that is generated by rotating an arc of a circle or other geometric shapes around an axis that crosses an axis of rotation of the rotating polygonal mirror and the optical axis at right angles.

17. A beam scanning apparatus according to claim 13 wherein said deflector comprises an optical element having a beam entrance face, a beam reflecting face and a beam exit face, at least one of said entrance face and said exit face being a cylindrical surface having power only in a main scanning direction.

* * * * *